US008808090B2

(12) United States Patent
Myogan

(10) Patent No.: US 8,808,090 B2
(45) Date of Patent: Aug. 19, 2014

(54) GAME DEVICE, GAME CONTROL METHOD, PROGRAM, RECORDING MEDIUM AND GAME MANAGEMENT DEVICE

(75) Inventor: Shuichi Myogan, Osaka (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/811,041

(22) PCT Filed: Nov. 7, 2011

(86) PCT No.: PCT/JP2011/075570
§ 371 (c)(1),
(2), (4) Date: Jan. 18, 2013

(87) PCT Pub. No.: WO2012/111198
PCT Pub. Date: Aug. 23, 2012

(65) Prior Publication Data
US 2013/0130791 A1 May 23, 2013

(30) Foreign Application Priority Data

Feb. 18, 2011  (JP) .................................. 2011-032688
Nov. 1, 2011   (JP) .................................. 2011-240574

(51) Int. Cl.
*A63F 13/02* (2006.01)
(52) U.S. Cl.
CPC ......... *A63F 13/02* (2013.01); *A63F 2300/1075* (2013.01); *A63F 2300/6045* (2013.01)
USPC ............................................. 463/37; 463/31
(58) Field of Classification Search
CPC ............... A63F 2300/8005; A63F 2300/8011; A63F 2300/8052; A63F 2009/2408; A63F 2009/241; A63F 2300/6045; A63F 2300/63; A63F 2300/6027; A63F 2009/2457; A63F 2009/246; A63F 2009/2402; A63F 2009/243; A63F 2009/2436; A63F 2009/2448; A63F 2006/245; A63F 2009/2458; A63F 2300/10; A63F 2300/1018; A63F 2300/1043; A63F 2300/1056; A63F 2300/1062; A63F 2300/1068; A63F 2300/1075; A63F 2300/5553

USPC ........... 463/37, 29, 2–4, 7, 36, 16, 20, 11–13, 463/17–19, 25, 26–28, 30–32, 40–42
See application file for complete search history.

(56) References Cited

U.S. PATENT DOCUMENTS 5,370,399 A * 12/1994 Liverance ........................ 463/23
5,405,151 A *  4/1995 Naka et al. ...................... 463/31
(Continued)

FOREIGN PATENT DOCUMENTS

JP  09-239149 A   9/1997
JP  11-119641 A   4/1999
(Continued)

OTHER PUBLICATIONS

Machine translation of Miyamoto, et al., Japanese patent publication JP 2005-192986 A, application JP 2004-092476, downloaded Apr. 2, 2013 from http://www4.ipdl.inpit.go.jp.*

(Continued)

*Primary Examiner* — David L Lewis
*Assistant Examiner* — Matthew D Hoel
(74) *Attorney, Agent, or Firm* — Westerman, Hattori, Daniels & Adrian, LLP

(57) ABSTRACT

Provided is a game device with strong entertainment value which realizes a sensory input operation (sign operations for a baseball game, or the like) while reducing the processing load. The game device includes instructing character display unit (31) for displaying the instructing character on a screen, selectable parts setting unit (32) for setting, as selectable parts, a plurality of predetermined areas of the instructing character, instruction storage unit for storing, in a storage device, associated information related to a selected order and an instruction; and a sign identification unit (36) for identifying an instruction corresponding to a selected order or a combination of the selectable parts based on the associated information when a plurality of selectable parts of the instructing character are selectively operated, and a game advancement unit (50) for advancing the game by reflecting the instruction identified by the sign.

12 Claims, 29 Drawing Sheets

(56) References Cited

U.S. PATENT DOCUMENTS

| | | | |
|---|---|---|---|
| 5,411,270 A * | 5/1995 | Naka et al. | 463/33 |
| 5,411,272 A * | 5/1995 | Naka et al. | 463/33 |
| 5,470,080 A * | 11/1995 | Naka et al. | 463/33 |
| 5,498,002 A * | 3/1996 | Gechter | 463/31 |
| 5,498,003 A * | 3/1996 | Gechter | 463/31 |
| RE35,314 E * | 8/1996 | Logg | 463/2 |
| 6,149,523 A | 11/2000 | Yamada et al. | |
| 6,450,888 B1 * | 9/2002 | Takase et al. | 463/43 |
| 7,594,847 B1 * | 9/2009 | York et al. | 463/5 |
| 7,637,806 B2 * | 12/2009 | Rhyne et al. | 463/9 |
| 7,677,974 B2 * | 3/2010 | Van Luchene | 463/29 |
| 8,012,016 B2 * | 9/2011 | York et al. | 463/31 |
| 8,012,017 B2 * | 9/2011 | York et al. | 463/31 |
| 8,147,306 B2 * | 4/2012 | Rhyne et al. | 463/9 |
| 2001/0016511 A1 * | 8/2001 | Hino et al. | 463/8 |
| 2004/0176165 A1 * | 9/2004 | Takahashi et al. | 463/36 |
| 2005/0054402 A1 | 3/2005 | Noguchi et al. | |
| 2005/0202869 A1 | 9/2005 | Miyamoto et al. | |
| 2005/0215323 A1 | 9/2005 | Miyamoto et al. | |
| 2006/0116203 A1 * | 6/2006 | Nakada et al. | 463/30 |
| 2006/0128468 A1 * | 6/2006 | Yoshikawa et al. | 463/36 |
| 2007/0021207 A1 * | 1/2007 | Ahdoot | 463/36 |
| 2007/0105626 A1 * | 5/2007 | Cho et al. | 463/37 |
| 2008/0132335 A1 | 6/2008 | Yamaguchi | |
| 2010/0056281 A1 | 3/2010 | Uchiyama | |

FOREIGN PATENT DOCUMENTS

| | | |
|---|---|---|
| JP | 2002-035411 A | 2/2002 |
| JP | 2005-034276 A | 2/2005 |
| JP | 2005-192986 A | 7/2005 |
| JP | 2005-193006 A | 7/2005 |
| JP | 2005-319175 A | 11/2005 |
| JP | 2006-081942 A | 3/2006 |
| JP | 2008-136694 A | 6/2008 |
| JP | 2008-188194 A | 8/2008 |
| JP | 2009-165876 A | 7/2009 |
| JP | 2010-012050 A | 1/2010 |
| JP | 2010-046554 A | 3/2010 |
| KR | 10-2009-0076986 A | 7/2009 |
| WO | 97/32642 A1 | 9/1997 |
| WO | 2008/096663 A1 | 8/2008 |

OTHER PUBLICATIONS

Machine translation of Kinoshita, et al., Japanese patent publication JP 2010-012050 A, application JP 2008-174964, downloaded Apr. 2, 2013 from http://www4.ipdl.inpit.go.jp.*

Claims, detailed description, technical field, prior art, effect of the invention, technical problem, means, description of drawings, and drawings sections of Miyamoto, et al. (Japanese patent publication JP 2005-193006, application JP 2004-335522), downloaded Nov. 4, 2013.*

International Search Report of PCT/JP2011/075570, mailing date of Jan. 24, 2012.

Office Action for Japanese Patent Application No. 2011-240574, mailing date of Jan. 17, 2012, w/ English translation.

Korean Office Action dated Apr. 10, 2014, issued in corresponding Korean Patent Application No. 10-2013-7001150, w/English translation (7 pages).

* cited by examiner

FIG. 4

| SELECTABLE PART | SELECTABLE PART IDa | SETUP FLAG | KEY FLAG |
|---|---|---|---|
| HEAD | 1 | 1 | 1 |
| RIGHT SHOULDER | 2 | 1 | 0 |
| LEFT SHOULDER | 3 | 1 | 0 |
| RIGHT HAND | 4 | 1 | 0 |
| LEFT HAND | 5 | 1 | 0 |
| CHEST | 6 | 1 | 0 |
| BELT | 7 | 1 | 0 |
| EAR | 8 | 0 | 0 |
| CHIN | 9 | 0 | 0 |
| ... | ... | ... | ... |

FIG. 5

| SIGN | SIGN IDb | SELECTED ORDER OF THE SELECTABLE PARTS | EFFECTIVE FLAG |
|---|---|---|---|
| HIT-AND-RUN | 1 | HEAD (1) → RIGHT SHOULDER (2) → LEFT SHOULDER (3) | 1 |
| BUNT | 2 | CHEST (6) → LEFT HAND (5) → RIGHT SHOULDER (2) | 1 |
| SQUEEZE | 3 | HEAD (1) → LEFT SHOULDER (3) → CHEST (6) | 1 |
| STEAL BASE | 4 | RIGHT SHOULDER (2) → LEFT SHOULDER (3) → BELT (7) | 1 |
| WAIT | 5 | LEFT SHOULDER (3) → BELT (7) → CHEST (6) | 0 |
| PICKOFF | 6 | HEAD (1) → HEAD (1) → CHEST (6) | 0 |
| SLUG BUNT | 7 | HEAD (1) → BELT (7) → HEAD (1) | 0 |
| BUNT SHIFT | 8 | LEFT HAND (5) → CHEST (6) → HEAD (1) | 0 |
| PITCH OUT | 9 | LEFT SHOULDER (3) → HEAD (1) → BELT (7) | 0 |
| ... | ... | ... | ... |

FIG. 7

| SIGN | SIGN IDb | RUNNER FLAG | THIRD BASE RUNNER FLAG |
|---|---|---|---|
| HIT-AND-RUN | 1 | 1 | 0 |
| BUNT | 2 | 0 | 0 |
| SQUEEZE | 3 | 0 | 1 |
| BASE STEALING | 4 | 1 | 0 |
| WAIT | 5 | 0 | 0 |
| PICKOFF | 6 | 1 | 0 |
| SLUG BUNT | 7 | 0 | 0 |
| BUNT SHIFT | 8 | 0 | 0 |
| PITCH OUT | 9 | 0 | 0 |
| ... | ... | ... | ... |

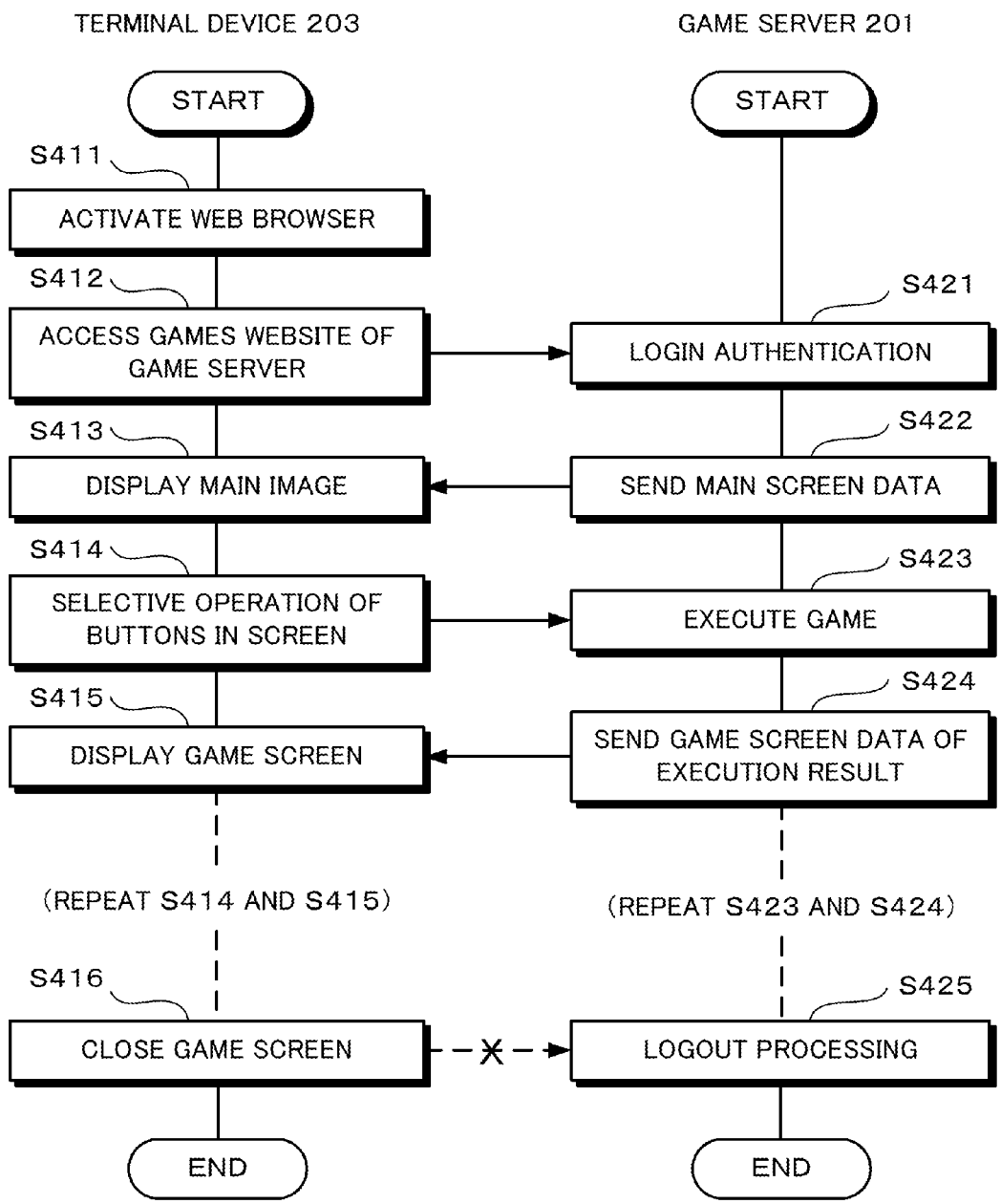

GAME DEVICE, GAME CONTROL METHOD, PROGRAM, RECORDING MEDIUM AND GAME MANAGEMENT DEVICE

TECHNICAL FIELD

This application is based on Japanese Patent Application Serial No. 2011-032688, filed in the Japan Patent Office on Feb. 18, 2011, and Japanese Patent Application Serial No. 2011-240574, filed in the Japan Patent Office on Nov. 1, 2011, the contents of which are hereby incorporated by reference.

The present invention relates to a game device which executes various types of games, a game control method, a program, a recording medium with the foregoing program recorded thereon, and a game management device.

BACKGROUND ART

Conventionally, various game devices which execute games by displaying a game image on a screen have been proposed. With this kind of game device, a player operates an operation input unit of a controller or the like and advances the game while giving instructions (orders) to an object such as a character that appears in the game.

In this kind of game device, as one example, considered is a case where a baseball game is executed. In a baseball game, there is a play mode where a player advances the game from the position as a manager by giving instructions to the respective player characters, and in this play mode, the player in the game performs the operation of inputting various instructions such as base-stealing, bunt, and hit-and-run. In addition, with a conventional game device, the foregoing instructions were input by the player performing the operation of selecting one among a plurality of written instructions upon giving instructions to the respective player characters.

Nevertheless, with the conventional configuration of giving instructions by selecting the instruction from written options, there is a problem in that it is only possible to enable input operations that are simple and lack amusement.

Meanwhile, conventionally, game devices which allow a game operation while drawing a trajectory of a predetermined shape on a screen using the player's finger or a mouse, or drawing a trajectory of a predetermined shape in the space by the player moving a controller including an acceleration sensor have been proposed (refer to Patent Documents 1 to 4). With these game devices, a player can input various commands by drawing various trajectory geometries.

Nevertheless, with the configuration of Patent Documents 1 to 4, since a command is activated upon recognizing the trajectory geometry drawn by the player, image recognition processing of the trajectory geometry needs to be performed, and consideration must be given to the blurring of the trajectory plotting performed by the player. Thus, the load of the processing unit (CPU or the like) will increase. In other words, with the configuration of Patent Documents 1 to 4, there is a problem in that various types of burdensome processing such as the vector arithmetic processing of the trajectory, image recognition processing of the trajectory geometry, pattern matching processing of shapes, and similarity determination processing are required.

PRIOR ART DOCUMENTS

Patent Document

Patent Document 1: Japanese Laid-open Patent Publication No. 2002-35411
Patent Document 2: Japanese Laid-open Patent Publication No. 2005-319175
Patent Document 3: Japanese Laid-open Patent Publication No. 2006-81942
Patent Document 4: Japanese Laid-open Patent Publication No. 2008-136694 (US Patent Publication No. 2008-132335)

DISCLOSURE OF THE INVENTION

This invention is accomplished as a solution to the foregoing problem, and an object of this invention is to provide a game device, a game control method, a program, a recording medium, and a game management device, which realizes sensory input operations while reducing the processing load.

In order to achieve the foregoing object, the game device according to one aspect of the present invention is a game device in which a character in a virtual space is operated via an instructing character, comprises an instructing character display unit for displaying the instructing character on a screen, a selectable parts setting unit for setting, as selectable parts, a plurality of predetermined areas of the instructing character, an instruction storage unit for storing, in a storage device, associated information related to a selected order or a combination of the plurality of selectable parts, and an instruction; and an instruction identification unit for identifying an instruction corresponding to a selected order or a combination of the selectable parts based on the associated information when a plurality of selectable parts of the instructing character are selectively operated.

The game management device according to another aspect of the present invention is a game management device which receives an access from a terminal device of each player via a network and provides to each player, via the network, a game service of a game in which a character is operated via an instructing character, the game management device comprises an instructing character display unit for displaying the instructing character on a screen of the terminal device by sending information for displaying the instructing character on the terminal device, a selectable parts setting unit for setting, as selectable parts, a plurality of predetermined areas of the instructing character, an instruction storage unit for storing, in a storage device, associated information related to a selected order or a combination of the plurality of selectable parts, and an instruction; and an instruction identification unit for receiving information related to a selective operation from the terminal device when the terminal device selectively operates a plurality of selectable parts of the instructing character, and identifying an instruction corresponding to a selected order or a combination of the selectable parts based on the associated information.

The game control method according to another aspect of the present invention is a game control method of a computer controlling a game in which a character in a virtual space is operated via an instructing character, comprises an instructing character display step of the computer displaying the instructing character on a screen, a selectable parts setting step of the computer setting, as selectable parts, a plurality of predetermined areas of the instructing character, an instruction storage step of the computer storing, in a storage device, associated information related to a selected order or a combination of the plurality of selectable parts, and an instruction, and, an instruction identification step of the computer identifying an instruction corresponding to a selected order or a combination of the selectable parts based on the associated information when a plurality of selectable parts of the instructing character are selectively operated.

According to the present invention, by operating a plurality of selectable parts of the instructing character on the screen, a sensory input operation can be realized. Furthermore, since the plurality of selectable parts of the instructing character are predetermined, the instruction can be easily recognized only from the selected order or the combination of the selectable parts without requiring a troublesome processing that requires high load such as recognition processing of trajectory of a shape, and or the like. Consequently, according to the present invention, a highly amusing sensory input operation such as giving blocking signals can be realized while reducing the processing load.

Incidentally, the game device and the game management device of the present invention can be realized also by means of a computer. In this case, a program which realizes the game device and the game management device by means of the computer by causing the computer to operate as the respective units of the game device or the game management device, and a non-transitory computer readable medium having recorded thereon the program also fall under the scope of the present invention.

The objects, features and advantages of the present invention will become further evident from the following description with reference to the accompanying drawings.

BRIEF DESCRIPTION OF THE DRAWINGS

FIG. 4 is an explanatory view showing an example of the configuration of a table stored by a selectable parts storage unit;

FIG. 5 is an explanatory view showing an example of the configuration of a table stored by a sign storage unit;

FIG. 7 is an explanatory view showing an example of the configuration of the table stored by a status table storage unit;

FIG. 24 is a flowchart showing an example of operations of the game system.

BEST MODE FOR CARRYING OUT THE INVENTION

In the following, a game device, a game control method, a program, a non-transitory recording medium having recorded thereon the program, and a game management device according to one embodiment of the present invention are described with reference to the accompanying drawings.

[Outline of Game Device]

The game device according to an embodiment of the present invention is applied to a game in which a character in a virtual space is operated via an instructing character. As one example of such a game, there is a sports game in which a player character in a virtual space is operated via a manager character (or coach character) as an instructing character. In a baseball game as one example of the sports game, player characters are operated via a manager character by that manager character giving instructions (signs) to the player characters such as a batter character, a pitcher character, a fielder character and a runner character that are operated in a virtual space (virtual baseball field in the game). In this embodiment, the ensuing explanation is based on the foregoing baseball game.

Figure 9A:
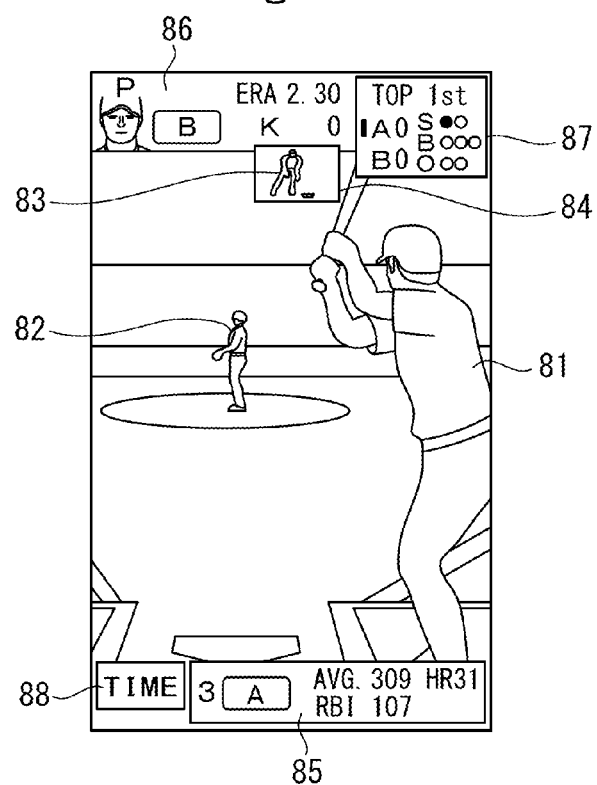
FIG. 9A is an explanatory view showing one example of a game screen of the game device.
Figure 9B:
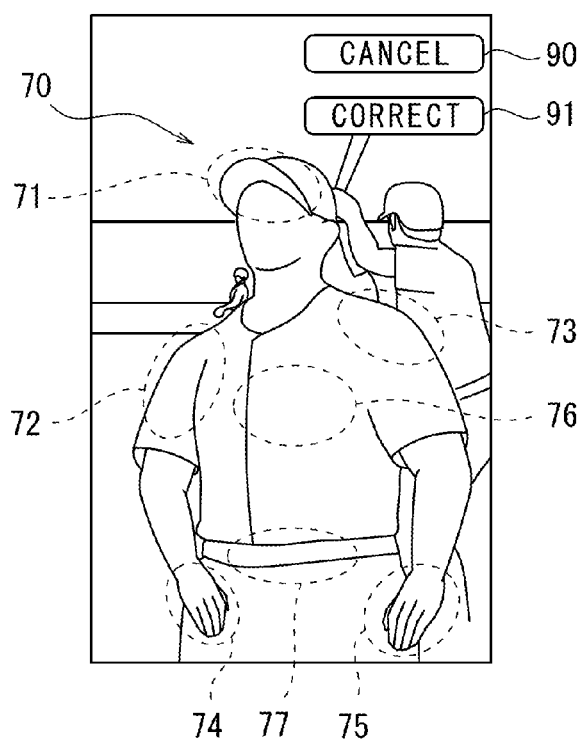
FIG. 9B is an explanatory view showing one example of a sign operation screen of the game device.

The game device of this embodiment comprises a manager mode in which a player advances the game in the position as a manager by giving instructions (orders) to the respective player characters, and, when the player is to perform input operations for giving instructions to the respective characters in the manager mode, for instance, as shown in FIG. 9B, a manager character 70 as the instructing character is displayed on the screen.

Figure 9C:
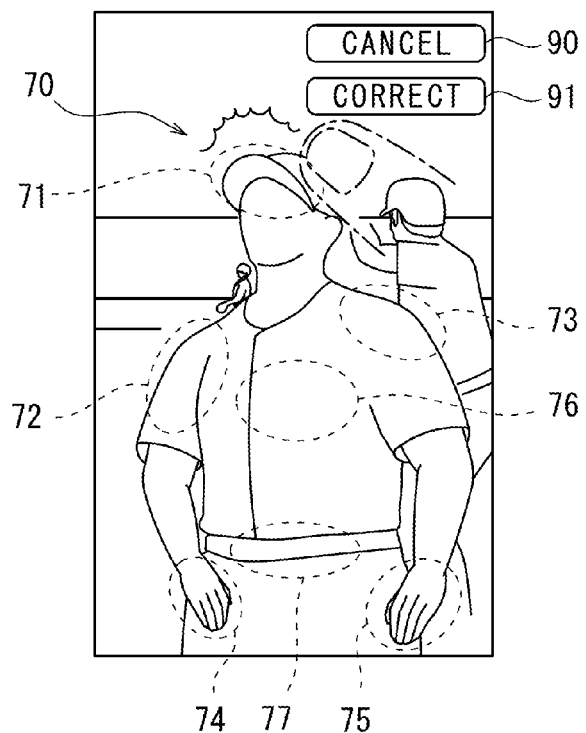
FIG. 9C is an explanatory view explaining a screen transition of the sign operation screen.
Figure 9D:
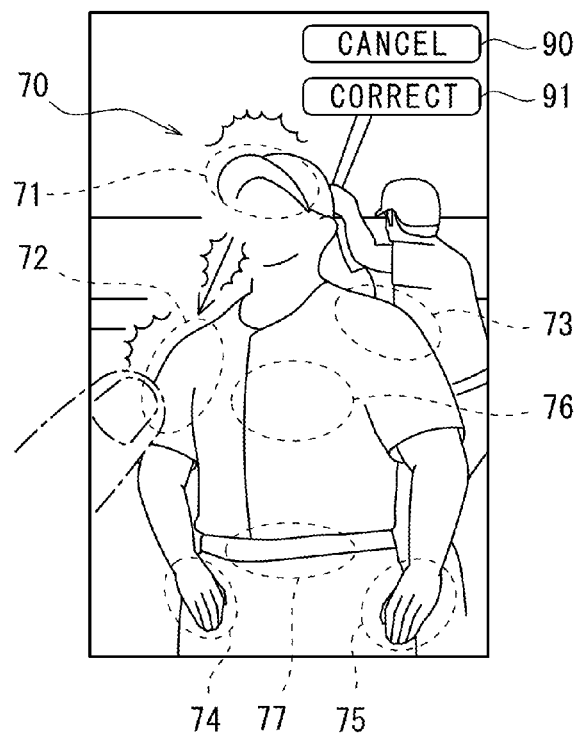
FIG. 9D is an explanatory view explaining a screen transition of the sign operation screen.
Figure 9E:
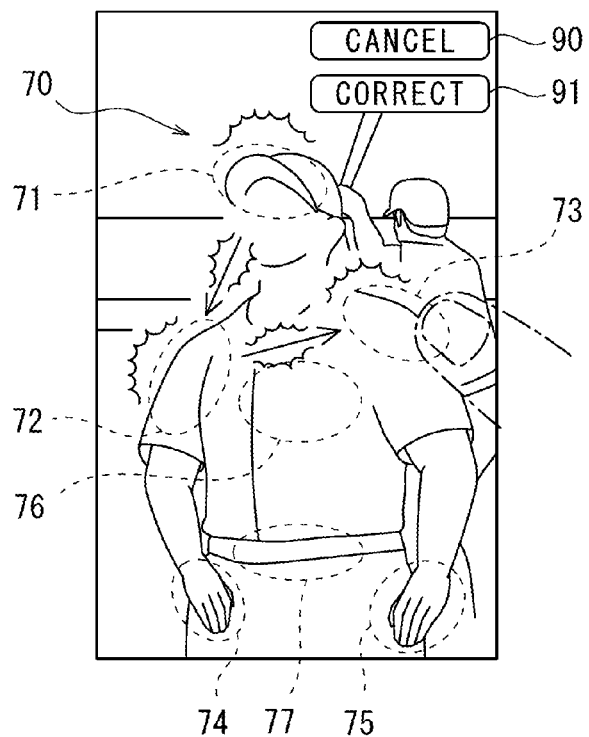
FIG. 9E is an explanatory view explaining a screen transition of the sign operation screen.

In addition, a plurality of predetermined parts such as a head 71, both shoulders 72 and 73, both hands 74 and 75, chest 76, belt 77 and the like of the manager character 70 displayed on the screen are decided in advance as selectable parts, and the player can give various instructions (signs for stealing bases, bunting and the like) by selectively operating the plurality of selectable parts. For example, as shown in FIG. 9C to FIG. 9E, when displaying the manager character 70 on a touch panel screen, the player can give various signs corresponding to the selected order (or combination) of the parts that were contacted as a result of the player touching, with one's finger, the manager character 70's head 71, right shoulder 71, left shoulder 72 and so on. Details regarding FIG. 9B to FIG. 9E will be explained later.

To selectively operate a plurality of selectable parts of the instructing character on the screen as described above is similar to the feeling of, for instance, a manager of a baseball team or the like in the real world giving a blocking signal by touching his/her head, shoulder or the like with one's hand. It is thereby possible to realize a sensory operation of a blocking signal by a manager in the game. Consequently, it is possible to realize a highly amusing game where, in a baseball game, the player can feel like a manager while performing realistic sign operations via the manager character displayed on the screen. Details of the configuration of the game device according to this embodiment are now explained.

[Configuration of Game Device]

Figure 1:
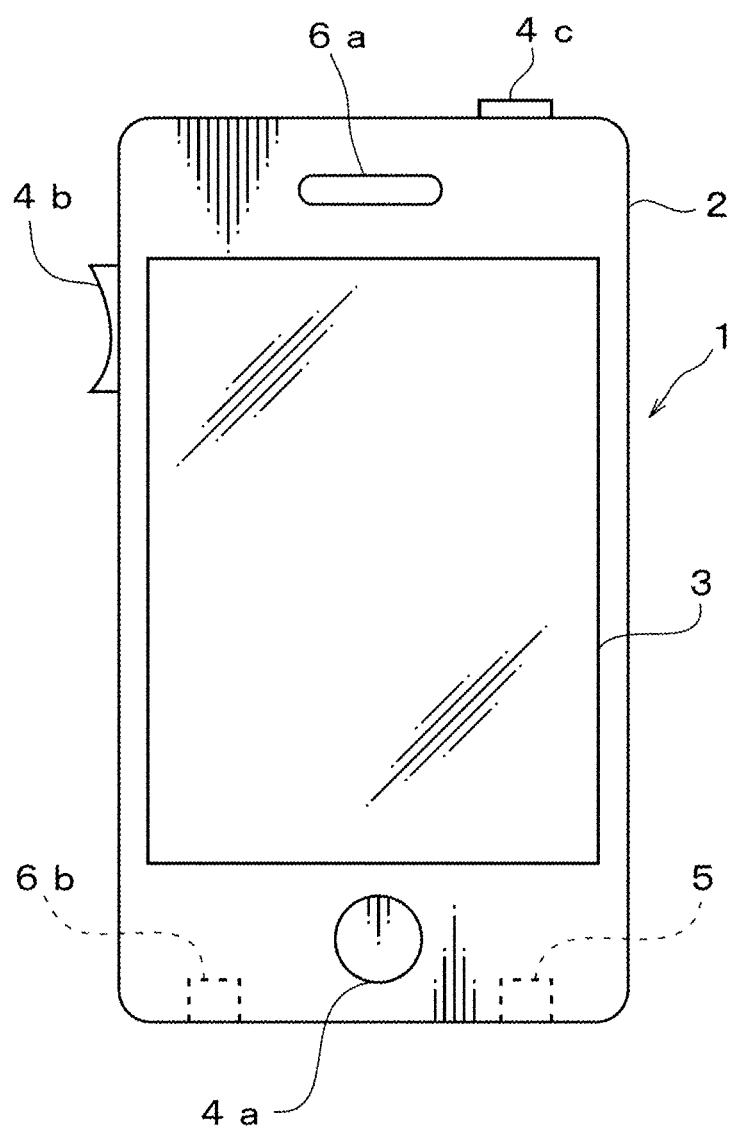
FIG. 1 is a plan view showing the external appearance of a game device according to one embodiment of the present invention.
Figure 2:
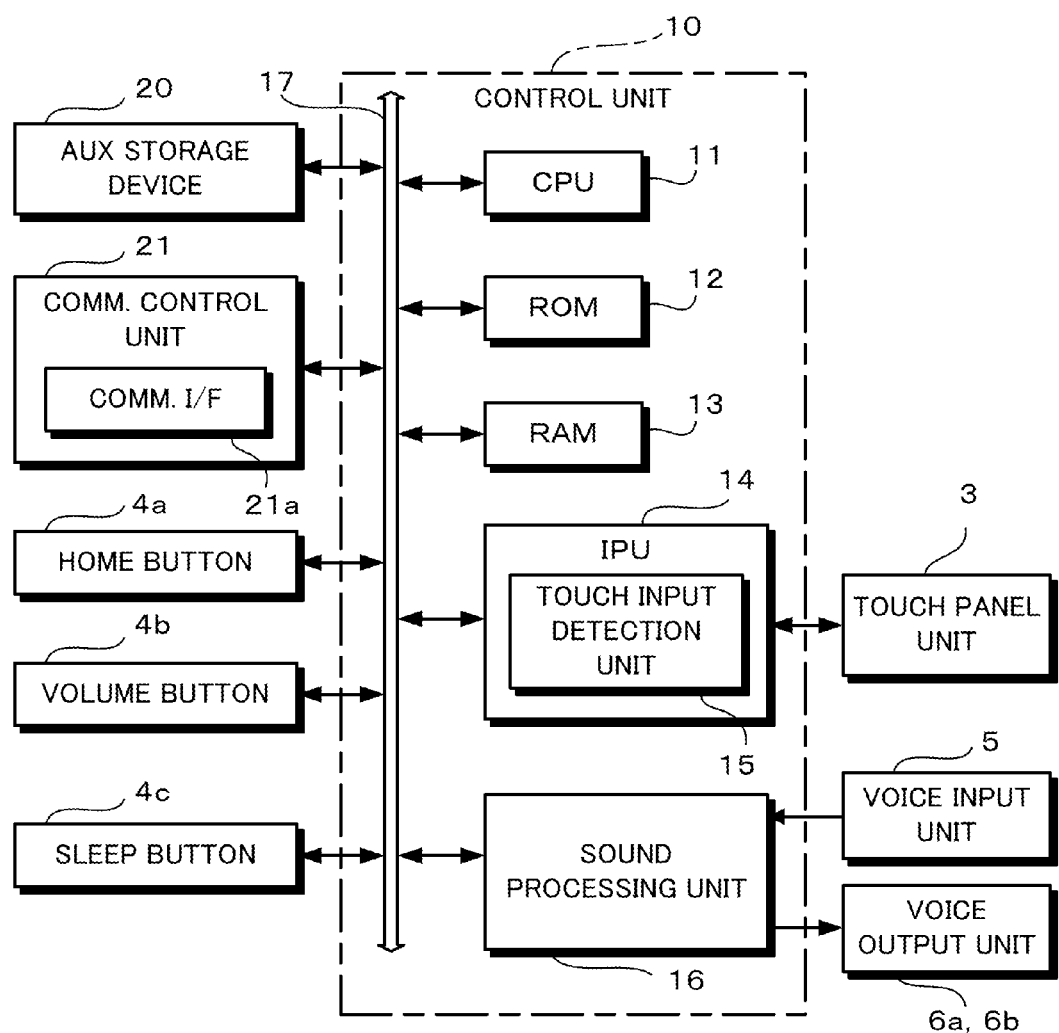
FIG. 2 is a block diagram showing one example of the hardware configuration of the game device.

FIG. 1 is a plan view showing an example of the appearance of a game device 1 according to an embodiment of the present invention. FIG. 2 is a block diagram showing an example of the hardware configuration of the game device 1. In this embodiment, as one configuration example of the game device 1, explained is a configuration example where a game program is stored in a storage device of a smartphone, which is a portable terminal configured as a combination of a portable phone and a portable information terminal, and various types of games can be executed by the smartphone executing the game program.

As shown in FIG. 1, the game device 1 comprises a main body 2, a touch panel unit 3, a button operation unit 4a, 4b, 4c, a voice input unit 5, and a voice output unit 6a, 6b.

The touch panel unit 3 is a contact-input-type image display section provided on one surface of a cabinet of the main body 2. This touch panel unit 3 is constituted by a combination of a display unit made up of a liquid crystal display, etc., and a touch interface, and detects a contact position by making a finger of an operator (player) or a pen as the instruction unit contact the screen, thereby realizing a sensory input operation. The touch panel unit 3 according to the present embodiment is constituted by a projected capacitive multi-touch screen, which permits simultaneous multiple-point detection. For the touch panel unit 3, other types, such as a resistive touch panel, a surface acoustic wave touch panel, an infrared touch panel, electromagnetic induction touch panel, a surface capacitive touch panel, and the like may be adopted.

The button operating portion has a home button 4a, a volume button 4b, a sleep button 4c, and the like, and the operations with button permit other basic operations that the operation to be performed with the touch panel unit 3. The home button 4a is located, for example, below the touch panel unit 3 on the main body 2. When the user touches the home button 4a, home screen is displayed. The volume button 4b is located, for example, on the side face of the main body 2. This volume button 4b is structured such that the volume level is increased by pressing the upper part of the volume button 4b, while the volume level is decreased by pressing the lower part of the volume button 4b. The sleep button 4c is located, for example, on the top of the main body 2, and the game device 1 is switched to the sleep mode by pressing the sleep button 4, and is recovered from the sleep mode by pressing the sleep button 4c in the sleep mode.

The voice input unit 5 is made up of a microphone stored in the main body 2, collects sound, for example, from the opening for the microphone provided on the lower surface of the main body 2. This voice input unit 5 is used when performing telephone communication or recording sounds.

The voice output unit 6a is provided, for example, above the touch panel unit 3 on the main body 2, and serves as a receiving speaker when performing telephone communication. Furthermore, the voice output unit 6b is stored in the main body 2, and outputs effective sound, and the like when executing the game from the output opening, formed, for example, on the lower surface of the main body 2.

On the main body 2 of the game device 1, a headset jack, a connector for supplying power for connecting with a personal computer, lens for storage camera, and the like are also provided. However, explanations thereof shall be omitted here.

As shown in FIG. 2, the game device 1 essentially comprises a control unit 10, an auxiliary storage device 20, and a communication control unit 21.

The control unit 10 comprises a CPU (Central Processing Unit) 11, a ROM (Read Only Memory) 12 as a main storage device, and a RAM (Random Access Memory) 13, an image processing unit 14, and a sound processing unit 16, which are mutually connected via a bus line 17 including address bus, data bus, control bus, and the like. Between the bus line 17 and respective constitution elements, an interface circuit may be provided. However, illustration of such interface circuit is omitted here.

The CPU 11 interprets and executes commands of a game program, and controls the game device 1 as a whole. The ROM 12 stores the program necessary for controlling the basic operation of the game device 1. The RAM 13 stores various kinds of programs and data, and secures the working space with respect to the CPU 11.

The image processing unit 14 drives the touch panel unit 3 based on an image display command from the CPU 11, and displays an image on the screen of the touch panel unit 3. The image processing unit 14 comprises a touch input detection unit 15. When a finger, a pen or the like contacts the screen of the touch panel unit 3, this touch input detection unit 14 detects the coordinate of the contact position on the screen and supplies a coordinate signal to the CPU 11. As a result, the contact position on the screen of the touch panel unit 3 is recognized by the CPU 11. The image processing unit 14 supplies a selective signal indicative of that the detection target region is selected is supplied to the CPU 11 when a finger or the like contacts a predetermined detection target region displayed on the screen of the touch panel unit 3. As a result, CPU 11 recognized that the detection target region on the screen of the touch panel unit 3 has been selected.

When voice is input from the voice input unit 5, the sound processing unit 16 converts an analog voice signal into a digital voice signal, and generates an analog voice signal based on a phonetic signal and outputs it to the voice output unit 6a or 6b.

The auxiliary storage device 20 is a storage device for storing a game program, data of various types. For the auxiliary storage device 20, for example, a hard disk drive, a flush memory drive, or the like may be used.

The communication control unit 21 comprises a communication interface 21a, and has a communication control function for carrying out data communication when executing a game, a communication control function for sending and receiving voice data as a portable telephone, and the like. Here, the communication control function for data communication includes, for example, a wireless LAN (Local Area Network) connection function, an internet connection function via a wireless LAN, or a portable telephone line, a short distance wireless communication function using a predetermined frequency band (for example, a frequency band of 2.4 GHz), and the like. The communication control unit 21 sends a connection signal for connecting the game device 1 to wireless LAN, internet, or the like based on a command from the CPU 11, and receives information sent from the communications partner, and sends it to the CPU 11.

The game device 1 may additionally comprise an image pickup device (camera) such as a CCD (Charge Coupled Device) image sensor, etc., a GPS (Global Positioning System) signal receiving circuit, a triaxial accelerometer, or the like.

In the game device of the foregoing configuration, various kinds of games can be executed by loading the game program stored in the auxiliary storage device 20 into the RAM 13, and executing the loaded game program by the CPU 11. It is also possible to execute a competitive game by connecting the game device 1 to other game device 1 by a wireless LAN communication, an internet communication, a near field communication a cable communication, etc., and carrying out sending and receiving of data while making the game devices in sync with one another.

[Functional Configuration of Game Device]

Figure 3:
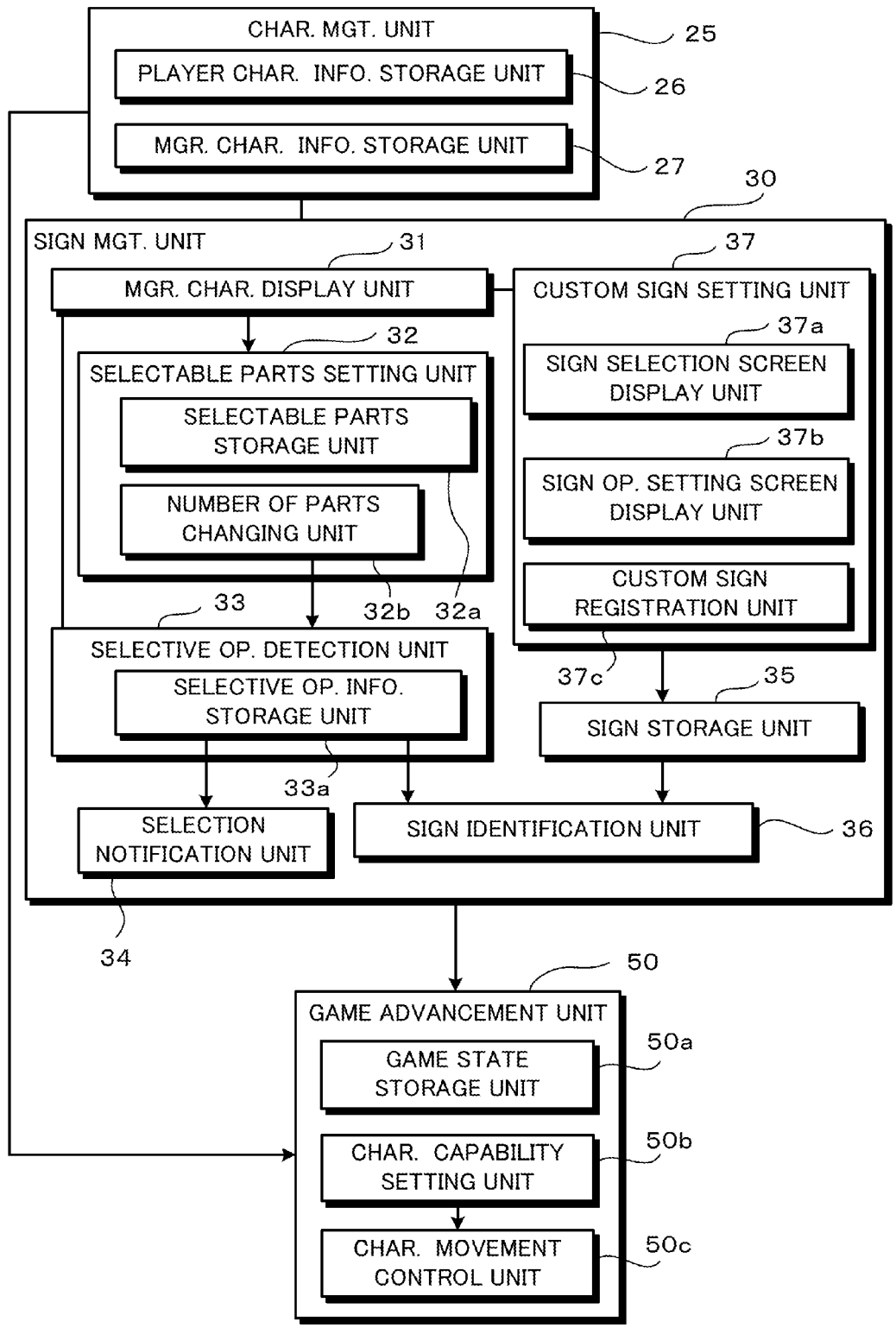
FIG. 3 is a function block diagram showing one example of the functional configuration of the game device.

Next, the essential function of the game device 1 having the foregoing constitution will be explained. FIG. 3 is a block diagram showing essential parts of the game device 1 shown in FIGS. 1 and 2.

As shown in FIG. 3, the game device 1 functionally comprises character management unit 25, sign management unit 30 (instruction management unit) and game advancement unit 50, and the respective units are realized by the control unit 10 executing the game program.

The character management unit 25 comprises a player character information storage unit 26 and a manager character information storage unit 27, and manages the image information and various types of data of the respective player characters and the manager character.

The player character information storage unit 26 stores, in a storage area of a non-volatile storage medium (foregoing auxiliary storage device 20 or the like), image information, profile information (player's name and performance such as batting average and earned run average) and player character information such as the capability values (capability values of velocity, control, stamina and so on if the player character is a pitcher, and capability values of batting power, running ability, fielding skill and so on if the player character is a fielder) of the respective player characters by associating such information with the identifying information (character ID) for uniquely identifying the respective player characters in the game. Moreover, the player character information storage unit 26 temporarily stores the player character information in the work area of the main storage device (foregoing RAM 12) as needed during the game.

The manager character information storage unit 27 stores, in a storage area of a non-volatile storage medium, image information, profile information and manager character information such as the capability value and empirical value of the manager character by associating such information with the identifying information (character ID) for uniquely identifying the manager character. Moreover, the manager character information storage unit 27 temporarily stores the manager character information in the work area of the main storage device as needed during the game.

The sign management unit 30 comprises a manager character display unit 31 (instructing character display unit), a selectable parts setting unit 32, a selective operation detection unit 33, a selection notification unit 34, sign storage unit 35 (instruction storage unit), a sign identification unit 36 (instruction identification unit) and a custom sign setting unit 37 (instruction operation setting unit).

The manager character display unit 31 displays, for instance, the manager character 70 on the screen of a touch panel unit 3 as shown in FIG. 9B based on the manager character information stored in the manager character information storage unit 27. Here, the manager character 70 only needs to be displayed on the screen when the player performs the operation of giving a sign. In addition, when the player performs the operation of giving a sign, it is desirable to pause the advancement of the game to secure the operation time for the player. Thus, the manager character display unit 31 of this embodiment displays the manager character 70 on the screen based on the operation of pausing the advancement of the game. As the operation for pausing the advancement of the game, for example, considered may be an operation of the player double-tapping an arbitrary position on the game screen. Otherwise, by displaying a manager display button at a predetermined area on the game screen, the advancement of the game can be paused and the manager character 70 can be displayed on the screen based on the operation of selecting the manager display button (touching the manager display button). Otherwise, the advancement of the game can be paused and the manager character 70 can be displayed on the screen by the player operating a physical button provided to the main body 2 of the game device 1 or a predetermined button of a controller that is provided separately from the game device 1.

The selectable parts setting unit 32 has the function of setting, as selectable parts, a plurality of predetermined areas of the manager character 70 displayed on the screen. As examples of the selectable parts of the manager character 70, as shown in FIG. 9B, the head 71 (cap if the manager character is wearing a cap), right shoulder 72 (or right upper arm), left shoulder 73 (or left upper arm), right hand 74 (or right lower arm), left hand 75 (or left lower arm), chest 76, belt 77 around the abdomen and the like, which are generally used when a manager in the real world gives a sign, may be used. Moreover, when giving a more complex sign, ear, chin and the like may also be added as selectable parts. Note that, with signs used in baseball, the respective parts of the upper body are mainly used upon giving signs, but the predetermined areas of the entire body of the manager character 70 may also be set as the selectable parts.

The selectable parts setting unit 32 comprises a selectable parts storage unit 32a and number of parts changing unit 32b. The selectable parts storage unit 32a stores, as shown in FIG. 4, identifying information (selectable part IDa) for uniquely identifying the respective selectable parts and a setup flag and the like in a storage device (foregoing auxiliary storage device 20, RAM 13 or the like) by associating such information with the respective selectable parts of the manager character. The setup flag is 1-bit information of "1" or "0", and represents that a selectable part has been set when the setup flag is "1" and that the setting has been cancelled when the setup flag is "0". The example of the table of FIG. 4 shows that the setup flag of "1" has been raised for IDa=1 (head), IDa=2 (right shoulder), IDa=3 (left shoulder), IDa=4 (right hand), IDa=5 (left hand), IDa=6 (chest) and IDa=7 (belt) and that these selectable parts were set, and that the setting of the selectable parts of IDa=8 (ear) and IDa=9 (chin) were cancelled. Accordingly, the CPU 11 can recognize which parts have been set as the selectable parts based on the selectable part ID and the setup flag assigned to the respective selectable parts.

The number of parts changing unit 32b has the function of changing the number of selectable parts to be set to the manager character. The number of parts changing unit 32b changes the number of selectable parts by switching the setup flag corresponding to the respective selective parts stored in the selectable parts storage unit 32a between "1" and "0". Depending on the player, there may be cases where the sign operation that needs to be learned upon initially playing the game is deemed difficult by the player, and there may be cases where the player may want to give a more complex sign once that player becomes familiar with the game. Thus, by enabling the change in the number of selectable parts of the manager character through the use of the number of parts changing unit 32b, the sign operations can be simplified or made more complicated according to the player's operation proficiency level. As a specific example, considered may be using only the five locations of IDa=1 (head), IDa=2 (right shoulder), IDa=3 (left shoulder), IDa=4 (right hand) and IDa=5 (left hand) as the target parts of the sign operations for beginner players, adding IDa=6 (chest) and IDa=7 (belt) as the target parts of the sign operations for average players, and further adding IDa=8 (ear) and IDa=9 (chin) as the target parts of the sign operations for experienced players. The change of the number of selectable parts can be arbitrarily set by the player on an option setting screen not shown.

The selective operation detection unit 33 detects that a selectable part (valid selectable part set by the selectable parts setting unit 32) of the manager character displayed on the screen has been selectively operated. The selective operation detection unit 33 is realized by the image processing unit 14 supplying, to the CPU 11, a selection signal showing that a selectable part has been selected when a finger or the like touches that selectable part displayed on the screen of the touch panel unit 3, and the CPU 11 recognizing the selection signal. Moreover, the selective operation detection unit 33 comprises a selective operation information storage unit 33a. The selective operation information storage unit 33a stores, in a storage device (RAM 13 or the like), selective operation information showing the contents of the selective operation when the plurality of selectable parts of the manager character 70 are selectively operated. For example, when the player selectively operates the selectable parts of the manager character 70 in the order of head→right shoulder→left shoulder, the selective operation information storage unit 33a stores, in a time series, IDa=1 (head), IDa=2 (right shoulder), and IDa=3 (left shoulder) as the values of the selectable part IDa.

The selection notification unit 34 notifies the player of the fact that the selectable parts have been selected by changing the display state of the selectable parts based on whether the selectable parts were selectively operated. As an example of changing the display state of the selectable parts based on whether the selectable parts were selectively operated, the brightness can be changed. For example, as shown in FIG. 9C, when the head 71 is selectively operated as a result of the player touching the head 71 of the manager character 70 with one's finger, a light-emitting display (illuminated display) state is realized by increasing the brightness of the display area of the head 71 to be brighter than before the selective operation, and the fact that the head 71 has been selectively operated is thereby clearly notified to the player. As other examples, the selective operation can be notified to the player by changing the color of the selectable parts or changing the shape of the selectable parts (for instance, by deforming the selectively operated parts) based on whether the selectable parts were selectively operated. Consequently, the player can easily understand that one's own selective operation has been validly recognized by the game device 1. In addition, since it is possible to clarify which part of the manager character 70 has been selected, the player can accurately and smoothly perform the series of selective operations.

The sign storage unit 35 stores, in a storage device (foregoing auxiliary storage device 20, RAM 13 or the like), associated information related to the selected order of the plurality of selectable parts and the sign (instruction). For example, as shown in FIG. 5, the sign storage unit 35 stores, in a storage device (foregoing auxiliary storage device 20, RAM 13 or the like), identifying information (sign IDb) for uniquely identifying the sign and information related to the selected order of the selectable parts upon associating such information with the sign as the instruction. In the example of the associated information table shown in FIG. 5, sign IDb=1 represents the sign for a hit-and-run, and the sign for the hit-and-run is associated with the following selected order of the selectable parts; namely, "head (1)→right shoulder (2)→left shoulder (3)". Here, the numbers shown in the parentheses of "head (1)→right shoulder (2)→left shoulder (3)" show the value of the selectable part IDa (refer to FIG. 4), and information related to the selected order of the selectable parts can be stored in a table as the alignment sequence of the values of the selectable part IDa. Similarly, the table shown in FIG. 5 stores various types of signs such as sign IDb=2 (bunt), IDb=3 (squeeze), IDb=4 (steal base), IDb=5 (wait), IDb=6 (pickoff), IDb=7 (slug bunt), IDb=8 (bunt shift), and IDb=9 (pitch out) upon being associated with the information related to the selected order of the selectable parts.

Moreover, as shown in FIG. 5, it is also possible to associate a valid flag with the respective signs and change the type of signs that can be used by the player by the sign management unit 30 switching the valid flag between "1" and "0". Consequently, for instance, it is possible to realize a game specification where the empirical value or capability value of the player as the manager increases upon winning the game, and the type of signs that can be used by the player increases as the foregoing empirical value or capability value increases.

Note that, as a variation of the game specification where the player is given advantages as the empirical value or capability value of the player as the manager increases, a game specification where the number of signs that the player can give during one game increases or the total time that can be used for giving signs during one game increases as the empirical value or capability value increases can also be adopted.

The sign identification unit 36 has the function of identifying, based on the associated information stored in the sign storage unit 35 (associated information table of FIG. 5), the sign corresponding to the selected order of the selectable parts when the plurality of selectable parts of the manager character are selectively operated by the player. In other words, when the selectable parts are selectively operated by the player, the sign identification unit 36 receives selective operation information (for instance, information showing that the operation was performed in the selected order of head→right shoulder→left shoulder) from the selective operation detection unit 33, and performs sign identification processing of identifying the sign corresponding to the selected order of the selective operation information (sign for "hit-and-run" when the selected order is head→right shoulder→left shoulder) based on the associated information table shown in FIG. 5. In addition, the sign identified by the sign identification unit 36 is activated, and that sign is reflected in the game by the game advancement unit 50.

Meanwhile, with blocking signals that are given in real baseball, there are those in which a key part is decided in advance, and the sign is decided according to the part that is touched after the key is touched. In order to also realize this kind of complex blocking signal using a key in a game, as shown in FIG. 4, a key flag may be added to the table stored in the selectable parts storage unit 32a. This key flag is information for setting one specific part among the selectable parts as the key part, and, in the example of FIG. 4, "head" as the selectable part in which the key flag is "1" is set as the key part.

As a result of setting a key part as described above, the sign identification unit 36 may identify the sign only based on the selective operation that is performed after the player touches the key part on the screen using one's finger or the like, and not include the selective operations that are performed before the player touches the key part in the operation for identifying the sign. For example, when selective operations are performed in the selected order of "right shoulder→left shoulder→head→chest→left hand→right shoulder", if the "head" is set as the key part, the sign is identified based only "chest→left hand→right shoulder" which are the selective operations performed after the player touches the "head". Note that the player can arbitrarily set, on an option setting screen not shown, whether to enable the complex blocking signal operation in which a key part is set. If a key part is not set, all key flags in the table of FIG. 4 may be set to "0".

Moreover, the foregoing manager character display unit 31 clears the manager character from the screen after the instruction is identified by the sign identification unit 36. The manager character display unit 31 of this embodiment is configured to display the manager character on the screen based on the operation of pausing the advancement of the game, and clear the manager character from the screen after the sign is identified by the sign identification unit 36, and this is effective in cases where the screen is relatively small as with the portable game device 1. In other words, with a game device which uses, as the game screen, a domestic television of a relatively large screen, it is also possible to constantly display the manager character on a screen position that will not interfere with the advancement of the game. Nevertheless, with the portable game device 1 with a relatively small screen, since the display space is limited, the small game screen can be effectively used by displaying the manager character on the screen only during the period that the player is performing operations for giving a sign.

The custom sign setting unit 37 shown in FIG. 3 allows the player to arbitrarily edit and set the contents of the sign operation (order of selecting the selectable parts corresponding to the respective signs) to one's own preference. The custom sign setting unit 37 has the function of updating and setting the associated information related to the selected order of the plurality of selectable parts and the sign stored in the sign storage unit 35, and, in order to realize this function, comprises a sign selection screen display unit 37a (instruction selection screen display unit), a sign operation setting screen display unit 37b (instruction operation setting screen display unit) and a custom sign registration unit 37c (registration unit).

Figure 11A:
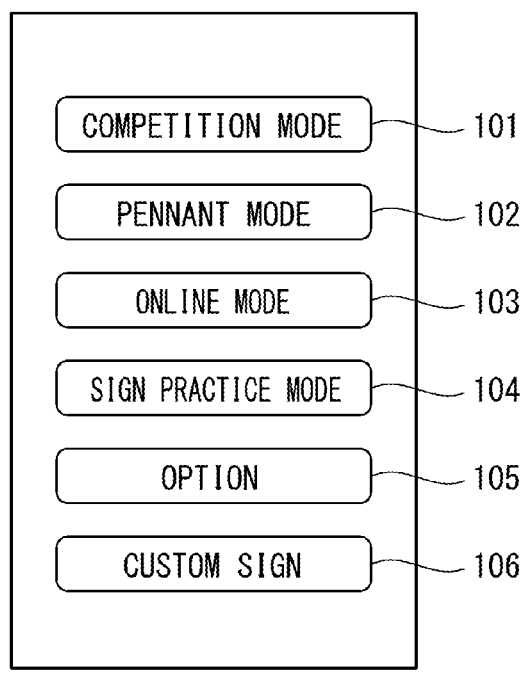
FIG. 11A is an explanatory view showing an example of an initial screen of the game device.
Figure 11B:
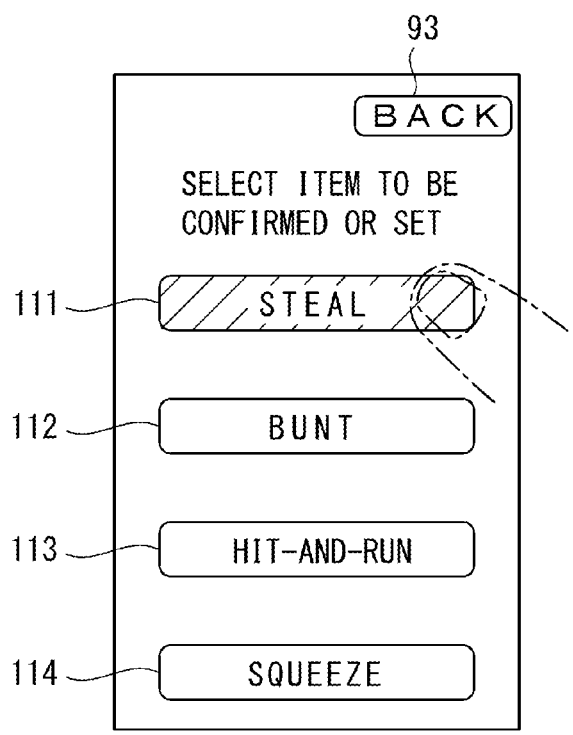
FIG. 11B is an explanatory view showing an example of a sign selection screen of the game device.

The sign selection screen display unit 37a displays, for instance, as shown in FIG. 11B, a sign selection screen for selecting a sign (steal base, bunt, hit-and-run, squeeze or the like) as the instruction on the touch panel unit 3. The player can select the signs to be customized on the sign selection screen (details will be described later).

The sign operation setting screen display unit 37b shown in FIG. 3 displays, on the touch panel unit 3, a sign operation setting screen comprising a plurality of settable areas corresponding to the plurality of selectable parts of the manager character. For example, as shown in FIG. 11D, the sign operation setting screen display unit 37b displays a sign operation setting screen including a manager character 70' comprising a plurality of settable areas 71' to 77' corresponding to the plurality of selectable parts (respective parts 71 to 77 of FIG. 9B) of the manager character. On the sign operation setting screen, for instance, as shown in FIG. 11E, the player can set the operation of the signs to be customized (set the order of selecting the plurality of parts) (details will be described later).

Figure 11C:
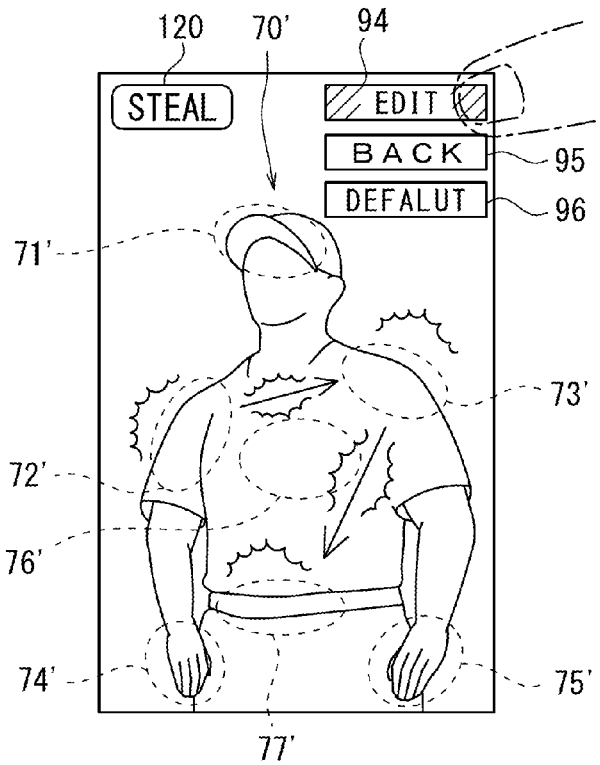
FIG. 11C is an explanatory view showing an example of a sign operation setting screen of the game device.
Figure 11D:
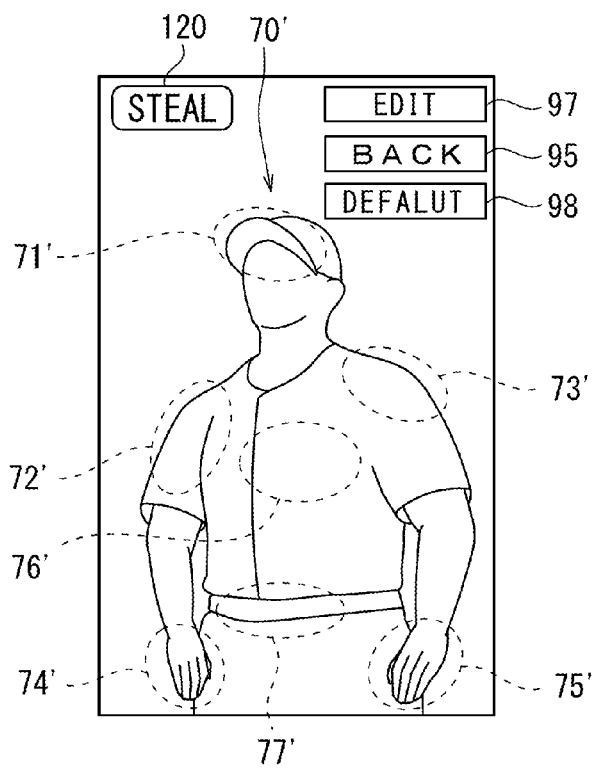
FIG. 11D is an explanatory view explaining a screen transition of the sign operation setting screen.
Figure 11E:
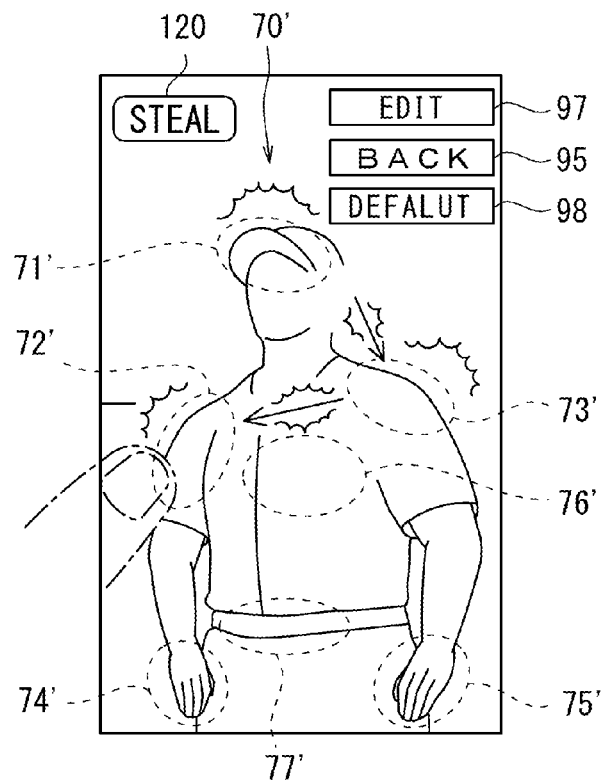
FIG. 11E is an explanatory view explaining a screen transition of the sign operation setting screen.

The custom sign registration unit 37c shown in FIG. 3 registers, as update information of the associated information stored in the sign storage unit 35 (associated information table of FIG. 5), the correspondence of the sign selected on the sign selection screen shown in FIG. 11B, and information related to the operation order of the plurality of settable areas that were selectively operated on the sign operation setting screen shown in FIG. 11E.

The game advancement unit 50 has the function of advancing the game by reflecting the sign identified by the sign identification unit 36 in the game. The game advancement unit 50 comprises a game state storage unit 50a, a character capability setting unit 50b, and a character movement control unit 50c.

The game state storage unit 50a stores, in a storage device, the game state such as the current inning, score, out count, ball count, whether there is a runner on base, and other information. The character capability setting unit 50b sets the capability of the player character by loading on the RAM 12 the capability values of the player character (capability values of batting power and the like) and causing the CPU 11 to recognize such capability values upon executing the game. The character movement control unit 50c controls the movement of the player character during the execution of the game based on the capability of the player character recognized by the CPU 11. In addition, the character movement control unit 50c also controls the movement of the target player character so that such player character moves according to the sign identified by the foregoing sign identification unit 36. For example, if the identified sign is a sign for hit-and-run, the target player characters are the batter character and the runner character, and the character movement control unit 50c performs control so as to cause the batter character bat and cause the runner character to run.

Figure 6:
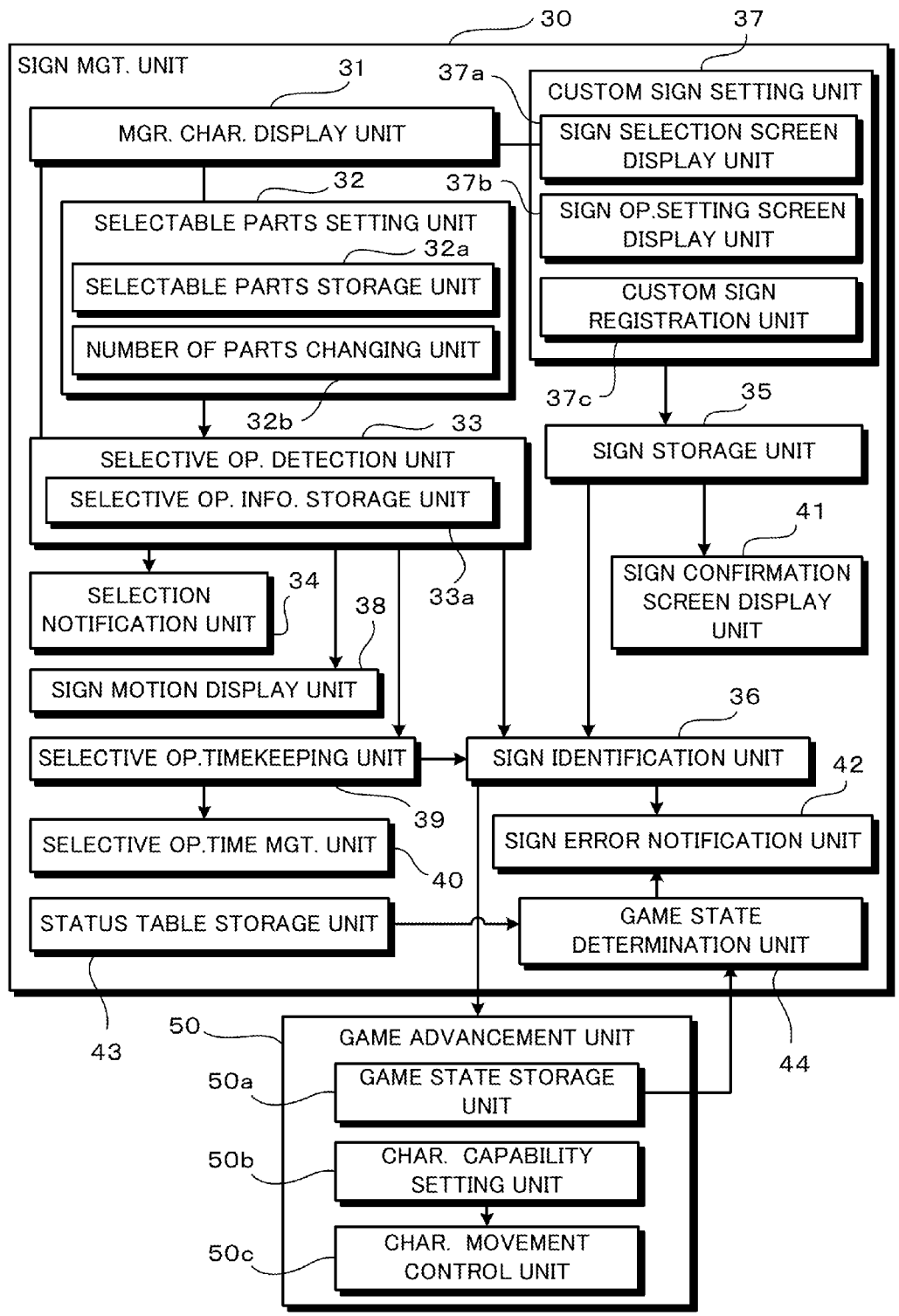
FIG. 6 is a function block diagram showing another example of the functional configuration of the game device.

Moreover, the sign management unit 30 may further comprise, as shown in FIG. 6, sign motion display unit 38 (instruction motion display unit), selective operation timekeeping unit 39, selective operation time management unit 40, sign confirmation screen display unit 41 (instruction operation confirmation screen display unit), sign error notification unit 42 (instruction operation error notification unit), status table storage unit 43 (situational judgment information storage unit) and game state determination unit 44.

The sign motion display unit 38 has the function of causing the manager character to perform a sign motion corresponding to the series of sign operations based on the selective operation information stored in the selective operation information storage unit 33a when the series of sign operations (selective operations) by the player is complete. This is the function of a video display where the manager character on the screen performs a realistic sign motion while moving one's hand, and the player can confirm, via video, the sign motion of the manager character corresponding to the sign operations performed by the player.

Moreover, the sign motion display unit 38 may also have the function of a video display where the manager character on the screen moves his/her hand to the selected based on the selective operation information stored in the selective operation information storage unit 33a each time the player selectively operation a selectable part of the manager character. In the foregoing case, each time the player performs a selective operation, the manager character on the screen reacts and engages in sign motion substantially in real time. Thus, the player can get a more realistic feel as a manger while perform realistic sign operations during the baseball game.

Moreover, the player can arbitrarily set, on an option setting screen not shown, whether to cause the manager character to engage in sign motion or perform the video display of the manager character substantially in real time each time the player performs a selective operation after the player completes the series of sign operations (selective operations). Meanwhile, when performing the video display of the manager character substantially in real time each time the player performs a selective operation as described above, the selectable part of the manager character on the screen will also move (for example, the manager character's right hand or left hand moves to the head, shoulder and other parts), and, for the player performing the sign operation, the complexity and difficulty of the sign operation will increase in comparison to the case where the manager character does not move during the sign operation. Thus, it is also possible to switch the setting according to the player's operation proficiency level such as adopting a setting where the manager character does not move during the sign operation for a player who is not familiar with the sign operation, and adopting a setting of performing a video display of the manager character substantially in real time each time the player performs a selective operation for a player who is familiar with the sign operation and wishes to give a more complex sign.

The selective operation timekeeping unit 39 time-keeps the sign operation time spent by the player (time spent by the manager character for performing the series of selection operations of the plurality of selectable parts). This timekeeping processing is realized, for example, by the CPU 11 counting the operation clock or via other methods. The timekeeping information obtained by the selective operation timekeeping unit 39 is used for setting a time limit to the player's sign operation. The advancement of the game is paused when the player is performing the sign operation, but if this interruption time is too long, the game advancement is delayed and the game becomes slow. Moreover, when playing a competition game with another player, the opponent player is forced to wait while the other player is performing the sign operation, and the amusement of the game could deteriorate if the opponent player is kept waiting too long. Thus, it is desirable to set a time limit to the player's sign operation.

The timekeeping information obtained by the selective operation timekeeping unit 39 is supplied to the sign identification unit 36. In addition, when the sign operation is completed before the time spent by the player for performing the sign operation (for instance, time elapsed from the time that the manager character appeared on the screen for the sign operation) elapses the predetermined time limit, the sign identification unit 36 deems that sign operation to be valid and performs the foregoing sign identification processing. Meanwhile, if the sign operation is not completed within the time limit, the player's sign operation is invalidated.

The selective operation time management unit 40 has the function of cumulatively manages the foregoing timekeeping information (information on the sign operation time) obtained by the selective operation timekeeping unit 39, and limiting the cumulative sign operation time per game. In other words, in addition to providing a time limit per sign operation, it is also possible to limit the total time that can be used for performing the sign operation in one game. In cases where players are playing a competition game, by setting an appropriate sign operation time that can be used in one game, it is possible to eliminate the feeling of unfairness between the players. In other words, during the game, if one player is performing sign operations at a moderate frequency, but the other player frequently and repeatedly interrupts the advancement of the game performing sign operations over and over, the former player may harbor a feeling of unfairness. However, if the total sign operation time per game is limited to an appropriate time, the time spent by one player waiting for the opponent to perform the sign operation will not increase drastically, and this will lead to the resolution of the feeling of unfairness. Moreover, if the total sign operation time per game is limited, the number of times that a sign can be given will increase if the signs are given quickly in a short period of time, but not many signs can be given if too much time is spent on the selective operation. Thus, this will motive the player to quickly perform the sign operations, and a fast and smooth game can be expected.

Meanwhile, in a real baseball game, it is assumed that the manager and the players understand and remember the signs. Similarly, in the baseball game of this embodiment also, it is assumed that the player remembers the sign operations before starting the baseball game. Nevertheless, there may be cases where the player forgets the sign operation during the game, or the player wishes to confirm the sign operation by way of precaution. In particular, if a player forgets the sign operation, the player is unable to use that sign during the game, and the amusement of the game may deteriorate. Thus, the sign confirmation screen display unit 41 has the function of displaying, on the touch panel unit 3, a sign confirmation screen for confirming the sign operation during the game. The advancement of the game is paused while this sign confirmation screen is being displayed.

As examples of the sign confirmation screen, there are the screen examples of FIG. 11B and FIG. 11C. These screens are screens that are common with the screens for setting the custom signs to be displayed on the touch panel unit 3 by the foregoing custom sign setting unit 37. When the player selects the sign to be confirmed (steal base, bunt, hit-and-run, squeeze or the like) on the screen of FIG. 11B, the screen changes to the screen of FIG. 11C, and the sign operation routine (contents regarding the order of selecting the selectable parts) corresponding to the selected sign is displayed. The screen of FIG. 11C shows an example where the manager character's right shoulder, left shoulder and belt are lit up, and an arrow showing the order of selection is displayed so that the player can understand the order of right shoulder→left shoulder→belt.

As an operation example of displaying the sign confirmation screen during the game, for example, if the game device 1 comprises an acceleration sensor and the player performs a waving operation (shake action) of the game device 1 during the game, the control unit 10 can detect the shake action and display the confirmation screen shown in FIG. 11B. Otherwise, the sign confirmation screen may also be displayed by the player operating a sign confirmation button displayed at a predetermined area on the game screen, a physical button provided to the main body 2 of the game device 1 or a predetermined button of a controller that is provided separately from the game device 1. Moreover, as an operation example after the sign confirmation, as a result of the player once again performing a waving operation (shake action) of the game device 1, the control unit 10 can detect the shake action and return to the original game screen. Note that, after the player confirms a sign during the game, it is likely that the player wants to give that sign immediately. Thus, based on a predetermined operation after the sign confirmation, it is also possible to directly change to the sign operation screen of FIG. 9B so that the player can immediately perform the sign operation.

Moreover, there may be cases where the player erroneously performs the sign operation. Thus, when the sign error notification unit 42 shown in FIG. 6 determines that the player made a sign operation error, the sign error notification unit 42 notifies the player of such sign operation error. In addition to displaying a message on the screen to the effect that a sign operation error has been made as the notifying operation of the sign error notification unit 42, it is also possible to perform display control of causing the manager character on the screen to show a gesture or expression of puzzlement. In addition, for example, various notifying operations such as a verbal notification of "sign operation error" or the like, notification via a predetermined alarm (buzzer sound or the like), or notification via vibration if the game device 1 is equipped with a vibration function may be adopted.

Here, one mode of the sign operation error is the player performing a sign operations in the selected order of the selectable parts not stored in the sign storage unit 35. In the foregoing case, since the sign identification unit 36 is unable to identify the sign, the sign error notification unit 42 consequently determines that a sign operation error has been made, and notifies the sign error to the player by performing the foregoing notifying operation.

Another mode of the sign operation error is a case where the sign operations are performed in the selected order of the selected parts stored in the sign storage unit 35, but the sign identified based on the sign operation is a sign that cannot be used in the current game state. For example, in a game state where there is no runner character on any base, the player performing a sign operation for stealing a base corresponds to the foregoing case. In order to determine the validity of the sign according to the game state as described above, for instance, a status table shown in FIG. 7 is provided.

Here, the status table shown in FIG. 7 is information that is stored by the status table storage unit 43 shown in FIG. 6 in a predetermined storage area of the storage device. This status table stores identifying information (sign IDb) for uniquely identifying the sign, a runner flag, and a third base runner flag upon associating such information with the sign as the instruction. The runner flag is a condition designation flag which has, as its essential requirement, the existence of a runner character on at least one of the bases among the first base to the third base, and, with respect to a sign in which the runner flag is set to "1" (hit-and-run, steal base, and pickoff in the example shown in FIG. 7), this shows that the sign will be deemed a sign operation error even if such sign is given when there is no runner character on any of the bases. Moreover, the third base runner flag is a condition designation flag which has, as its essential requirement, the existence of a runner character on third base, and, with respect to a sign in which the runner flag is set to "1" (squeeze in the example shown in FIG. 7), this shows that the sign will be deemed a sign operation error even if such sign is given when there is no runner character on third base. Note that, with respect to the signs in which the runner flag and the third base runner flag are set to "0", there is no particular designation of condition.

The game state determination unit 44 shown in FIG. 6 determines whether the sign identified by the sign identification unit 36 can be used in the current game state based on the current game state stored in the game state storage unit 50*a* of the game advancement unit 50, and the status table shown in FIG. 7 stored in the status table storage unit 43. Here, when the game state determination unit 44 determines that the identified sign is a sign that cannot be used in the current game state, the game state determination unit 44 supplies information showing that the sign cannot be used to the sign error notification unit 42. In addition, when the sign error notification unit 42 receives information showing that the sign cannot be used from the game state determination unit 44, the sign error notification unit 42 determines that a sign operation error has been made, and notifies the sign error to the player by performing the foregoing notifying operation. In the foregoing case, the sign error notification unit 42 may notify the specific contents of the sign operation error to the player such as by, for instance, displaying a message on the screen to the effect of "A sign for base-stealing cannot be used without a runner".

Moreover, the game device 1 additionally comprises image storage unit not shown for storing various image data (for instance, bat object, ball object and background image of a baseball field and so on) which are required for realizing the present baseball game. As the background image data of the baseball field, for example, adopted may be image data that is created in advance by projecting a virtual three-dimensional model prepared in advance within a virtual three-dimensional space from a predetermined viewpoint.

[Operation of Game Device]

Figure 8:
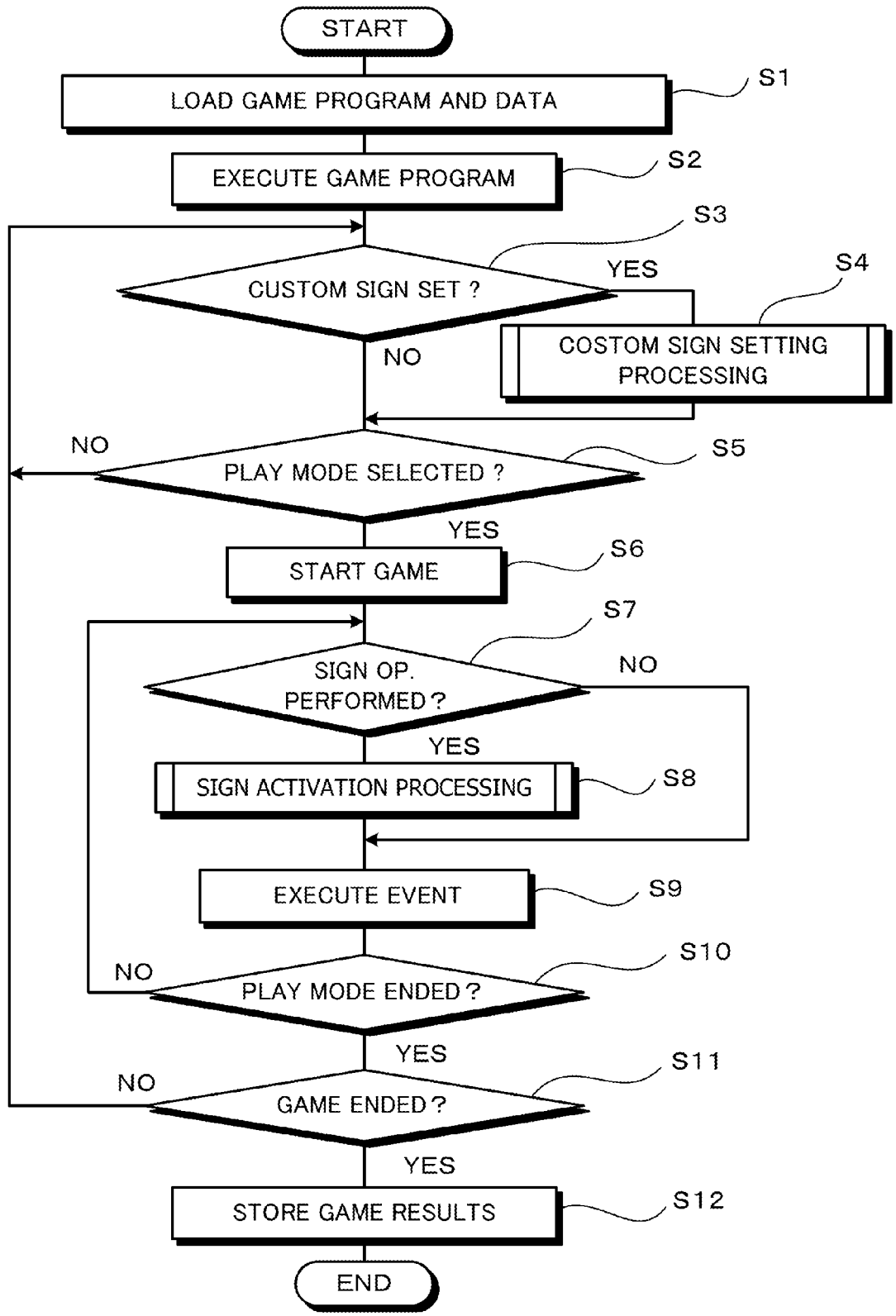
FIG. 8 is a flowchart showing one example of the processing by the game device.

In the foregoing configuration, an operational example of the game device 1 according to an embodiment of the present invention is now explained with reference to the flowchart of FIG. 8.

When the start button of the baseball game is pressed in the game device 1, a game program is loaded to the RAM 13 from the auxiliary storage device 20 such as a hard disk drive storing that game program (S1). Here, various types of basic game data which are required for executing the baseball game are also loaded to the RAM 13 from the ROM 12 or the auxiliary storage device 20 (S1). Consequently, the game program and the basic game data are recognized by the CPU 11 of the game device 1. Here, as the basic game data, included are data concerning the various types of images for use in a three-dimensional game space (for instance, image data of the baseball stadium in the game, image data of the respective player characters, image data and various types of objects, and so on), and position coordinate data for arranging, in the three-dimensional game space, the data concerning the various types of images for use in a three-dimensional game space.

Subsequently, the CPU 11 of the game device 1 executes the game program based on the basic game data stored in the RAM 13 (S2). When the game program of a baseball game is activated, for instance, an initial screen as shown in FIG. 11A is displayed on the touch panel unit 3, and various types of settings for executing the baseball game can be made. This game device 1 has a plurality of play modes including, for example, a competition mode of selecting a specific team among 12 teams (or 30 teams for a game based on the major leagues) and playing one game against a computer, a pennant mode of selecting a specific team among 12 teams and fighting a pennant race of a predetermined number of games, and an online mode of playing against another player via the internet. In addition, the initial screen also displays a competition mode button 101, a pennant mode button 102, an online mode button 103 and the like for selecting the play mode. Moreover, each play mode includes a manager mode (simulation mode) where the player gathers the player characters to form one's own team and plays the baseball game in the position as a manager, and an action mode where the player performs the operations of batting, pitching and the like of the respective player characters, and the player may choose the mode of one's preference.

Moreover, a sign practice mode button 104, an option button 105, a custom sign button 106 and the like are also displayed on the initial screen of FIG. 11A. The sign practice mode button 104 is a button for the player to select the sign practice mode for practicing the sign operation. In the sign practice mode, the specification is such that the player can obtain a high score by quickly and accurately performing the sign operations, and the player can effectively master the sign operations in an enjoyable manner before starting the baseball game. The option button 105 is a button for calling the option setting screen not shown, and, with the option setting screen, the player can perform various types of settings such as changing the foregoing number of selectable parts or setting a key part. The custom sign button 106 is a button for calling the screen for customizing the signs with the foregoing custom sign setting unit 37, and the routine proceeds to the custom sign setting processing (S4) when the custom sign button 106 is selected (YES in S3 of FIG. 8). Details of the custom sign setting processing will be explained later.

When one of the play modes is selected on the initial screen of FIG. 11A (YES in S5 of FIG. 8), the game is started after the required settings are made in the selected mode (S6). Here, the ensuing explanation is continued on the assumption that the play mode of playing one game against a computer based on the manager mode has been selected. In this play mode, the game is started after the player performs settings such as selecting the player characters and forming one's own team (S6).

In addition, during the game, the player executes various strategies as a manager by performing sign operations and giving instructions to the player characters via the manager character. For example, the player causes a runner character to steal a base by giving a sign for base-stealing, or causes a batter character to bunt by giving a bunt sign so as to advance the runner character. When the foregoing sign operations are performed by the player (YES in S7), the sign activation processing is executed (S8). Details of the sign operations performed by the player during the game and details of the sign activation processing (S8) will be explained later.

Moreover, during the game, according the automatic control by the CPU 11 based on an AI (Artificial Intelligence) program, the game advancement unit 50 advances the game by executing various events such as pitching by a pitcher character, batting by a batter character, catching and throwing by a fielder character, and base-running by a runner character (S9). When the foregoing sign activation processing of S8 is executed, the game advancement unit 50 advances the game by reflecting the sign (instruction) in the game. For example, when a sign for hit-and-run is activated (when a command of hit-and-run is executed), the game advancement unit 50 performs control for causing the batter character to bat and causing the runner character to run.

Subsequently, the CPU 11 determines whether the current play mode has ended (S10), and loop processing of repeating S7 to S10 is performed until the play mode is ended. In addition, when the current play mode is ended (YES in S10), a screen not shown for selecting whether to end the baseball game is displayed on the touch panel unit 3. When the player selects to end the baseball game on this screen (YES in S11), the CPU 11 executes processing for ending the baseball game, and the game results are stored in a non-volatile recording medium (auxiliary storage device 20) such as a hard disk (S12). Meanwhile, if the player selects to continue the baseball game (NO in S11), the initial screen is displayed and the routine proceeds to S3.

Details of the sign operations performed by the player during the game and details of the subroutine of the sign activation processing (S8) are now explained with reference to the screen-transition diagrams of FIG. 9A to FIG. 9G and the flowchart of FIG. 10.

FIG. 9A shows an example of a game screen during the game. Displayed on this game screen are a batter character 81, a pitcher character 82, a runner character 83, and so on. In addition, according to the automatic control by the CPU 11 based on the AI program, the game advancement unit 50 decides the pitching zone and type of pitch to be thrown by the pitcher character 82 and causes the pitcher character 82 to pitch, and displays the movement of a ball object based on a trajectory corresponding to the decided pitching zone and type of pitch. Moreover, the game advancement unit 50 causes the batter character 81 to hit the bat object at a predetermined timing, and, when the ball object and the bat object overlap, decides the direction and power of the hit ball according to the overlapping manner, and displays the movement of the hit ball (ball object) based on a trajectory corresponding to the decided direction and power. Moreover, the game advancement unit 50 causes the runner character 83 to run according to the situation such as when the batter character 81 hits the ball object.

Moreover, the game screen shown in FIG. 9A also displays a runner display area 84, a batter profile display area 85, a pitcher profile display area 86, a game state display column 87, a TIME button 88, and so on. The runner display area 84 is a predetermined display area for displaying the runner character 83 when the runner character 83 is on base. The batter profile display area 85 is an area for displaying the profile of the batter character 81 at bat such as the uniform number, name, batting average, homeruns, RBI and other information related to that batter character 81, and, for instance, is displayed at the bottom of the screen. The pitcher profile display area 86 is an area for displaying the profile of the pitcher character 82 on the mound such as the name, earned run average, strikeouts and other information related to that pitcher character 82, and, for instance, is displayed at the top of the screen. The game state display column 87 is an area for displaying the game state such as the current inning, scores of both teams, ball count and other information, and, for instance, is displayed at the upper right corner of the screen. When the TIME button 88 is touched with a finger or the like, the screen changes to a TIME screen where operations for using a pinch hitter, a pinch runner or the like can be performed.

When the player wishes to give a sign during the game, for instance, the player double taps an arbitrary position on the game screen of FIG. 9A. Consequently, the subroutine of the sign activation processing shown in FIG. 10 is started, the game advancement is paused (S21), and, for instance, the manager character 70 is displayed on the game screen shown in FIG. 9B (S22). With the screen of FIG. 9B, the manager character 70 is superposed and displayed at the front with the game screen as the background. This composite display can be realized by, for example, -blending the image of the game screen when the double tap was performed and the image of the manager character 70 based on a coefficient (a value). In the foregoing case, the manager character 70 can be superposed and displayed opaquely or semi-transparently according to the a value, but in this example the manager character 70 is opaque. The screen display of the manager character 70 is executed by the manager character display unit 31 of FIG. 3.

In addition, the selectable parts setting unit 32 sets, as the selectable parts, a plurality of predetermined areas of the manager character 70 displayed on the screen based on, for instance, the table of FIG. 4 (S23). The screen example of FIG. 9B shows an example where the respective parts of head 71, right shoulder 72, left shoulder 73, right hand 74, left hand 75, chest 76, and belt 77 are set as the selectable parts.

Note that, in the screen example of FIG. 9B, the respective selectable parts 71 to 77 such as the head 71 and the right shoulder 72 are shown with a broken line for the sake of convenience, the broken lines are not displayed on the actual screen. This is because the predetermined areas of the manager character 70 are decided in advance as the selectable parts 71 to 77 and the player also recognizes the predetermined areas, there is hardly any need for displaying the selectable parts 71 to 77 in a manner of being differentiated from the other parts on the foregoing screen. In addition, in order to perform sensory operations of blocking signals while feeling like a manager, it is preferable to display the manager character 70 in a natural state without differentiating the selectable parts 71 to 77 from the other parts. However, it is also possible to display the selectable parts 71 to 77 of the manager character 70 in a manner of being differentiated from the other parts on this screen.

The screen of FIG. 9B also displays a cancel button 90. The cancel button 90 is a button for cancelling the sign operation, and, when the cancel button 90 is selected, the manager character 70 is cleared from the screen without the sign being activated, and the game is thereby resumed.

Moreover, the selective operation timekeeping unit 39 shown in FIG. 6 starts the timekeeping process from the time that the manager character 70 is displayed on the screen in order to time-keep the sign operation time (selective operation time).

When the player selectively operates the selectable parts (touches an area displaying the selectable part with one's finger or the like) on the screen displaying the manager character 70, the selective operation detection unit 33 detects such selectable operation (YES in S24), and notifies the player of the fact that a selectable part has been selected by lighting up the selectively operated part or via other methods (S25). FIG. 9C shows an example where the player foremost selectively operated (finger-tapped) the head 71 among the plurality of selectable parts, and the display area of the head 71 is thereby illuminated. Moreover, information that the head 71 has been selectively operated is stored in the selective operation information storage unit 33a (S25).

After S25, whether the time limit has lapsed (S26) and whether the series of selective operations (sign operations) has ended (S27) are determined by the sign management unit 30, and the loop processing of repeating S24 to S27 is executed.

FIG. 9D shows a screen example where the player selectively operated (finger-tapped) the right shoulder 72 subsequent to the head 71. On this screen, the display areas of both the selectively operated head 71 and right shoulder 72 are lit up, and an arrow showing the order is also displayed between the head 71 and the right shoulder 72 so that the order of selection from head 71→right shoulder 72 is evident. Note that, as the display for showing the order that the parts were selected, in substitute for displaying an arrow, for instance, it is also possible to display a band of light that flows in one direction from the head 71 to the right shoulder 72. Moreover, FIG. 9E shows a screen example where the player selectively operated the left shoulder 73 subsequent to the right shoulder 72. On this screen, the respective display areas of the selectively operated head 71, right shoulder 72 and left shoulder 73 are lit up, and an arrow showing the order is displayed respectively between the head 71 and the right shoulder 72 and between the right shoulder 72 and the left shoulder 73 so that the order of selection from head 71→right shoulder 72→left shoulder 73 is evident.

When a plurality of selectable parts are selectively operated, as a method of displaying a screen so that the selected order of the respective parts is evident, in addition to displaying an arrow as described above, it is also possible to use different colors for lighting up the parts according to the selected order. For example, the selected order can be notified to the player based on color coding such as lighting up the part that was selectively operated first in red, lighting up the part that has been selectively operated second in blue, and lighting up the part that was selectively operated third in yellow, respectively. As yet another method, the selected order can be notified to the player by superposing numbers or symbols showing the order such as "1", "2", "3" or "A", "B", "C" on the respective selectable parts that were selectively operated.

Figure 9F:
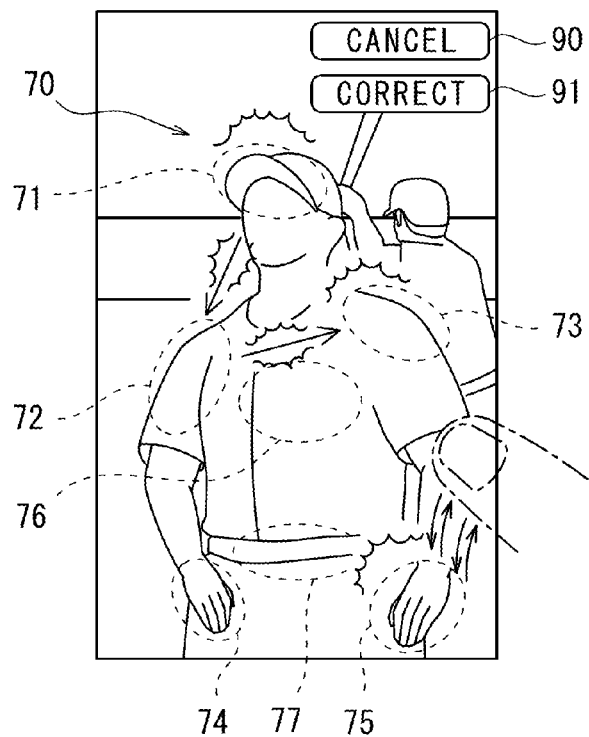
FIG. 9F is an explanatory view explaining a screen transition of the sign operation screen.
Figure 10:
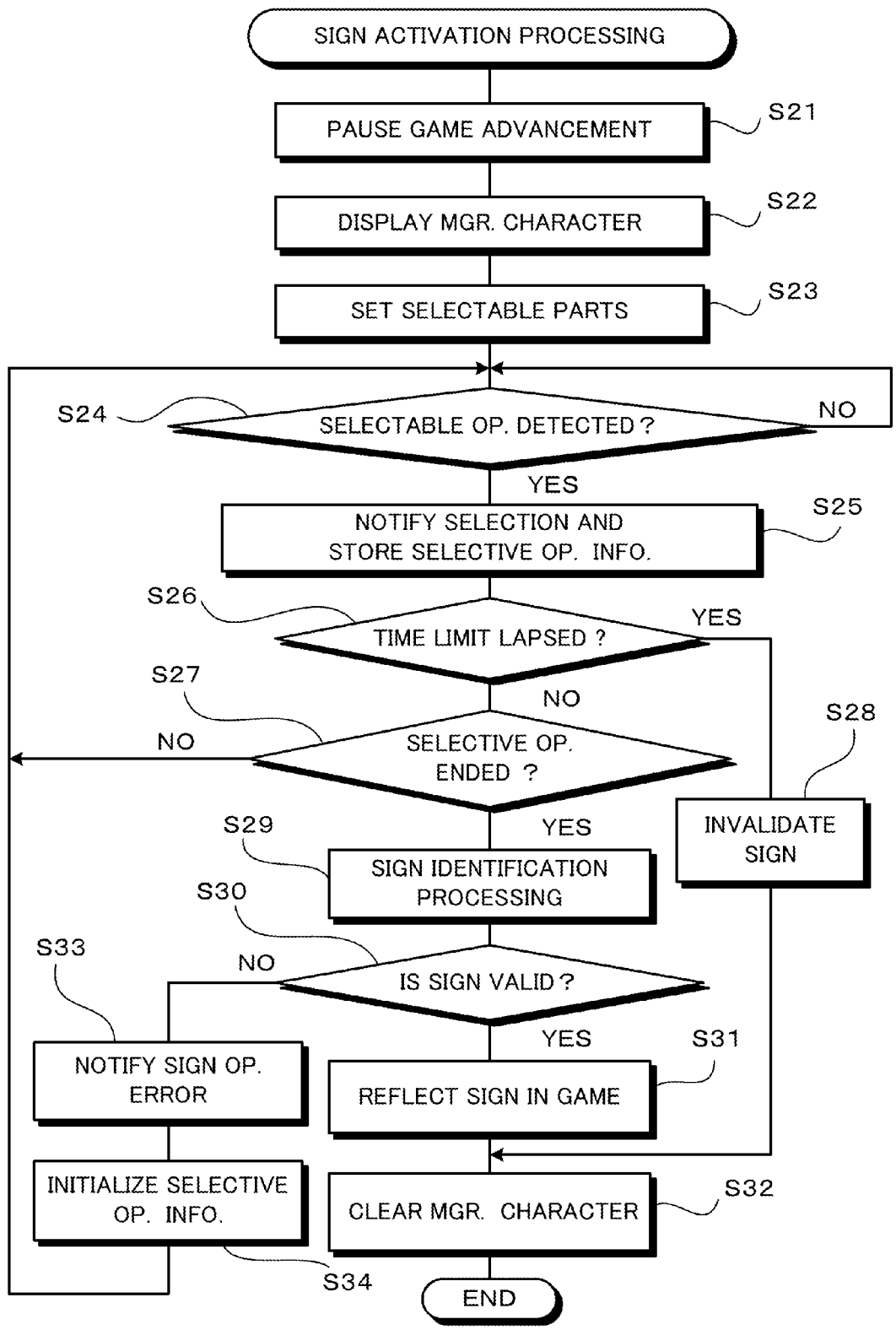
FIG. 10 is a flowchart showing one example of a sign activation processing of the game device.

In addition, after the player completes selecting all selectable parts configuring the sign, for instance, as shown in FIG. 9F, the series of selective operations (sign operations) is ended when the player ultimately double-taps the left hand 75 of the manager character 70.

If the player makes a mistake in the order of selecting the selectable parts or wishes to correct the sign, the player can clear the previous selective operations, for instance, by double-tapping an arbitrary position other than the manager character 70 on the screen before ultimately double-tapping the left hand 75, and return to the screen of FIG. 9B. Moreover, the screens of FIG. 9C and FIG. 9D also display a correction button 91, and each time the correction button 91 is pushed, the immediately preceding selective operation can be cancelled and corrected. Note that, in addition to the correction based on the correction button 91, for example, if the game device 1 comprises an acceleration sensor and the player performs a waving operation (shake action) of the game device 1, the control unit 10 can detect the shake action and cancel and correct the immediately preceding selective operation.

The foregoing series of selective operations (sign operations) must be performed within a time limit from the time that the manager character 70 is displayed on the screen, and if the time limit elapsed before the player completes all sign operations (YES in S26 of FIG. 10), the previously performed sign operations are invalidated (S28). In the foregoing case, the manager character 70 is cleared from the screen (S32), the screen returns to the game screen of FIG. 9A, and the game is resumed without the sign being activated.

When the foregoing series of selective operations is completed within the time limit (NO in S26 and YES in S27), the sign identification processing is performed by the sign identification unit 36 (S29). In the example of FIG. 9D, the selective operation is performed in the order of the manager character 70's head 71→right shoulder 72→left shoulder 73, and in the foregoing case, the sign identification unit 36 identifies the sign for "hit-and-run" based on the associated information table shown in FIG. 5.

After S29, the sign management unit 30 determines the validity of the sign (S30). Here, when the sign identified by the sign identification unit 36 is valid in view of the game state such as the existence of a runner character (YES in S30), the game advancement unit 50 activates the sign and reflects the sign in the game (S31). In the foregoing case, the manager character 70 is cleared from the screen (S32), and the game is resumed in a state where the sign has been activated.

Figure 9G:
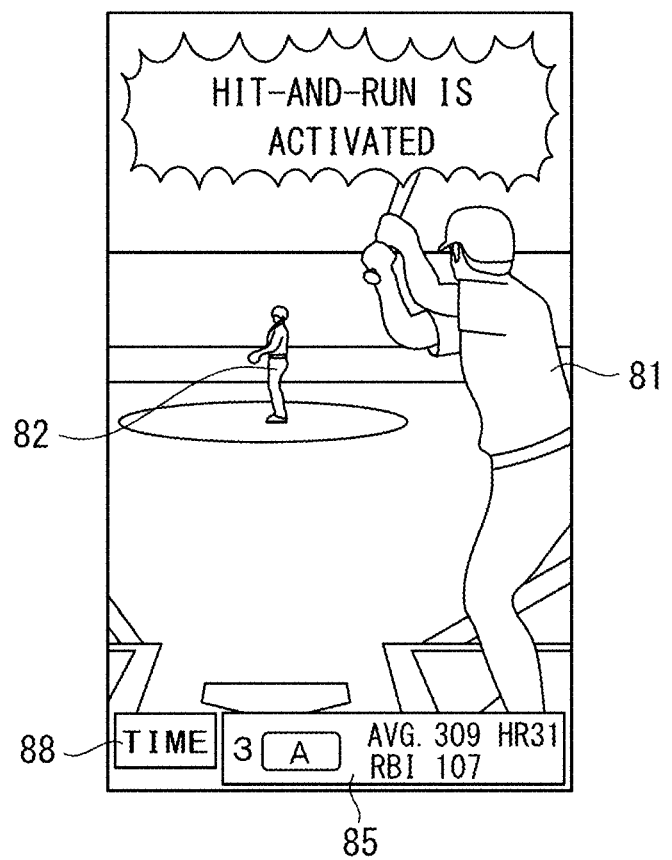
FIG. 9G is an explanatory view explaining a screen transition of the sign operation screen.

When the sign is validly activated, for example, as shown in FIG. 9G, a message of "hit-and-run activated" or the like is displayed on the screen for a predetermined time (for instance, 2 to 3 seconds) so that the player can visually recognize the validity of the sign. Otherwise, in substitute for displaying the message of FIG. 9G, for example, it is also possible to allow the player to visually recognize that the sign has been validly activated by the manager character 70 clapping both hands on the screen. Otherwise, in substitute for displaying the message of FIG. 9G, it is also possible to allow the player to visually recognize that the sign has been validly activated by the sign motion display unit 38 (refer to FIG. 6) displaying, on the screen, the manager character 70's sign motion corresponding to the series of sign operations (movement where the manager character 70's hand mover in the order of head 71→right shoulder 72→left shoulder 73).

Meanwhile, when the sign operations are performed in a selected order of the selectable parts not stored in the sign storage unit 35, the sign identification unit 36 is unable to identify the sign in S29, and it is determined that the sign is invalid (NO in S30). Otherwise, for instance, when the player performs sign operations for a "hit-and-run" or the like in a game state without any runner characters, it is also determined that the sign is invalid (NO in S30). When the sign is determined as being invalid as described above, the sign error notification unit 42 notifies the player of the sign operation error by displaying a message on the screen to the effect that a sign operation error has been made (S33). In the foregoing case, the selective operation information stored in the selective operation information storage unit 33a is initialized (S34), the screen changes to the screen of FIG. 9B so that the sign operations can be performed from the beginning once again, and the routine returns to the processing of S24.

Note that, in the foregoing example, the CPU 11 determines the end timing of the series of sign operations by the player ultimately double-tapping the left hand 75 of the manager character 70 as shown in FIG. 9F. However, for example, the CPU 11 can also determine such end timing by the player pressing an end button not shown. Moreover, as shown below, it is also possible to perform the sign identification processing when the selective operation of al selectable parts configuring the sign is complete, without performing any special operation showing the end of the operation at the end of the series of sign operations, and thereby active the sign. In other words, when the number of selectable parts configuring the sign is n selectable parts, the CPU 11 may determine that the series of sign operations is complete when the n-th selectable part is selectively operated (for example, when n=3, when the three parts of head 71→right shoulder 72→left shoulder 73 are selectively operated), and the sign identification processing may be performed immediately thereafter.

Moreover, rather than starting the sign identification processing after it is determined that the series of sign operations is complete, the configuration may be such that the sign identification unit 36 determines whether the sign corresponding to the sign operation exists in the associated information table of FIG. 5 each time a selectable part is selected in the sign operation, and completing the sign identification processing when the corresponding sign is discovered. In the foregoing case, the determination of the completion of the series of sign operations and the completion of the sign identification processing will be simultaneous.

When a special operation showing that the operation is complete is required at the end of the series of sign operations, there is an advantage in that the sign operation can be freely corrected until that special operation is performed. Moreover, when a special operation is not required at the end of the series of sign operations, there is an advantage in that a quick sign operation can be realized.

Moreover, in the screen-transition example of FIG. 9A to FIG. 9G, an example of selectively operating three different parts in the order of head 71→right shoulder 72→left shoulder 73 was shown, but a sign operation of selecting the same part a plurality of times is also possible. For example, a sign operation of selecting the head twice such as in head→belt→head is also possible. The selected order of head→belt→head corresponds to the sign for a "slug bunt" in the associated information table of FIG. 5. Moreover, the same part may also be selected a plurality of times in succession. For example, a sign operation of selecting the head twice in a row such as in head→head→chest is also possible. The selected order of head→head→chest corresponds to the sign for a "pickoff" in the associated information table of FIG. 5.

As described above, in this embodiment, since the player can selectively operate a plurality of selectable parts of a manager character displayed on the screen and give various signs corresponding to the selected order thereof, the sensory operation of the manager's blocking signal can be realized in a baseball game. Thus, the player can enjoy the sign operation itself and play the baseball game as though the player has become an actual manager. Moreover, in this embodiment, the various signs can be activated in a state of keeping the processing load low in comparison to conventional configurations (configurations of Patent Documents 1 to 4). In other words, conventionally, since image recognition processing of the trajectory geometry needs to be performed, and consideration must be given to the blurring of the trajectory plotting performed by the player, the load of the processing unit (CPU or the like) will increase. Meanwhile, with the game device 1, since the selectable parts of the manager character are set in advance to the predetermined areas such as the head, both shoulders, and both hands, the sign can be easily identified only from the selected order thereof. Moreover, with respect to the identification of the sign, whether predetermined selectable parts have been selectively operated is important, and there is no need to give consideration to the blurring of the trajectory plotting caused by hand movement as with conventional technologies. Consequently, with the game device 1, the processing load of the CPU can be inhibited to be lower than conventional technologies. Moreover, since the selectable parts of the manager character are set in advance to predetermined areas such as the head, both shoulders, and both hands, the manager character can be moved on the screen to the extent that it will not interfere with the selective operation of the selectable parts by the player. For example, as described above, it is also possible to perform a video display where the manager character moves his/her hand to the selected each time the player selectively operation a selectable part of the manager character. Accordingly, with this embodiment, without limitation to a display presentation where the screen becomes fixed during the sign operation via the manager character and impairs the game amusement, various images can be displayed during the sign operation. Consequently, the game device 1 realizes sensory input operations such as giving blocking signals and a highly amusing game without impairing the freedom of image presentation while reducing the processing load.

Details of the custom sign setting operation by the player before starting the game and details of the subroutine of the custom sign setting processing (S8 of FIG. 8) are now explained with reference to the screen transition diagrams of FIG. 11A to FIG. 11G and the flowchart of FIG. 12.

When the custom sign button 106 is selected on the initial screen shown in FIG. 11A, the sign selection screen display unit 37a displays, for instance, the sign selection screen shown in FIG. 11B on the touch panel unit 3 (S41). On this sign selection screen, displayed are sign selection buttons such as steal base 111, bunt 112, hit-and-run (hit-and-run) 113, squeeze 114 and the like, and the player can select the sign to be customized according to one's preference. Note that the items of signs that are not displayed on this screen can be displayed, for example, by operating a scroll bar not shown, or performing a drag operation of dragging one's finger which is touching the screen. Moreover, when a BACK button 93 displayed on this sign selection screen is selected (S42), the screen returns to the initial screen shown in FIG. 11A, and the custom sign setting processing is ended.

When an arbitrary sign selection button is selected by the player on the sign selection screen of FIG. 11B (YES in S43), information related to the selected sign is temporarily stored by the custom sign setting unit 37 in a storage device such as the RAM 13 (S44), and the sign operation setting screen display unit 37b displays, for example, the sign operation setting screen shown in FIG. 11C on the touch panel unit 3 (S45). Displayed on this sign operation setting screen is a manager character 70' comprising a plurality of settable areas 71' to 77' corresponding to the plurality of selectable parts (respective parts 71 to 77 of FIG. 9B) of the manager character.

As the image of the manager character 70' displayed on the sign operation setting screen of FIG. 11C, the image of the manager character 70 that is common with (same as) the image of the manager character 70 displayed on the sign operation screen of FIG. 9B is used. However, the images 70 and 70' may be caused to differ. For example, while the sign operation screen of FIG. 9B is not of a display state where the selectable parts 71 to 77 of the manager character 70 are differentiated from the other parts, the sign operation setting screen of FIG. 11C may be a display state where the settable areas 71' to 77' are differentiated from the other parts. This is because the sign operation screen of FIG. 9B is a screen for performing sign operations during the game and it is preferable to display the manager character 70 naturally without differentiating the selectable parts 71 to 77 from the other parts for the player to perform a sensory operation of blocking signals while feeling like a manager, but the screen of FIG. 11C is a screen for setting the sign operations, and the clear display state of the settable areas 71' to 77' is ensured to give preference to facilitate the player's performance of the setting operations.

Immediately after the screen is changed from the sign selection screen of FIG. 11B to the sign operation setting screen of FIG. 11C, the currently set sign operation routine is displayed relative to the sign that was selected on the sign selection screen (note that the game device 1 is pre-set with a default sign operation order, and a default sign operation order is displayed even when the player has never performed the custom sign setting). The screen examples of FIG. 11B and FIG. 11C show a state where the player selected the sign for base-stealing by touching the sign selection button of steal base 111 with one's finger on the sign selection screen of FIG. 11B, the screen consequently changed to the sign operation setting screen of FIG. 11C, and the sign operation routine of the currently set steal base sign is displayed. Here, the sign operation routine is displayed on the sign operation setting screen in the same display state as the sign operation screen of FIG. 9E. In other words, in the screen example of FIG. 11C, the respective parts of a right shoulder 72', a left shoulder 73' and a belt 77' are lit up, and an arrow showing the order of the selective operations is displayed between the respective parts so that the player can clearly and easily visually recognize the sign operation routine of "right shoulder→left shoulder→belt" on the screen.

Displayed on the sign operation setting screen of FIG. 11C are a sign item display area 120 displaying the selected sign item, and the respective buttons of an edit button 94, a BACK button 95, and a default button 96. The edit button 94 is a button for editing the currently set sign operation. The BACK button 95 is a button for returning to the immediately previous screen (FIG. 11B). The default button 96 is a button for calling the pre-set default sign operation routine on the screen, and, when this button is selected, the default sign operation routine is displayed in substitute for the currently set sign operation routine. Note that when the current setting is a default setting, the default button 96 may also be displayed in a non-selectable state (gray display with low brightness or the like).

Meanwhile, with respect to the default sign operation routine, it is also possible to decide the default in advance as being a plurality of sign operation routines of different complexity levels (for instance, three levels of sign operation routines of easy, normal and difficult), and, when the player is to use the default sign operation routine, the player may select the default sign operation routine according to that player's proficiency level of performing sign operations.

When the player selects the edit button 94 on the sign operation setting screen of FIG. 11C (YES in S47 of FIG. 12), the screen changes to the sign operation setting screen of FIG. 11D. On the screen of FIG. 11D, the display of the sign operation routine of the previous screen is cleared, and the player can newly customize the sign operation routine. In addition, the custom sign setting unit 37 determines whether the settable areas 71' to 77' of the manager character 70' have been selectively operated by the player (S48). In addition, the custom sign setting unit 37 temporarily stores, in a storage device such as the RAM 13, information related to the selective operation as information related to the sign operation routine each time one of the settable areas 71' to 77' is selectively operated (S49).

The screen of FIG. 11E shows an example of a state where the respective parts are selectively operated in the order of head 71'→left shoulder 73'→right shoulder 72' by the player on the sign operation setting screen, the respective parts of head 71', left shoulder 73' and right shoulder 72' are lit up, and an arrow showing the order of selective operations is displayed between the respective parts. The sign operation setting screens of FIG. 11D and FIG. 11E also display a registration button 97 and a correction button 98 in addition to the foregoing sign item display area 120 and the BACK button 95. The registration button 97 is a button for registering the sign operation after the routine input of the series of sign operations is complete. Moreover, the correction button 98 is a button for correcting the selective operations of the settable areas 71' to 77', and one previous selective operation can be cancelled one by one each time this button is pressed.

Figure 11F:
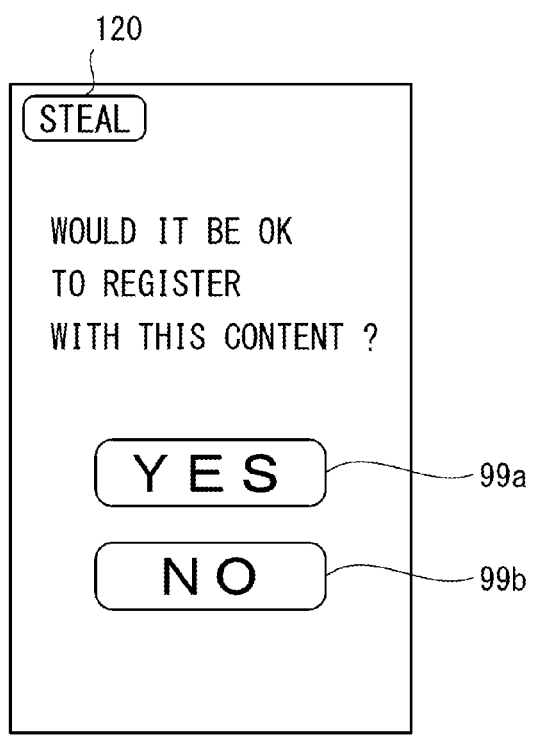
FIG. 11F is an explanatory view explaining a screen transition of the sign operation setting screen.
Figure 11G:
FIG. 11G is an explanatory view explaining a screen transition of the sign operation setting screen.
Figure 12:
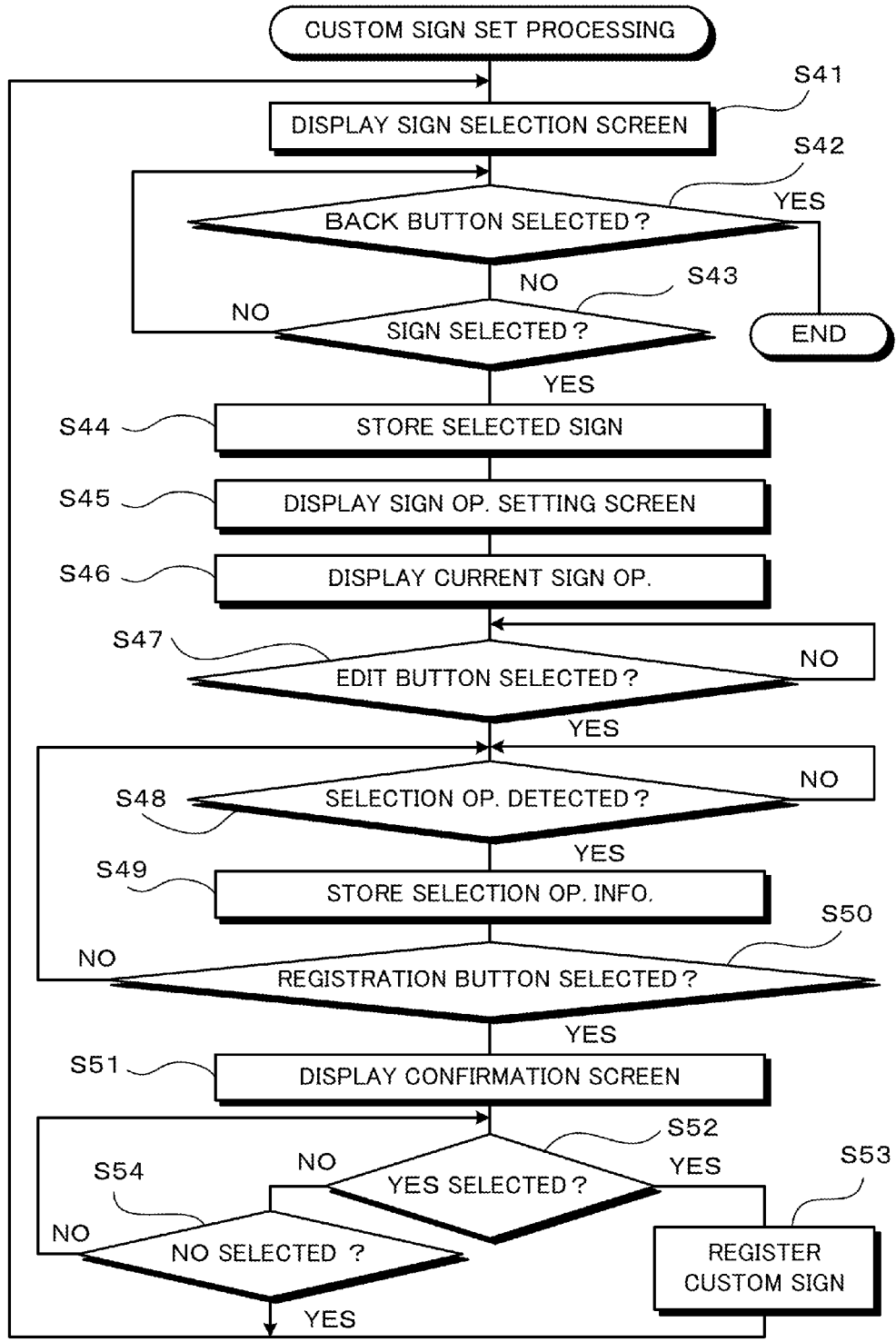
FIG. 12 is a flowchart showing one example of a custom sign set processing of the game device.

When the player selects the registration button 97 after the input of the series of sign operations routine is complete (YES in S50), the screen changes to the confirmation screen of FIG. 11F (S51). The confirmation screen also displays a YES button 99a and a NO button 99b in addition to the foregoing sign item display area 120. The player can also confirm the currently input sign operation routine on the screen by reducing the display of the manager character 70' of FIG. 11E on the confirmation screen.

Note that, when the sign operation routine input by the player is the same as the sign operation routine that has been previously registered as a different sign (sign for a bunt, for instance), a warning to the effect of "This sign has already been registered as a sign for bunting" is displayed on the confirmation screen of FIG. 11F in order to prevent redundant registration.

When the player selects the YES button 99a on the confirmation screen of FIG. 11F (YES in S52), the custom sign registration unit 37c registers, as update information of the associated information (table of FIG. 4) stored in the sign storage unit 35, the correspondence of the sign selected on the sign selection screen shown in FIG. 11B, and information related to the sign operation routine that has been selectively operated on the sign operation setting screen shown in FIG. 11E (information related to the operation order of the plurality of settable areas 71' to 77') (S53). In the foregoing case, the screen changes to the screen of FIG. 11G, and, for instance, after a message to the effect of "A custom sign has been registered" is displayed on the screen for a predetermined time (for example, 2 to 3 seconds), the screen returns to the sign selection screen shown in FIG. 11B (S41), and subsequently an original sign operation can be set regarding a different sign item successively. Meanwhile, when the NO button 99b is selected on the confirmation screen of FIG. 11F (NO in S52), the temporarily stored sign and information related to the sign operation routine are cleared, and the screen returns to the sign selection screen shown in FIG. 11B without registering the custom sign (S41).

Note that, in the foregoing explanation, explained was a case of foremost selecting a sign item on the sign selection screen, and thereafter setting the sign operation routine corresponding to that sign item on the sign operation setting screen, but it is also possible to foremost set the sign operation routine on the sign operation setting screen, and thereafter select the sign item corresponding to the sign operation routine on the sign selection screen.

Accordingly, with this embodiment, since the player can customize the according to one's own preference, it is possible to realize a highly amusing game in which the player will not grow tired of dormant operations. For example, the player can enjoy the manager mode by customizing the signs for each game. Moreover, the player can also change the complexity of the sign operation by increasing or decreasing the number of parts to configure the sign in the foregoing custom sign setting. In other words, rather than deciding the sign based on the selected order of three parts as described above, if the sign is decided based on the selected order of two parts (for instance, is a sign for a bunt is given with head→right shoulder), the sign operation can be simplified (facilitated). Meanwhile, if the sign is decided based on the selected order of four or more parts (for instance, a sign for a bunt is given with head→right shoulder→left shoulder→chest), the sign operation can be made complex. Accordingly, since the complexity of the sign operation can be adjusted to match the proficiency level of the player's sign operation, beginner players and experienced players alike can enjoy sign plays of a baseball game by feeling like a manager.

[Other Configuration Examples of Game Device]

Another configuration example of the game device 1 is now explained with reference to the functional block diagram of FIG. 13. Note that the same reference number is given to the same configuration as the configuration shown in the previous explained diagrams (FIG. 1 to FIG. 12), and the explanation thereof is omitted as appropriate. The sign management unit 30 of the game device 1 additionally comprises complexity deciding unit 45. Moreover, the game device 1 additionally comprises strategy success rate deciding unit 46. These unit 45, 46 are realized by the control unit 10 executing the game program.

The complexity deciding unit 45 has the function of deciding the complexity of the sign operations (series of selective operations of the selectable parts) according to the sign (instruction) that is identified by the sign identification unit 36. With the foregoing sign operations, the complexity thereof will change, for instance, depending on the number of selectable parts configuring the sign, and the complexity deciding unit 45 evaluates and decides the complexity. Details of the complexity decision by the complexity deciding unit 45 will be explained later.

The strategy success rate deciding unit 46 decides the strategy success rate so that the success rate of the game strategy corresponding to the sign is set higher as the sign operation time (time required for performing the series of selective operations of the selectable parts) by the player for the sign identified by the sign identification unit 36 becomes shorter. For example, when the player performs the sign operations for giving a sign for a hit-and-run and such sign is identified by the sign identification unit 36 and activated by the game advancement unit 50, the probability that the hit-and-run as the strategy corresponding to the sign will be successful will increase as the player performs the sign operations more quickly. The sign operation time spent by the player is time-kept by the foregoing selective operation timekeeping unit 39, and the strategy success rate deciding unit 46 decides the strategy success rate based on the time that was time-kept by the selective operation timekeeping unit 39.

Moreover, the strategy success rate deciding unit 46 decides the strategy success rate so that the success rate of the game strategy corresponding to the sign is set higher as the complexity of the sign operations performed by the player for the sign identified by the sign identification unit 36 becomes higher. The complexity of the sign operations performed by the player is decided by the foregoing complexity deciding unit 45, and the strategy success rate deciding unit 46 decides the strategy success rate based on the complexity decided by the complexity deciding unit 45.

In other words, the strategy success rate deciding unit 46 decides the strategy success rate based on the factors of the quickness (sign operation time) and/or complexity of the sign operations performed by the player. In addition, the game advancement unit 50 reflects the strategy success rate decided by the strategy success rate deciding unit 46 in the game. Details of the strategy success rate decision by the strategy success rate deciding unit 46 will be explained later.

As described above, while a player may feel that the sign operations that need to be learned initially to play the game are somewhat difficult, once the player becomes familiar with the game, that player will want to enjoy sign plays by giving complex signs. Thus, the game device 1 of this embodiment is configured so that the complexity of the sign operations can be varied. In order to change the complexity of the sign operations, there are the following methods; namely, (1) change the number of selectable parts configuring the sign (for example, the complexity will increase by configuring the bunt sign with the four parts of head→right shoulder→left shoulder→chest rather than with just the two parts of head→right shoulder), (2) change the valid number of selectable parts of the manager character (for example, the complexity will increase by performing the sign operations by validating the nine parts of head, both shoulders, both hands, chest, belt, ear, and chin rather than performing the sign operations only with the five parts of the manager character's head, both shoulders, and both hands), and (3) switch the setting of the key part (the complexity will be higher for the sign operations using a key part in comparison to the sign operations that do not use a key part). In addition, the complexity of the sign operations can also be increased by (4) creatively using the manager character's right hand and left hand in the sign operations. As a specific operational example, the player selects either the manager character's right hand or left hand via double tapping or long tapping, and thereafter selectively operates the selectable parts (head and the like). In the foregoing case, since the sign operation will differ depending on whether the manager character's right hand touches the head or the manager character's left hand touches the head, and the complexity of the sign operations will increase considerably in comparison to cases where the manager character's right hand and left hand are not creatively used.

Thus, the complexity of the sign operations decided by the complexity deciding unit 45 can be represented as the function of the respective parameters p, q, r, s as follows when the foregoing complexity is "C", the number of selectable parts configuring the sign is "p", the valid number of selectable parts of the manager character is "q", the parameter determined based on the setting of a key part is "r", and the parameter determined based on whether the manager character's right hand and left hand are creatively used is "s":

$$C=f(p,q,r,s) \quad (1).$$

Needless to say, all of the foregoing parameters may be used upon deciding the complexity C, or arbitrary parameters among the above may be combined and used. In other words, it will suffice so as long as at least one of the foregoing parameters is used upon deciding the complexity C. Moreover, other parameters that will affect the complexity of the sign operations can also be combined.

Here, the complexity C will be higher as the number of selectable parts p configuring the sign and the valid number of selectable parts q is greater, and the complexity C will be higher with the setting of a key part and the creative use of the left and right hands. Based on the foregoing relationship, when the initial value of the complexity C is $C_0$, the complexity C of foregoing Formula (1) can be computed, for example, as:

$$C = f(p, q, r, s) \quad (2)$$
$$= C_0 \times (p/a_P) \times (q/a_Q) \times (r/a_R) \times (s/a_S)$$

(Here, $a_P$, $a_Q$, $a_R$ and $a_S$ are coefficients).

In foregoing Formula (2), for instance, if only the parameters p and q are used, the terms of $(r/a_R)$ and $(s/a_S)$ can be deleted to obtain:

$$C=f(p,q)=C_0\times(p/a_P)\times(q/a_Q) \quad (3).$$

Similarly, the complexity C can be computed by using at least one parameter among p, q, r, s as shown below:

$$C=f(p)=C_0\times(p/a_P)$$

$$C=f(q)=C_0\times(q/a_Q)$$

$$C=f(r)=C_0\times(r/a_R)$$

$$C=f(s)=C_0\times(s/a_S)$$

$$C=f(p,r)=C_0\times(p/a_P)\times(r/a_R)$$

$$C=f(p,s)=C_0\times(q/a_Q)\times(s/a_S)$$

$$C=f(p,q,r)=C_0\times(p/a_P)\times(q/a_Q)\times(r/a_R)\ldots.$$

As a specific computation example, let it be assumed that the initial value $C_0$=100, the coefficient $a_P$=3 (in other words, the number of selectable parts p configuring the sign uses 3 as the reference value), and the coefficient $a_Q$=7 (in other words, the valid number of selectable parts q of the manager character uses 7 as the reference value). Moreover, the parameter r is r=11 when a key part has been set and is r=10 when a key part has not been set, and the coefficient $a_Q$=10 (in other words, a case where a key part has not been set is used as the reference). The parameter s is s=12 when the manager character's left and right hands are creatively used, and is s=10 when the manager character's left and right hands are not creatively used, and the coefficient $a_S$=10 (in other words, a case where the left and right hands are not creatively used is used as the reference). In the foregoing case, the complexity C of foregoing Formula (2) will be:

$$C = f(p, q, r, s) \quad (4)$$
$$= 100 \times (p/3) \times (q/7) \times (r/10) \times (s/10).$$

Here, as one example, when considering a case where the seven selectable parts of head, both shoulders, both hands, chest, and belt are valid, a key part is not set and the left and right hands are not creatively used, and the sign for a hit-and-run is to be given based on the sign operations of "head→left shoulder→right shoulder", the value of the respective parameters will be p=3, q=7, r=s=10 and, therefore, the complexity C in the foregoing case will be:

$$C=100\times(3/3)\times(7/7)\times(10/10)\times(10/10)=100.$$

Moreover, as another example, when considering a case where only the five selectable parts of head, both shoulders, and both hands are valid, a key part is not set and the left and right hands are not creatively used, and the sign for a hit-and-run is to be given based on the sign operations of only the two parts of "head→left shoulder", the value of the respective parameters will be p=2, q=5, r=s=10 and, therefore, the complexity C in the foregoing case will be:

$$C=100\times(2/3)\times(5/7)\times(10/10)\times(10/10)=48$$

and the complexity will decrease.

As yet another example, when considering a case where the nine selectable parts of head, both shoulders, both hands, chest, belt, ear, and chin are valid, a key part has been set and the left and right hands are being creatively used, and the sign for a hit-and-run is to be given based on the sign operations of the four parts of "head (right hand)→left shoulder (right hand)→belt (left hand)→chin (left hand)", the value of the respective parameters will be p=4, q=9, r=11, s=12 and, therefore, the complexity C in the foregoing case will be:

$$C=100\times(4/3)\times(9/7)\times(11/10)\times(12/10)=226$$

and the complexity will increase considerably.

The complexity deciding unit 45 may also computer the complexity C of the sign operations in real time each time a sign operation is performed by the player, but since the sign operations corresponding to the respective signs are set in advance before the game, the configuration may also be such that the data resulting from computing the complexity of the sign operations corresponding to the respective signs is stored in advance in the storage unit (auxiliary storage device 20, RAM 13 or the like), data of the computation result is read when the sign operations are performed by the player, and the complexity of the sign operations is thereby decided based on the computation result.

Details of the strategy success rate decision by the strategy success rate deciding unit 46 are now explained. For example, when the sign for a hit-and-run is activated, whether the strategy (hit-and-run) is successful as a result of the batter character hitting the ball object pitched by the pitcher character and getting a hit is affected by the relationship of the capability value (contact capability and the like) of the batter character and the capability value of the pitcher character. In other words, while the probability of getting a hit will decrease if the capability value of the pitcher character exceeds the capability value of the batter character, the probability of getting a hit will increase if the capability value of the batter character exceeds the capability value of the pitcher character. Moreover, with the sign for stealing a base, the capability value (running ability and the like) of the runner character, the capability value (pickoff capability and the like) of the pitcher character and the capability value (throwing capability and the like) of the catcher character will affect the success rate of the strategy (base-stealing). Accordingly, under normal circumstances, the strategy success rate will change depending on the capability value of the target player characters, but in this embodiment, the strategy success rate deciding unit 46 decides the strategy success rate by additionally considering the factors of the quickness (sign operation time) and/or complexity of the sign operations performed by the player.

The strategy success rate decided by the strategy success rate deciding unit 46 can be represented as the function of the respective parameters U, T, C as follows when the strategy success rate is "W", the capability value of the target player character is "U", the sign operation time spent by the player (time that was time-kept by the selective operation timekeeping unit 39) is "T", and the complexity of the sign operations decided by the complexity deciding unit 45 is "C":

$$W=f(U,T,C) \qquad (5).$$

Here, the strategy success rate W can be represented as follows when the strategy success rate based on the capability value U of the target player character is $W_0$ (U), and upon considering that the strategy success rate $W_0$ (U) is to be corrected by the correction function $W_1$ (T) based on the sign operation time T and the correction function $W_2$ (C) based on the complexity C of the sign operations:

$$W=f(U,T,C)=W_0(U)\times W_1(T)\times W_2(C) \qquad (6).$$

In foregoing Formula (6), in only the parameters of the player character's capability value U and sign operation time T are used, the term of $W_2$ (C) can be deleted to obtain:

$$W=f(T,U)=W_0(U)\times W_1(T).$$

Meanwhile, if the parameters of the player character's capability value U and the complexity C of the sign operations are used, the term of $W_1$ (T) can be deleted to obtain:

$$W=f(C,U)=W_0(U)\times W_2(C).$$

In the function of foregoing $W_0$ (U), the capability value $U_A$ of the character to lead the strategy to success and the capability value $U_B$ of the character to lead the strategy to failure are related (for instance, when the strategy is hit-and-run, the batter character's capability value is $U_A$, and the pitcher character's capability value is UB), and this is represented as:

$$W_0(U)=W_0(U_A,U_B).$$

Here, a computation example of $W_0$ (U) in the case of a hit-and-run can be represented as:

$$W_0(U)=U_A/(U_A+2\times U_B) \qquad (7).$$

For example, when the batter character's capability value $U_A$=10, and the pitcher character's capability value $U_B$=10, foregoing Formula (7) will be:

$$W_0(U)=10/(10+2\times 10)=0.333.$$

Moreover, for example, when the batter character's capability value $U_A$=10, and the pitcher character's capability value $U_B$=15, foregoing Formula (7) will be:

$$W_0(U)=10/(10+2\times 15)=0.250.$$

Note that, as the capability values $U_A$, $U_B$ of the respective characters, the capability values stored in the player character information storage unit 26 are read and used, but the batter character's capability value $U_A$ can be corrected by giving consideration to the compatibility with a right-handed or left-handed pitcher or the ups and downs in each game, and the pitcher character's capability value $U_B$ can be corrected by giving consideration to the compatibility with a right-handed or left-handed batter or the ups and downs in each game.

A specific example of the correction function $W_1$ (T) based on the sign operation time T can be represented as follows:

$$W_1(T)=45/(40+T) \qquad (8).$$

Moreover, a specific example of the correction function $W_2$ (C) based on the complexity C of the sign operations can be represented as follows:

$$W_2(C)=(900+C)/1000 \qquad (9).$$

To illustrate a specific computation example of the strategy success rate W by applying foregoing Formula (8) and foregoing Formula (9), when the strategy success rate $W_0$ (U) based on the player character's capability value U=0.333, the sign operation time T=5 (sec), and the complexity C of the sign operations=48, the strategy success rate W of foregoing Formula (6) will be:

$$W = 0.333 \times \{45/(40+5)\} \times \{(900+48)/1000\}$$
$$= 0.316.$$

Moreover, as another example, when the strategy success rate $W_0$ (U) based on the player character's capability value U=0.333, the sign operation time T=3 (sec), and the complexity C of the sign operations=226, the strategy success rate W of foregoing Formula (6) will be:

$$W = 0.333 \times \{45/(40+3)\} \times \{(900+226)/1000\}$$
$$= 0.392$$

and the strategy success rate will increase.

In the foregoing configuration, the sign activation processing of the game device 1 comprising the strategy success rate deciding unit 46 and the like is now explained with reference to the flowchart of FIG. 14. Note that the same step number is given to the same steps as the sign activation processing of FIG. 10, and the explanation thereof is omitted.

When the sign corresponding to the player's sign operations is identified by the sign identification unit 36 (S29), and that sign is valid (YES in S30), the strategy success rate deciding unit 46 acquires the sign operation time spent by the player that was time-kept by the selective operation timekeeping unit 39 (S61). Moreover, the complexity deciding unit 45 decides the complexity of the sign operations performed by the player based on foregoing Formula (4) or the like (S62). Subsequently, the strategy success rate deciding unit 46 decides the success rate of the strategy corresponding to the sign that was identified by the sign identification unit 36 based on the sign operation time spent by the player and the complexity of the sign operations (S63). In the foregoing case, the strategy success rate deciding unit 46 decides the strategy success rate so that the strategy success rate will increase as the sign operation time is shorter based on foregoing Formula (6) to foregoing Formula (9) or the like, and so that the strategy success rate will increase as the complexity of the sign operations is higher.

Figure 14:
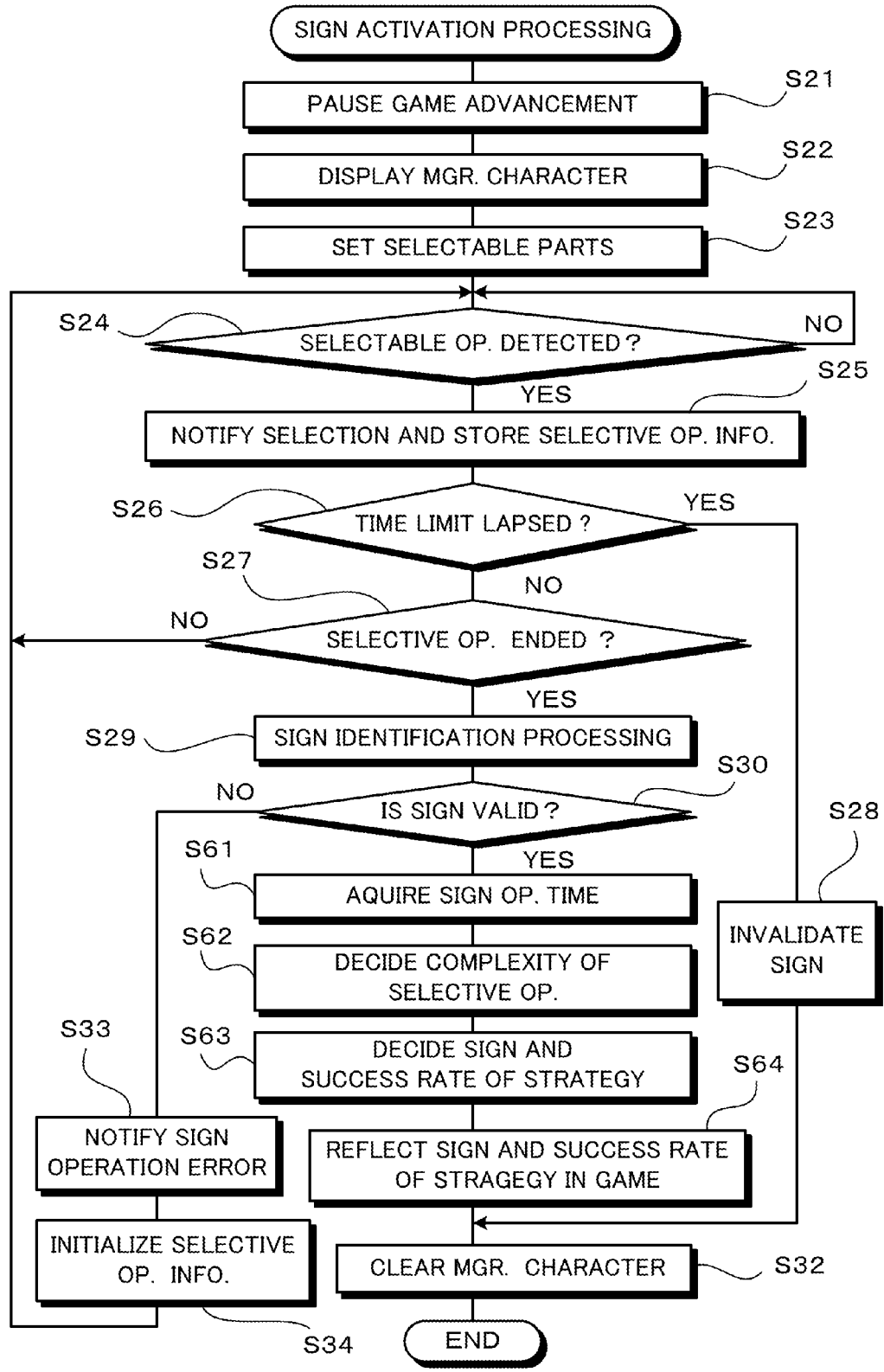
FIG. 14 is a flowchart showing another example of a sign activation processing of the game device.

Note that, in the flowchart of FIG. 14, an example where the strategy success rate deciding unit 46 decides the strategy success rate based on both the sign operation time and the complexity of the sign operations is shown, but the strategy success rate can also be decided based on only one of the above.

After the step of S63, the game advancement unit 50 activates the sign and reflects the sign in the game, and additionally reflects the strategy success rate decided by the strategy success rate deciding unit 46 in the game (S64). For example, the game advancement unit 50 generates a random number when the strategy success rate deciding unit 46 decides the strategy success rate, and decides whether the strategy will succeed based on the acquired random number value. Here, the random number value in which the strategy is deemed successful within the range (minimum value to maximum value) that can be acquired as the random number value is set to coincide with the strategy success rate (probability) decided by the strategy success rate deciding unit 46, and the strategy success rate is thereby reflected in the game faithfully. A general pseudo random number generating algorithm can be used for generating the foregoing random number. The game advancement unit 50 that decided the success or failure of the strategy as described above causes the runner character to run and the batter character to bat upon deciding that, for example, the strategy of hit-and-run will succeed. The trajectory of the ball object associated with the batting is decided based on an AI program. Meanwhile, when the game advancement unit 50 decides that the strategy of hit-and-run will not succeed, the game advancement unit 50 causes the runner character to run and the batter character to bat and retire.

Accordingly, with the game device 1, the strategy success rate corresponding to the series of sign operations is decided based on the time and/or complexity of the series of sign operations that are performed via the manager character, and the decided strategy success rate is reflected in the game. It is thereby possible to add an amusing game element of reflecting the time and/or complexity of the sign operations in the strategy success rate, which was unheard of conventionally, and thereby increase the game amusement. Moreover, since the strategy success rate will increase as the sign operation time is shorter, this will motivate the player to quickly perform the sign operations, inhibit the game delay caused by the sign operations, and a smooth game advancement can be expected.

[Yet Another Configuration Example of the Game Device]

Figure 15A:
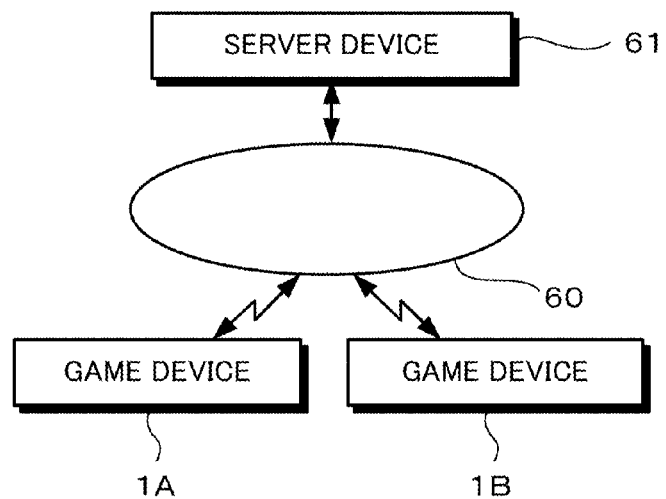
FIG. 15A is a block diagram showing an example configuration of a communication network competitive game system.
Figure 15B:
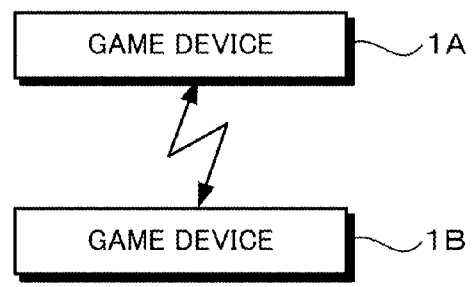
FIG. 15B is a block diagram showing an example configuration of a game system of a direct communication type.

Yet another configuration example of the game device 1 is now explained with reference to the block diagrams of FIG. 15A and FIG. 15B showing the configuration of the game system and the functional block diagram of FIG. 16. Note that the same reference number is given to the same configuration as the configuration shown in the previous explained diagrams (FIG. 1 to FIG. 14), and the explanation thereof is omitted as appropriate.

The game device 1 (1A, 1B) of this embodiment comprises a data communication function based on the communication control unit 21 (refer to FIG. 2), and enables the execution of a competition game where a plurality of players play the game while communicating data among a plurality of game devices. Note that, while the basic configuration of the respective game devices to play the game is the same, for the sake of convenience the two game devices to play the game are differentiated by being given different reference numerals; namely, a game device 1A and a game device 1B.

As a mode of the communication game, for example, as shown in FIG. 15A, there is an internet competition (communication network competition) mode where two game devices 1A, 1B are communicably connected via the internet 60 as the communication network, and a player A to operate the game device 1A and a player B to operate the game device 1B play a network competition game (baseball game or the like). Moreover, as another communication competition mode, as shown in FIG. 15B, there is a direct communication mode where two game devices 1A, 1B are communicably connected directly without going through the internet.

With the internet competition mode of FIG. 15A, the respective players to play the network competition game connect their own game devices 1A, 1B, . . . to the internet 60 and access a server device 61, and incorporate their own game devices 1A, 1B, . . . in the network game system. The server device 61 has a login authentication function, a matching function, a competition management function, and the like. The login authentication function is a function of performing login authentication by determining the game participation qualification of the respective players when such respective players who wish to participate in the network game operate the respective game devices 1A, 1B and attempt to log onto the server device 61. For example, in the case of a membership-based online service game, the server device 61 performs membership authentication. The foregoing matching function is a function of deciding the combination of opponents among the plurality of game devices 1A, 1B, . . . requesting game play. The competition management function is the function of managing the communication status of both game devices 1A, 1B until the competition game is ended when a competition game is being played between the game devices 1A, 1B.

The respective game devices 1A, 1B are given a device ID for uniquely identifying the respective game devices. In addition, the respective players operating the respective game devices 1A, 1B are given a player ID for identifying the respective players. In addition, the server device 61 manages information concerning the respective game devices 1A, 1B and the respective players based on the foregoing identifying information (device ID and player ID), and thereby executes the foregoing login authentication, matching and competition management.

Note that the communication network is not limited to the internet 60, and, so as long as it can mutually connect the respective game devices 1A, 1B, . . . and the server device 61 in a communicable manner, used may be, for example, a dedicated line, a public line, a LAN, or a combination thereof.

With the direction communication mode of FIG. 15B, the player to play the competition game directly connects his/her own game device 1A to the opponent's game device 1B. As the direct communication method, various types of wireless communication methods such as Bluetooth (registered trademark), wireless LAN, UWB (Ultra Wide Band) and the like may be adopted. Moreover, wireless communication competition based on an adhoc mode in which the game devices 1A, 1B conduct direct wireless communication without going through a wireless LAN access point can also be adopted. Needless to say, a wired communication method via a communication cable can also be adopted.

The configuration and functions of the game devices 1A, 1B are now explained. The game devices 1A, 1B of this embodiment have the function of allowing the players to view the sign given by the opponent on the screen of one's own game device when the players are playing the competition game in the manager mode.

In a baseball game of the real world also, the sign given by the manager (or coach) during the game is also visible to the manager and players of the opponent team in addition to the players of one's own team. Since the sign is also visible to the opponent manager's and others, unmentionable instructions are conveyed to the players of one's own time in the form of blocking signals and the like. The game devices 1A, 1B of this embodiment can realize this kind of situation that is similar to a baseball game of the real world, where the sign given by the opponent manager is visible, in a competition game of players located closely or remotely. Accordingly, it is possible to add an amusing game element of predicting the sign given by the opponent and mapping out one's own strategy in the manager mode, and thereby increase the game amusement.

Figure 16:
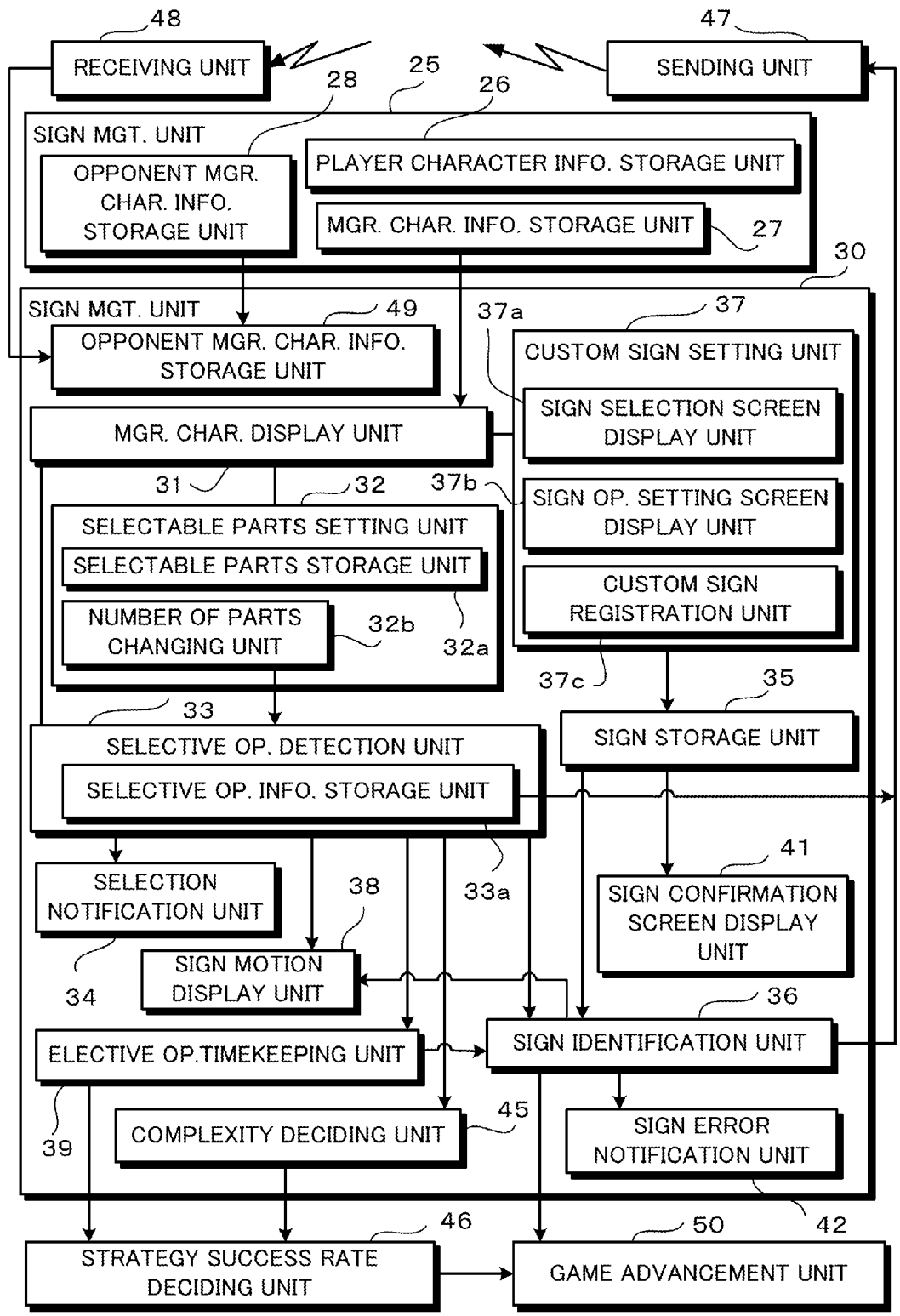
FIG. 16 is a function block diagram showing an example of a function configuration of the game device.

In order to realize the above, the game devices 1A, 1B of this embodiment additionally comprise, in addition to the same configuration and functions as the game device 1 shown in FIG. 1 to FIG. 14, an opponent manager character information storage unit 28 (opponent-side instructing character information storage unit), sending unit 47, receiving unit 48 and opponent manager character display unit 49 (opponent-side instructing character display unit) as shown in FIG. 16. The constituent elements 28, 47, 48 are realized by the control unit 10 of FIG. 2 executing the game program.

The opponent manager character information storage unit 28 is provided to the character management unit 25, and stores, in a storage area of a non-volatile storage medium (auxiliary storage device 20 or the like), the opponent manager character information such as the image information and profile information related to the opponent manager character by associating such information with the identifying information (character ID) for uniquely identifying the opponent manager character. Moreover, the manager character information storage unit 27 temporarily stores the opponent manager character information in the work area of the main storage device (RAM 13) during the game as needed.

The sending unit 47 has the function of sending the selective operation information showing the contents of the selective operation to the opponent's game device 1B (or 1A) when the player of the game device 1A (or 1B) selectively operates the plurality of selectable parts of the manager character. As described above, each time a selectable part of the manager character displayed on the screen is selectively operated by the player, such selective operation is detected by the selective operation detection unit 33, and the selective operation information showing the contents of the selective operation is stored in the selective operation information storage unit 33a. In addition, the sending unit 47 reads the selective operation information stored in the selective operation information storage unit 33a and sends the selective operation information to the opponent's game device.

As timing of the sending unit 47 sending the selective operation information to the opponent's game device, (1) the selective operation information may be sent sequentially each time a selectable part of the manager character is selectively operated by the player, or (2) the series of selective operation information may be sent after the sign is identified by the sign identification unit 36. However, since the player may correct the selection of the selectable parts during the sign operation or cancel the sign operation itself midway during the operation, the method of collectively sending the series of selective operation information after the sign is identified is more desirable since the sending and receiving of unneeded data can be avoided.

The receiving unit 48 has the function of receiving the opponent's selective operation information sent from the opponent's game device 1A (or 1B). The opponent's selective operation information received by the receiving unit 48 is supplied to the opponent manager character display unit 49. The foregoing sending unit 47 and receiving unit 48 are realized by the control unit 10 of FIG. 2, which executes the game program, controlling the operation of the communication control unit 21.

The opponent manager character display unit 49 displays the opponent manager character on the screen in a display state corresponding to the opponent's selective operation information received by the receiving unit 48. For example, upon receiving the opponent's selective operation information, the opponent manager character display unit 49 reads the image data of the opponent manager character from the opponent manager character information storage unit 28 and causes the opponent manager character to appear on the screen, and performs a video display of the sign motion according to the sign operation of the opponent player by moving the hand of the opponent manager character based on the opponent's selective operation information. Otherwise, the opponent manager character display unit 49 can also display the sign motion of the opponent manager character on the screen in a display state that is the same as the screen shown in FIG. 9E; in other words, a display state where the respective display areas of the selectively operated parts (head, right shoulder and left shoulder in the example of FIG. 9E) are lit up, and an arrow showing the selected order is displayed between the respective parts.

Moreover, the opponent manager character display unit 49 clears the opponent manager character from the screen after displaying the sign motion of the opponent manager character on the screen as described above and causing the player to visually recognize the sign given by the opponent. For example, the opponent manager character display unit 49 clears the opponent manager character from the screen after displaying the sign motion of the opponent manager character for a predetermined time (for example, 1 to 10 seconds).

The opponent manager character display unit 49 can vary the time of displaying the sign motion of the opponent manager character on the screen. For example, considered may be a configuration where, the shorter the sign operation time of the opponent player, the shorter the time of displaying the sign motion of the opponent manager character. If the time of displaying the sign motion of the opponent manager character is short, there will be less time for the player to see through the sign. Thus, this will motive the player to perform the sign operation quickly so that the sign will not be detected by the opponent, and contribute to the smooth game advancement in the manager mode.

For example, the configuration of varying the sign motion display time of the opponent manager character displayed on the screen of the game device 1B based on the sign operation time of the player A of the game device 1A can be realized with the following configuration. In other words, when the sending unit 47 of the game device 1A sends the selective operation information to the opponent's game device 1B, the sending unit 47 may also send the information related to the sign operation time which was time-kept by the selective operation timekeeping unit 39. In addition, when the receiving unit 48 of the game device 1B receives the opponent's selective operation information and the sign operation time information, the opponent manager character display unit 49 may decide the sign motion display time of the opponent manager character based on the sign operation time information (for instance, the sign motion display time of the opponent manager character can be set to the same time as the sign operation time).

In the foregoing configuration, the operational example of the game devices 1A, 1B according to this embodiment is now explained with reference to the flowchart of FIG. 17. Note that, as the communication competition mode, both modes of FIG. 15A and FIG. 15B can be applied, but the ensuing explanation is based on the internet competition mode of FIG. 15A.

The player A operates the game device 1A and connects the game device 1A to the internet 60, and sends a participation request of the network game to (logs onto) the server device 61 (S101). Similarly, the player B operates the game device 1B and sends a participation request to (logs onto) the server device 61 (S201). In addition, the server device 61 that received the participation request from the respective game devices 1A, 1B performs login authentication, and subsequently accepts the participation of the respective game devices 1A, 1B in the network game (S301). Thereafter, the server device 61 performs matching for deciding the combination of opponents among the plurality of game devices (including game devices 1A, 1B) that are requesting game play (S302). Here, the ensuing explanation is continued on the assumption that the game device 1A and the game device 1B were matched by the server device 61.

As the method of internet competition to be played by the matched game devices 1A, 1B, there are (1) the so-called P2P (Peer to Peer) method where the game devices 1A, 1B play the game via direct communication, and (2) the so-called client/server method where the game devices 1A, 1B play the game, as clients, via the server device 61. Either method may be adopted, but the ensuing explanation is based on playing the network game based on the former P2P method.

The server device 61 notifies the opponent information such as the IP (Internet Protocol) address to the respective matched game devices 1A, 1B (S303). As a result of the respective game devices 1A, 1B receiving the opponent information from the server device 61 (S102 and S202), both game devices 1A, 1B can be mutually connected via P2P, and both game devices 1A, 1B start the competition game (S103 and S203). Note that, when both game devices 1A, 1B are playing the competition game, the server device 61 manages the communication state of both game devices 1A, 1B until the competition game is ended. Specifically, while the game devices 1A, 1B are playing the competition game via a P2P connection, the game devices 1A, 1B intermittently send periodic data (heartbeat) to the server device 61, and the server device 61 determines that the game devices 1A, 1B are playing the competition game without any problem while the server device 61 is receiving the foregoing period data.

During the game, the game advancement unit 50 of the game devices 1A, 1B advances the game by creating a common virtual game space while synchronizing with each other. Here, when the player A of the game device 1A performs the foregoing sign operations during the game, the advancement of the game is paused during the period that the sign operations are being performed (S104). Here, the advancement of the game of the game device 1B in synch with the game device 1A is also paused (S204). In addition, when the player A completes the sign operations and the sign is identified by the sign identification unit 36, the sending unit 47 of the game device 1A reads the selective operation information showing the contents of the sign operations from the selective operation information storage unit 33a and sends the selective operation information to the game device 1B (S105), and the receiving unit 48 of the game device 1B receives the selective operation information (S205).

Subsequently, on the side of the game device 1A that sent the selective operation information, the sign motion display unit 38 causes the manager character on the screen to perform a sign motion based on the selective operation information (S106). For example, the sign motion display unit 38 displays a video of the manager character performing a realistic sign motion while moving one's hand on the screen.

Moreover, on the side of the game device 1B that received the opponent's selective operation information, the opponent manager character display unit 49 displays the opponent manager character on the screen, and causes the opponent manager character on the screen to perform a sign motion based on the opponent's selective operation information (S206). For example, the opponent manager character display unit 49 displays a video of the opponent manager character performing a realistic sign motion while moving one's hand on the screen.

Here, since the sign motion display unit 38 of the game device 1A and the opponent manager character display unit 49 of the game device 1B display a sign motion on the screen while synchronizing with each other, the screen of the game device 1A and the screen of the game device 1B will display substantially the same sign motion corresponding to the sign operations of the player A.

Thereafter, the manager character is cleared from the screen of the game device 1A and the opponent manager character is cleared from the screen of the game device 1B, the game is thereby resumed, and the game is advanced in a state where the sign corresponding to the sign operations of the player A is activated (S107 and S207).

Moreover, upon switching positions and the player B of the game device 1B is to perform the sign operations, the processing S208 to S211 to be performed by the game device 1B are the same as the processing of foregoing S104 to S107 performed by the game device 1A, and the processing S108 to S111 to be performed by the game device 1A are the same as the processing of foregoing S204 to S207 performed by the game device 1B.

As described above, the players A and B give signs as appropriate according to the game state. In addition, when the game is ended when the prescribed innings have been played, the game devices 1A, 1B disconnect the P2P connection and send a game end notice to the server device 61 (S112 and S212), and the competition management of the game devices 1A, 1B is ended by the server device 61 receiving the foregoing game end notice (S304).

Accordingly, with the game devices 1A, 1B of this embodiment, the player can confirm the signs given by the opponent player on the screen. In other words, when one player performs the sign operations, the game advancement is paused during the performance of such sign operations forcing the other player to wait, but rather than simply resuming the game after the sign operations are completed after being forced to wait, the sign given by the opponent can be confirmed on the screen before resuming the game. Thus, it is possible to see through the opponent's sign and map out one's own strategy. For example, the defensive player that detected the offensive sign as being a "squeeze" and perform the sign operations for a "pitch out (defensive strategy of pitching the ball to a location where the batter's bat will not reach)" or a "bunt shift" to prevent the squeeze play. Meanwhile, the offensive player can perform the sign operations for "wait" or a "slug bunt" in addition to "squeeze" in cases where there is a runner on third base. A strategy is mapped out by effectively incorporating signs for not acting such as "wait". Accordingly, in this embodiment, the players can enjoy a competition game as though managers of the real world are playing a mental game/head game while mutually confirming the signs given by the opponent on the screen.

Moreover, in a competition game played by players, a simple sign will be detected by the opponent immediately. Thus, the respective players will attempt to devise the setting of the custom signs, set a key part, creatively use the manager character's left and right hands, and create original signs that cannot be easily detected by the opponent. Consequently, in addition to the amusement of the sensory sign operation, the amusement of customizing the sign operation is added, and the game amusement is thereby increased.

Other Embodiments

The foregoing embodiment explained a case by taking a baseball game as an example, but the present invention can also be applied to other games in which a character in a virtual space is operated via an instructing character. For example, other sports games such as a soccer game, an American football game, a basketball game, and a volleyball game can also be configured so that a player character in a virtual space is operated via an instructing character (manager character or coach character), and the present invention can also be suitably used in various sports games other than a baseball game. Specifically, for example, in a soccer game, the present invention can be suitably used in a situation of giving an instruction to a player character via an instructing character (manager character) in scenes of set plays such as a corner kick or a free kick.

In addition, the present invention can also be applied to a battle game. For example, in a battle game where a command team is assembled to infiltrate and attack an enemy area, the present invention can also be suitably used in scenes of giving an unmentionable instruction to a subordinate character in a virtual game space via a boss character (instructing character).

Figure 17:
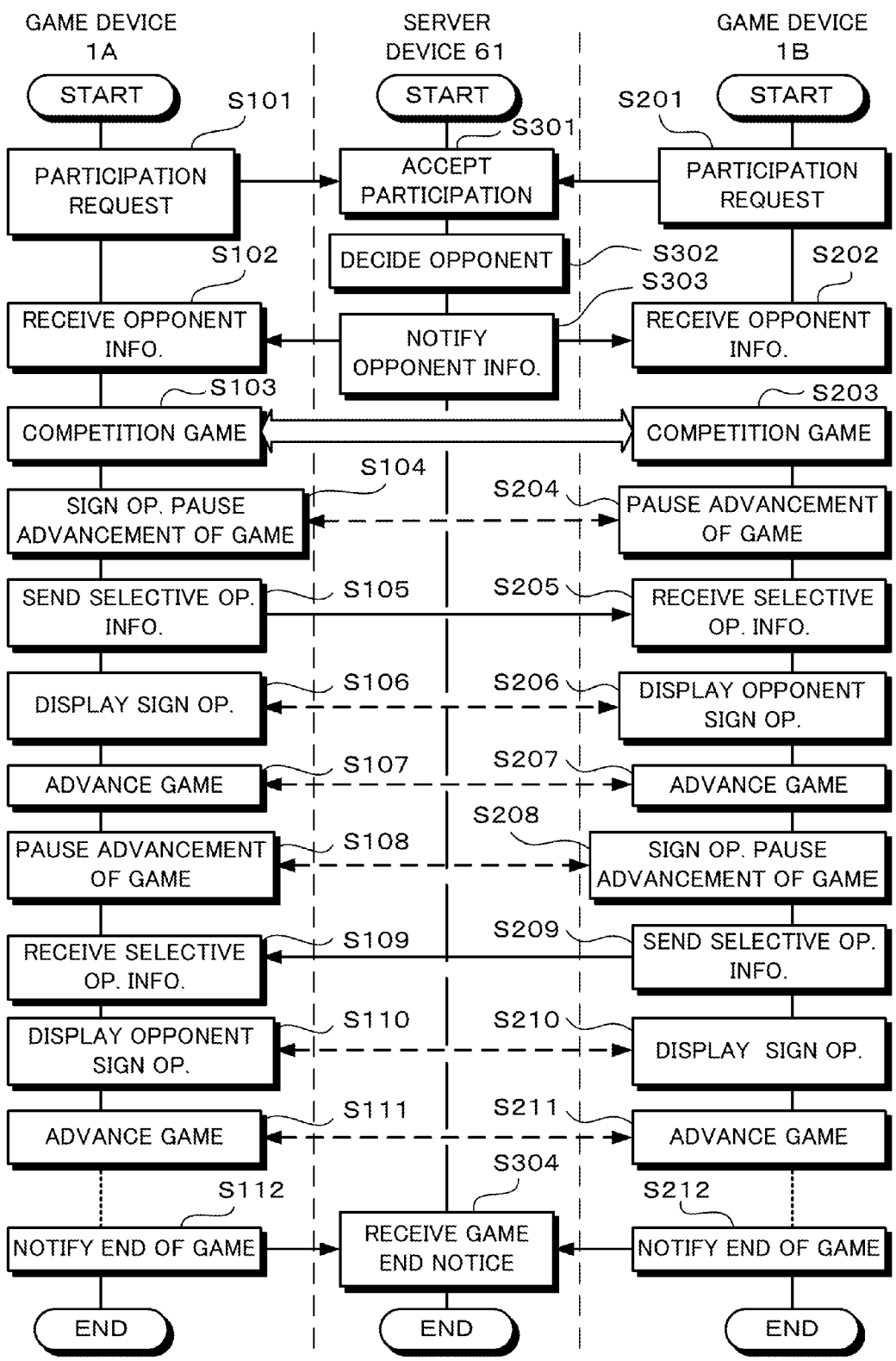
FIG. 17 is a flowchart showing an example of an operation of the game system.

Moreover, while the foregoing embodiment illustrated a case by referring to FIG. 17 and the like where two players engaged in communication game play, the present invention can also be applied to game where three or more players engage in communication game play. For example, in a battle game where a plurality of command teams (3 teams or more) fight simultaneously and all teams other than one's own team are enemies, or in a battle game where a plurality of command teams (3 teams or more) engage in battle upon separating into friend and foes, the number of players that can participate in the game will correspond to the number of command teams. In this kind of communication game play by a plurality of players, the present invention can also be suitably used even in cases where each player gives instructions to a subordinate character via a boss character.

Moreover, while the foregoing embodiment is configured to pause the advancement of the game during the sign operation by the player, it is also possible to continue the advancement of the game during the sign operation. For example, in a baseball game, since there is a certain amount of time (pitching interval) from the time that the pitcher character throws the ball object until that pitcher character throws the next ball object, if the player quickly performs the sign operation during that time, the sign can be activated without stopping the advancement of the game. Moreover, when continuing the advancement of the game during the sign operation, it is also possible to automatically slow down the game advancement in comparison to the normal game speed in consideration of the time required for the sign operation by the player. Moreover, when continuing the advancement of the game during the sign operation, it is desirable to overlappingly display the manager character in a semi-transparent state on the game screen so that the player can confirm the status of game advancement through the semi-transparent manager character.

Moreover, while the foregoing embodiment explained a case of using a smartphone storing the game program as the game device, the present invention is not limited to the foregoing example. In other words, the present invention can similarly be applied to a domestic game device which is configured by connecting a domestic video game machine to a domestic television, a dedicated portable game device configured integrally with a monitor, a portable phone, a PHS (Personal Handy-phone System) or a portable information terminal (PDA: Personal Digital Assistant) capable of executing application programs, or a personal computer or a tablet-type terminal which functions as a game device by executing a game program.

Moreover, the various types of computer-readable game programs according to this embodiment are recorded on various types of computer-readable recording mediums such as a hard disk, optical disk (CD-ROM, DVD-ROM, UMD or the like), flexible disk, semiconductor memory, ROM cassette, or a cartridge for use in a domestic video game device, and read from the recording medium and executed by the control unit of the game device 1. Moreover, the unit for providing the game program to the game device 1 is not limited to a recording medium, and the game program may also be provided via a communication network such as the internet. For example, when the game program can be downloaded via the internet from a website or the like provided by the company that is managing the network game, the game program may be directly downloaded to the game device 1 from the website.

Moreover, while the foregoing embodiment explained the case of intuitively performing the sign operation by touching the screen of the touch panel unit 3 with a finger or a pen as the preferred configuration, the application of the present invention is not limited thereto, and the present invention also be applied, for example, to a configuration of using a wireless-type controller such as a mouse or a pointing device and selectively operating the selectable parts of the manager character displayed on the screen.

Moreover, while the foregoing embodiment explained a configuration of storing, in a storage device, the associated information related to the selected order of a plurality of selectable parts of a manager character displayed on the screen and the sign (instruction) and identifying the sign based on the associated information, as a modified example thereof, it is also possible to adopt a configuration of storing, in a storage device, the associated information related to the combination of a plurality of selectable parts and the sign, and identifying the sign based on the associated information. When identifying the instruction based on the combination of a plurality of selectable parts, since the identification is not dependent on the order of the selective operation of the selectable parts, for example, the same instruction will be represented with "head→right shoulder→left shoulder" and "head→left shoulder→right shoulder". Accordingly, when the sign is configured using the combination of a plurality of selectable parts, there will be variations in the order of the plurality of selective operations for the same sign, and a sign operation which will be more difficult for the opponent player to detect can be realized.

Additional Embodiments

An embodiment of applying the characteristic configuration of the present invention to a game system including a game management device configured from a game server or the like, and a terminal device of each player which is connectable to the foregoing game management device via a network is now explained.

The game management device manages the game information related to the respective players by receiving access, via a network, from the terminal device of the respective players, and provides a game service, via the network, to the respective players.

Meanwhile, the terminal device of the player sends the input information based on the player's operation to the game management device via a network and also functions as the user interface for performing the input and output of the game such as the display of the game screen or the output of sounds which are sent from the game management device via the network.

Thus, the arithmetic processing and the like for advancing the game are executed by the game management device, and the game management device comprises the main function of the game device of the foregoing embodiment. In other words, among the functions of the game device of the foregoing embodiment, it is possible to adopt a configuration where the game management device comprises the functions other than the I/O function (function of operation input, display output and so on). In addition, the game management device also has the function of controlling the display of the terminal device by receiving the player's operation information from the terminal device and sending information for displaying the game to the terminal device.

Figure 18:
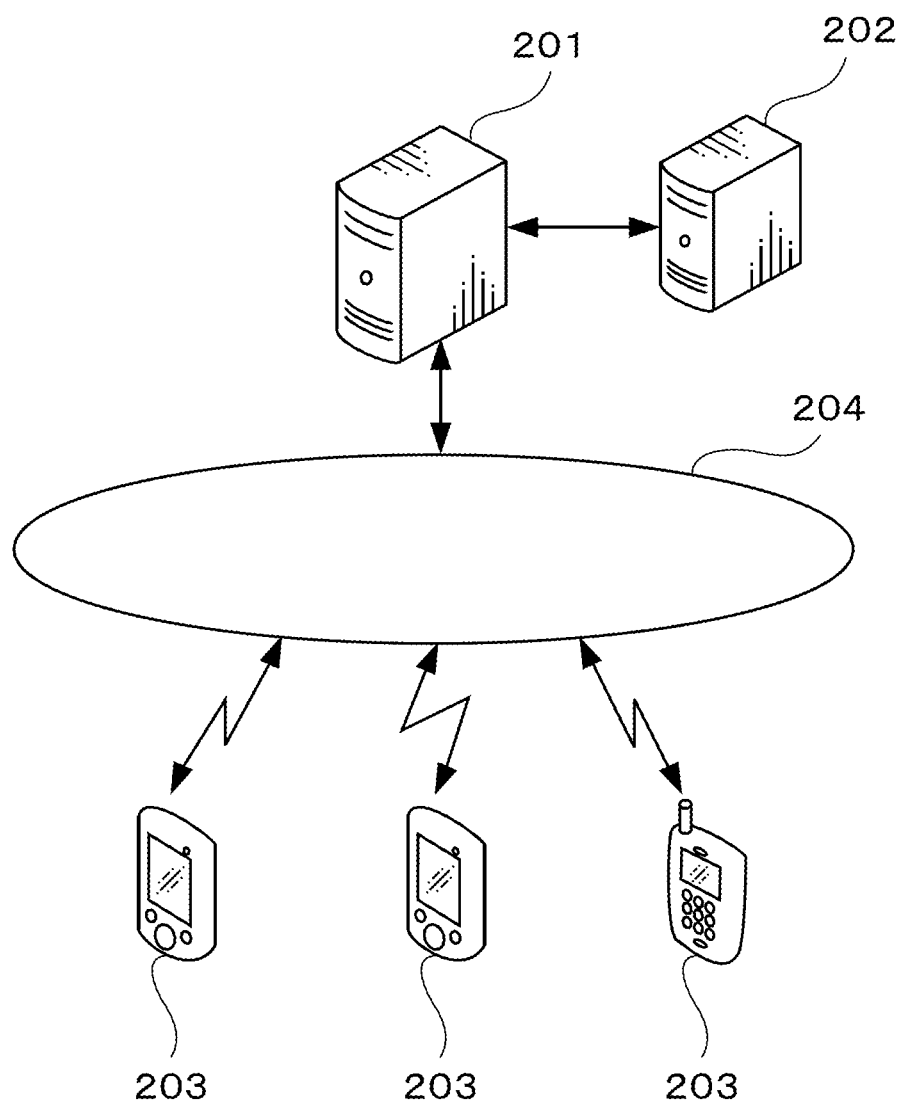
FIG. 18 is an explanatory view showing an example configuration of a game system according to an embodiment of the present invention.

A configuration example of the game system according to an embodiment of the present invention is shown in FIG. 18. As shown in FIG. 18, this game system comprises a game server 201 on a network 204 such as internet, etc., a database server 202 connected to the game server 201 to be capable of communicating therewith, and terminal devices 203 of respective players, that are capable of communicating with the game server 201 via the network 204.

A network 204 of this embodiment is not limited to the internet, and, so as long as it can mutually connect a game server 201 and a terminal 203 of each player in a communicable manner, used may be, for example, a dedicated line, a public line (phone line, mobile communication line or the like), a wired LAN, or a wireless LAN, or a combination of these lines and the internet.

In the example of this game system, the game management device according to an embodiment of the present invention is configured from a game server 201 and a database server 202. The game server 201 receives, via a network 204, access from a terminal device 203 of each player to receive a game service, manages the game information related to the respective players by accumulating the game information in a database server 202 (storage device), and thereby provides a game service to the players via the network 204.

In this embodiment, as one mode of providing the game service from the game server 201, explained is an example of providing a so-called browser game in which the game can be played using the web browser loaded in the terminal device 203 of the respective players. With this service mode that provides the browser game, there is no need to download or install game-dedicated software in the player's terminal device 203, and, so as long as the environment enables the connection of the terminal device 203 to the network 204, the player can casually enjoy the game service provided from the game server 201 anywhere.

With this game system, the browser game program (application software) is loaded in the game server 201, and the game server 201 executes the arithmetic processing and data processing for advancing the game according to the input operations performed to the terminal device 203 of the respective players. In addition, the game server 201 updates the game information related to the respective players in the database server 202 based on the execution results of the arithmetic processing and the like, and sends webpage information (game screen data) to the terminal device 203 of the respective players for displaying the execution results on the screen of the player's terminal device 203.

The terminal device 203 of the respective players is loaded with a web browser having a website perusal function as a user agent, and can display the webpage information sent from the game server 201 on the screen of the terminal device 203. As the terminal device 203, for example, various terminals that can be connected to the game server 201 via the network 204 and receive the game service; for instance, a smartphone, a portable phone terminal, a PHS terminal, a portable information terminal (PDA), a personal computer or a table-type computer terminal can be used. As the configuration example of the terminal device 203, the configuration illustrated in FIG. 2 can be applied.

Moreover, the game provided in this embodiment can also include an element of a so-called social game where a player can play the game while communicating with other players who are also receiving the game service. For example, by incorporating the game server 201 and the database server 202 of this embodiment into a social networking service (SNS) system, it is possible to realize a game system for providing a social game service as one type of SNS service. While a game service can be provided to a player through a game system which runs on a SNS platform as described above, the game server 201 and the database server 202 can also be constructed as an independent game system without being incorporated into the SNS system.

In the foregoing game system, the game management device (game server 201 and database server 202) manages the game information related to the respective players by receiving access from the terminal device 203 of the respective players via the network 204, and provides to the respective players, via the network 204, a game service of a game in which a character is operated via an instructing character (manager character or the like). Details concerning the configuration of the game management device according to this embodiment are now explained.

(Configuration of Game Management Device)

Figure 19:
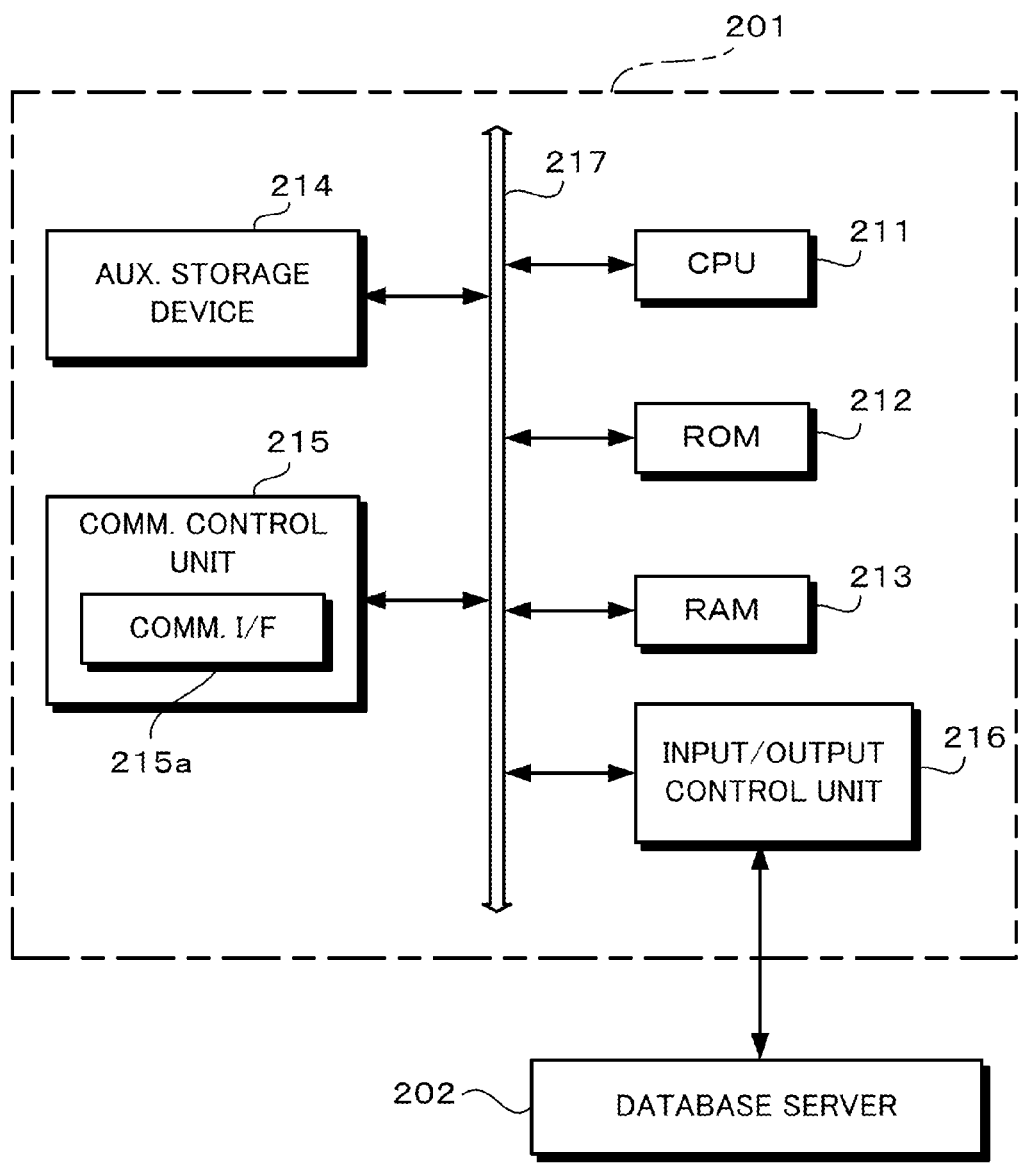
FIG. 19 is a block diagram showing an example of a hardware configuration of a game management device.

As described above, in this embodiment, the game management device is configured from the game server 201 and the database server 202. FIG. 19 shows an example of the hardware configuration of the game server 201. As shown in the diagram, the game server 201 mainly comprises a CPU 211, a ROM 212 and a RAM 213 as main storage devices, an auxiliary storage device 214, a communication control unit 215, and an I/O control unit 216, and these components are mutually connected via a bus line 217 including an address bus, a data bus, a control bus and the like. Note that an interface circuit is interposed between the bus line 217 and the respective constituent elements as needed, but the illustration of such interface circuits is omitted in the diagram.

The CPU 211 interprets and executes orders of the application software such as system software and game program, and thereby controls the overall game server 201. The ROM 212 stores programs and the like which are required for the fundamental operation and control of the game management device 201. The RAM 213 stores various types of programs and data, and secures a work area for the CPU 211.

The auxiliary storage device 214 is a storage device for storing application software such as game programs as well as various types of data. As the auxiliary storage device 214, for instance, a hard disk drive or the like may be used. The program of this embodiment for operating the game server 201 (computer) as a game management device is also stored in the auxiliary storage device 214, and the program is loaded in the RAM 213 from the auxiliary storage device 214 via the bus line 217 during the startup of the game server 201, and executed by the CPU 211.

The communication control unit 215 comprises a communication interface 215a connected to the network 204, and controls the communication with the terminal device 203 of the respective players via the network 204. Moreover, the communication control unit 215 also controls the communication with a server not shown connected to the network 204. For example, with a system configuration where the game server 201 is incorporated into an SNS system, the communication control unit 215 of the game server 201 controls the communication with the SNS server not shown via the network 204.

The I/O control unit 216 is communicably connected to the database server 202, and is a database interface for performing I/O control when the CPU 211 executes the reading and writing of data (records) from and to the database server 202.

The database server 202 comprises, for instance, a large capacity hard disk device having a RAID (Redundant Arrays of Inexpensive Disks) configuration as the storage device including the area for storing the game information related to the respective players managed by the game server 201. The database server 202 can be configured, for example, as a relational database, an object database or an object relation database which stores various types of game information (player name, level, game points, owned items and the like) of the respective players by associating such information with identifying information (player ID) for uniquely identifying each player.

While this embodiment illustrates an example where the game management device is configured from the game server 201 and the database server 202, the configuration is not limited thereto. For example, by causing the game server 201 to have the function of the database server 202, the game management device can be configured from only the game server 201. Moreover, the respective functions of the game server 201 can be distributed to a plurality of servers, and the game server 201 can be configured as a plurality of servers. For example, when a player operates the terminal device 203 and accesses the game server 201, it is possible to comprise, separate from the main server of the game server 201, an authentication server having an authentication function for determining whether that player is a legitimate user, and configure the game server 201 from the main server and the authentication server. As another configuration example, a billing management server for managing the billing when a player purchases a billable item in the game can be provided separately from the main server or the like of the game server 201, and configure the game server 201 from the main server, the authentication server and the billing management server.

Moreover, when the number of players using the game service becomes hundreds of thousands, millions or even more, it is necessary to construct a server system capable of withstanding the enormous access from the terminal devices 203 of numerous players. Thus, by providing a plurality of game servers 201 on the network 204 for redundancy (multiplexing), it is also possible to realize a load-balancing system configuration. Here, a load balance for adjusting the load between the plurality of game servers 201 is preferably provided.

[Configuration of Game Management Device]

Figure 20:
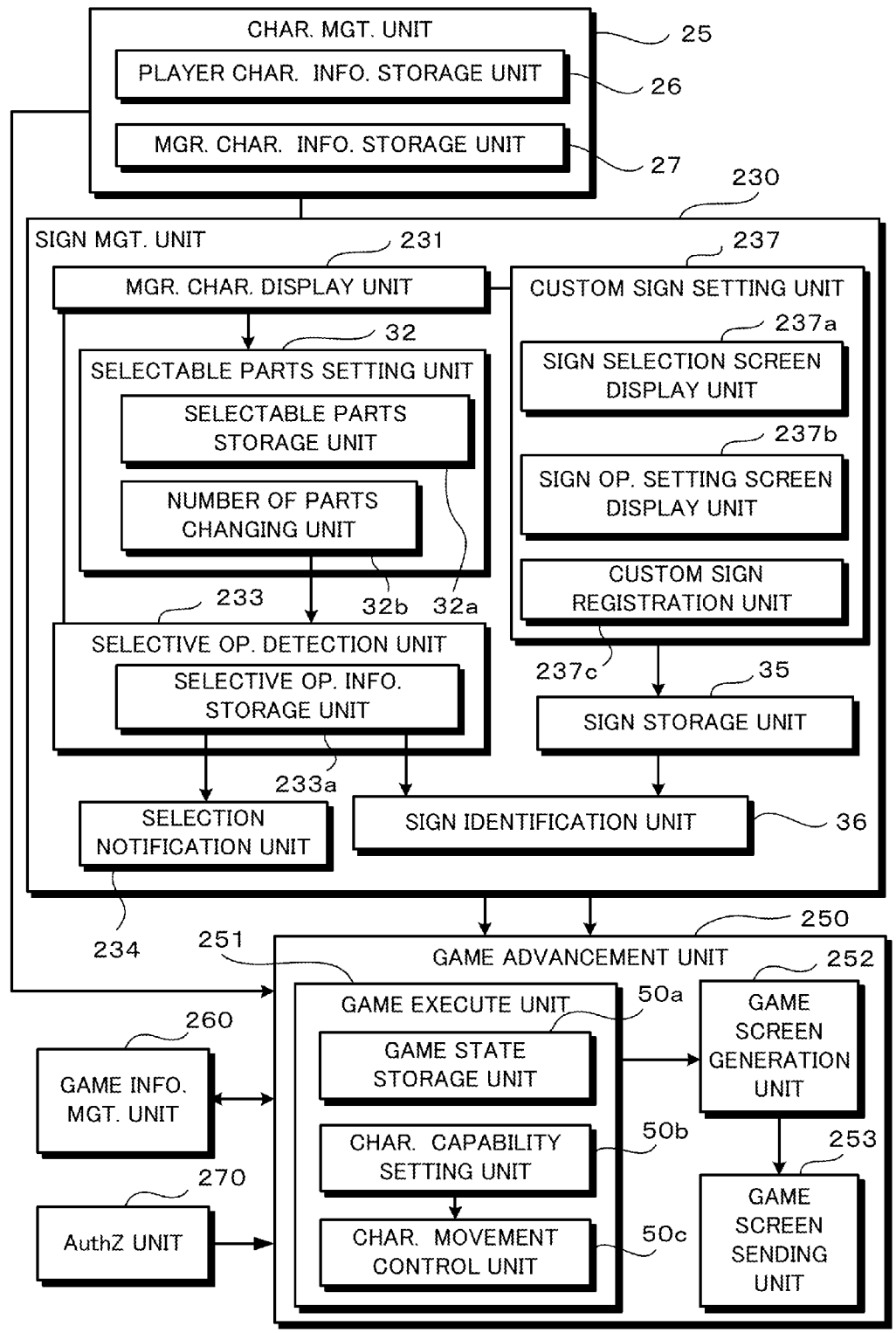
FIG. 20 is a function block diagram showing an example of the functional configuration of the game management device.

Next, the major functions of the game management device having the foregoing configuration (game server 201 and database server 202) will be explained. FIG. 20 is a function block diagram showing major functional configuration of the game management device. Note that the same reference number is given to the same configuration as the configuration shown in the previous explained diagrams (FIG. 1 to FIG. 17), and the explanation thereof is omitted as appropriate.

The game management device of the present embodiment functionally comprises the character management unit 25, sign management unit 230 (instruction management unit) and the game advancement unit 250 as in the cage of the above explained game device 1 (see FIG. 3). The game management device also comprises a game information management unit 260 and an authorization unit 270. The respective units of the game management device are realized by the CPU 211 of the game server 201 executing the program according to the present embodiment. In the following, the configuration of the game management device of the present embodiment will be explained mainly on the parts different from those of the game device 1 shown in FIG. 3.

The sign management unit 230 of the game management device according to the present embodiment comprises a manager character display unit 231 (instruction character display unit), selectable parts setting unit 32, selective operation information receiving unit 233, selection notification unit 234, sign storage unit 35 (instruction storage unit), sign identification unit 36 (instruction identification unit) and custom sign setting unit 237 (instruction operation setting unit).

The manager character display unit 231 has a function of displaying a manager character on a screen of the terminal device 203 by sending information (game screen data, etc.) for displaying the manager character in the terminal device 203 via the network 204. Namely, this manager character display unit 231 is different from the manager character display unit 31 shown in FIG. 3 in that the manager character is displayed on the screen of the terminal device 203 via the network 204, while the manager character display unit 31 displays the manager character on the screen of the game device 1 without via the network. Other than this difference, the manager character display unit 231 basically has the same configuration and function of the manager character display unit 31 shown in FIG. 3.

As described above, the selectable parts setting unit 32 has a function of setting a plurality of predetermined parts of the manager character as selectable parts setting unit 32 as the selectable parts. In the game server 201, as a concrete example of the configuration wherein the selectable parts setting unit 32 realizes the above function, hyperlink may be set to the selectable parts to make the selectable parts selectable objects. Here, as long as the information on the selected selectable parts is sent from the terminal device 203 to the game server 201 when the selective operation for selecting the selectable parts is performed in the terminal device 203, the present embodiment is not intended to limit to the setting of the hyperlink.

The selective operation information receiving unit 233 receives selective operation information from the terminal device 203 when the selectable parts (effective selectable parts set by the selectable parts setting unit 32) of the manager character displayed on the screen of the terminal device 203 are selected by a player. The selective operation information receiving unit 233 comprises the above selective operation information storage unit 33a. The selective operation information storage unit 33a stores, in a storage device (RAM 213 or the like), selective operation information received by the selective operation information receiving unit 233 showing the contents of the selective operation when the plurality of selectable parts of the manager character 70 are selectively operated in the terminal device 203 by a player.

The selection notification unit 234 notifies the player of the fact that the selectable parts have been selected by sending the information for changing the display state of the selectable parts based on whether the selectable parts were selectively operated to the terminal device 203 via the network 204. By the way, it may be arranged so as to set the script (program) operated by plugging in the web browser in the game screen data made up of HTML data and the like to be sent to the terminal device 203 from the game server 201. In this case, the script is executed in the web browser of the terminal device 201, and, for example, a moving game screen (notification screen and the like) is displayed in the terminal device 203. Other than that the notification processing is performed via the network 204, the selection notification unit 234 of the present embodiment basically has the same configuration and function as those of the selection notification unit 34 shown in FIG. 3.

As in the case of the custom sign setting unit 37 shown in FIG. 3, the custom sign setting unit 237 allows the player to arbitrarily edit and set the contents of the sign operation to one's own preference. The custom sign setting unit 37 comprises a sign selection screen display unit 237a (instruction selection screen display unit), a sign operation setting screen display unit 237b (instruction operation setting screen display unit) and a custom sign registration unit 237c (registration unit). Other than that the processing is performed while carrying out the sending and receiving of information with the terminal device 203 via the network 204, the custom sign setting unit 237 basically has the same configuration and function as the custom sign setting unit 37 shown in FIG. 3.

The sign selection screen display unit 237a has a function of displaying the sign selection screen on the screen of the terminal device 203 by sending the information for displaying the above described sign selection screen shown in FIG. 11B, to the terminal device 203. As explained earlier, the player can select the signs to be customized on the sign selection screen. When the player performs the selective operation of the sign on the sign selection screen of the terminal device 203, the sign selection screen display unit 237a receives the selected information from the terminal device 203 via the network 204 and stores the selected information as received in the storage device (RAM 213 and the like).

The sign operation setting screen display unit 237b displays on the screen of the terminal device 203 by sending the information for displaying the above described sign operation setting screen shown in FIG. 11D to the terminal device 203. On the sign operation setting screen, for instance, as shown in FIG. 11E, the player can set the operation of the signs to be customized). When a player performs an operation of selecting the plurality of selectable parts on the sign operation setting screen of the terminal device 203, the custom sign registration unit 237c receives the selected information from the terminal device 203 via the network 204 and stores the selected information as received in the storage device (RAM 213 and the like).

The custom sign registration unit 237c registers, as update information of the associated information stored in the sign storage unit 35 (associated information table of FIG. 5), i) the correspondence of the sign selected on the sign selection screen shown in FIG. 11B, and ii) information related to the operation order of the plurality of settable areas that were selectively operated on the sign operation setting screen shown in FIG. 11E as received from the terminal device 203.

Figure 21:
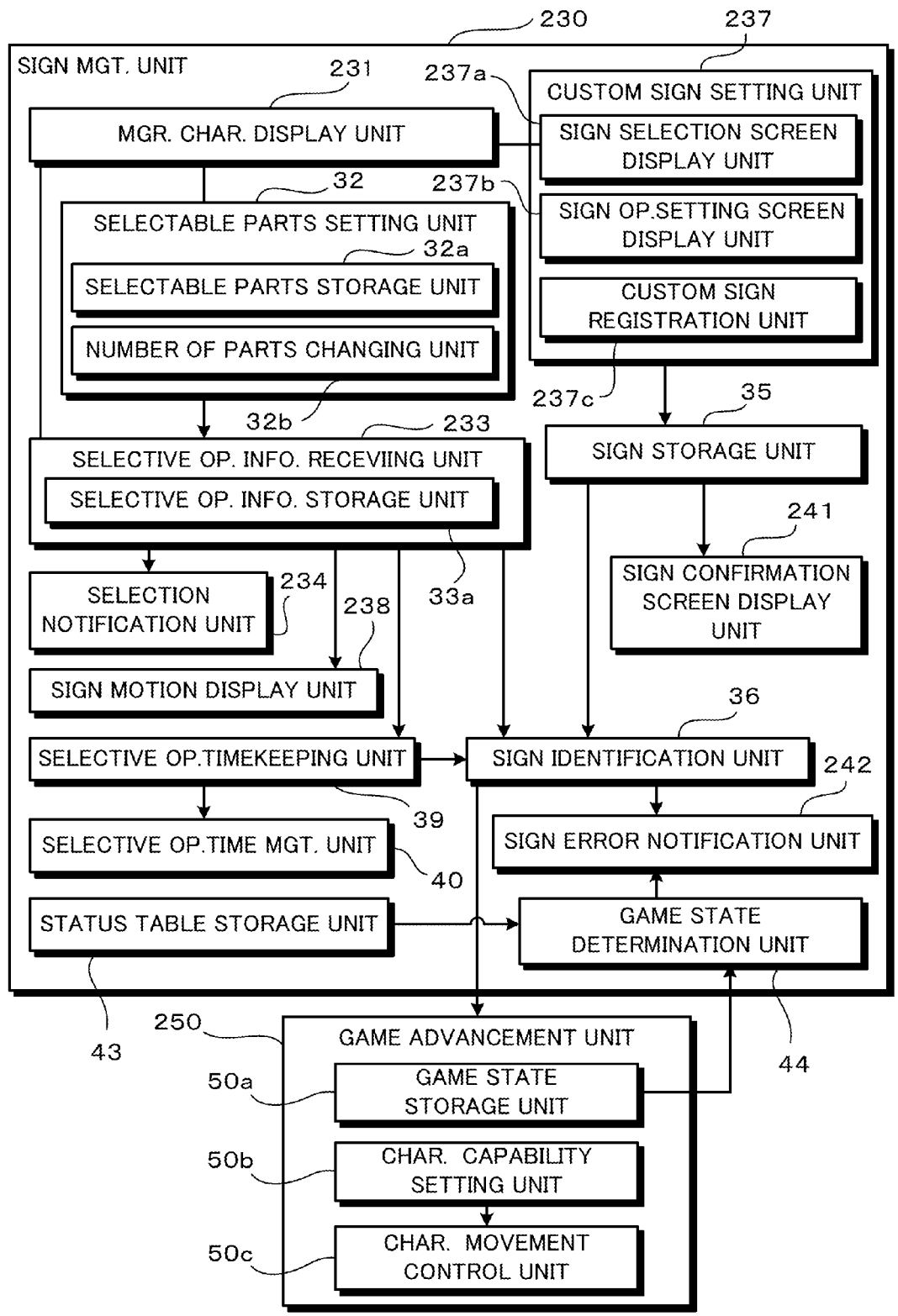
FIG. 21 is a function block diagram showing another of the functional configuration of the game management device.

Moreover, as shown in FIG. 21, the sign management unit 230 may further comprise, as shown in FIG. 6, the sign motion display unit 238 (instruction motion display unit), selective operation timekeeping unit 39, selective operation time management unit 40, sign confirmation screen display unit 241 (instruction operation confirmation screen display unit), sign error notification unit 242 (instruction operation error notification unit), status table storage unit 43 and game state determination unit 44. The respective units are realized by the CPU 211 of the game server 201 executing the program according to the present embodiment.

The sign motion display unit 238, the sign confirmation screen display unit 241 and the sign error notification unit 242 of the sign management unit 230 according to the present embodiment different from the respective unit 38, 24 and 42 shown in FIG. 5 in the following points. That is, the respective units 238, 241 and 242 according to the present embodiment control the display with respect to the terminal device 203 by sending the information to be displayed (game screen data and the like) to the terminal device 203 via the network 204 while the respective units 38, 24, and 42 shown in FIG. 6 perform display processing on the screen of the game device 1 without via the network. Other than this difference, the sign motion display unit 238, the sign confirmation screen display unit 241 and the sign error notification unit 242 basically have the same configuration and function as those of the units 38, 41 and 42 shown in FIG. 6 respectively.

Figure 13:
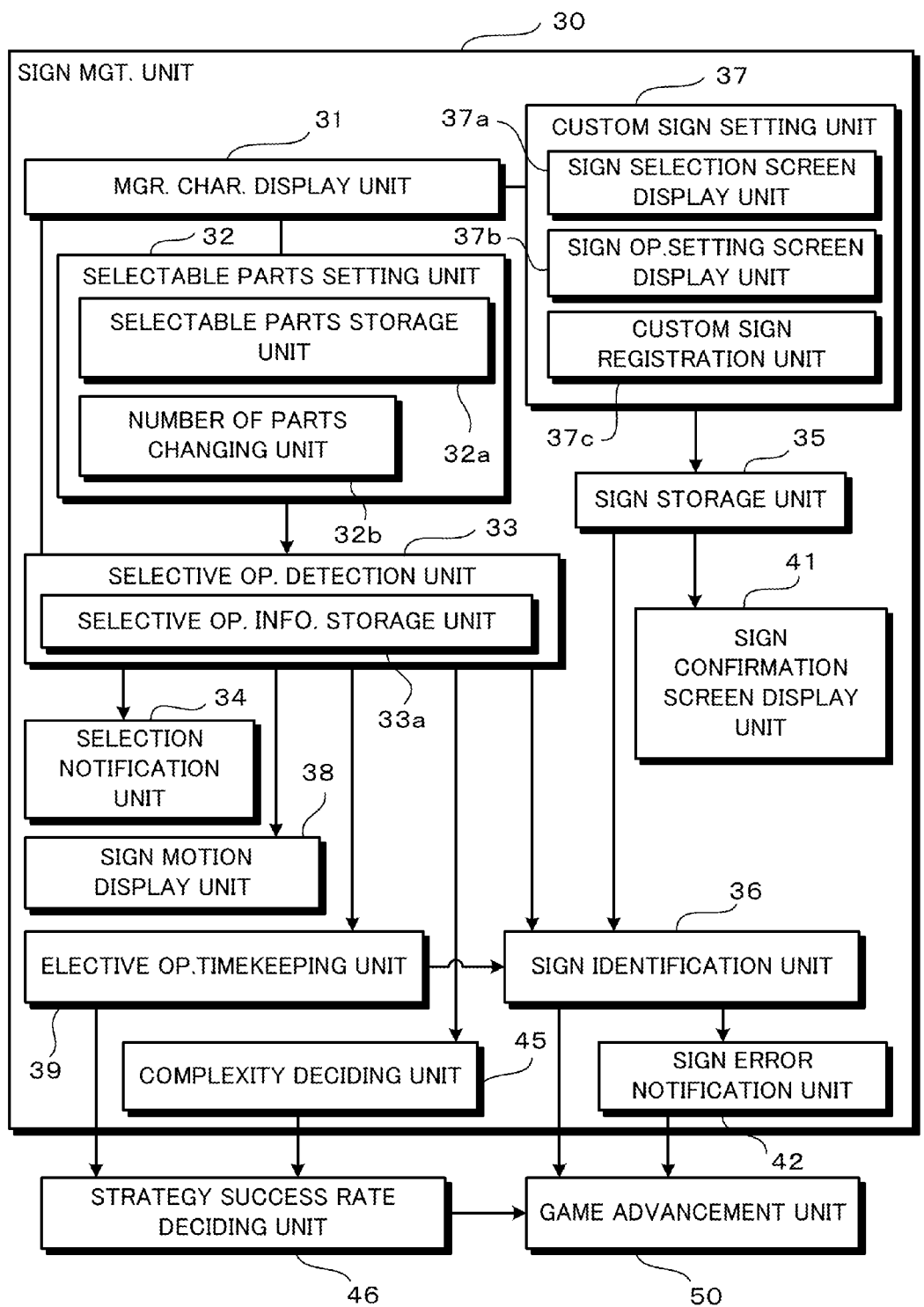
FIG. 13 is a function block diagram showing another example of the functional configuration of the game device.
Figure 22:
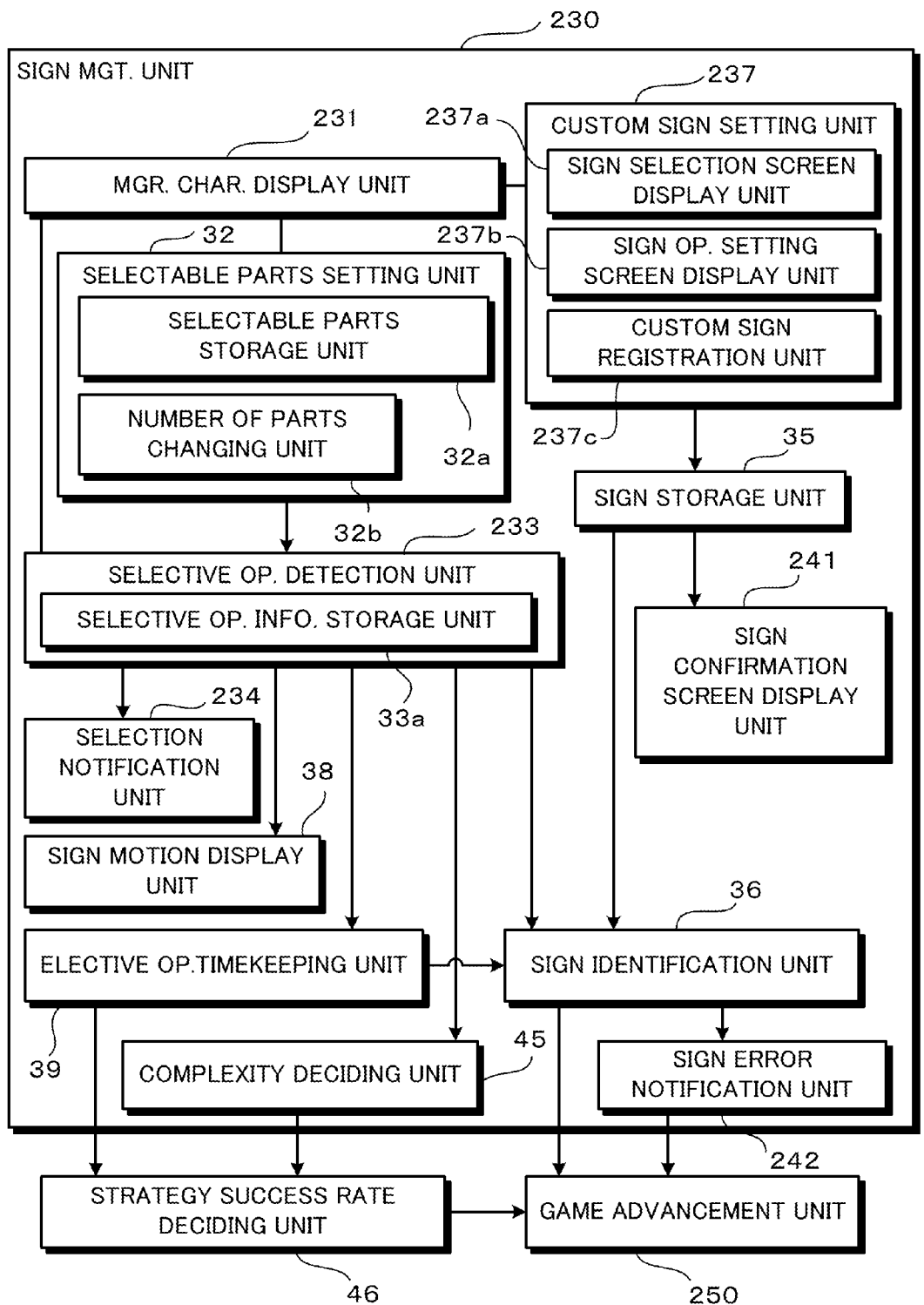
FIG. 22 is a function block diagram showing another of the functional configuration of the game management device.

Furthermore, as shown in FIG. 22, the sign management unit 230 of the game server 201 may additionally comprise complexity deciding unit 45 as in the case of the sign management unit 30 shown in FIG. 13. Moreover, the game server 201 may additionally comprise the strategy success rate deciding unit 46.

Figure 23:
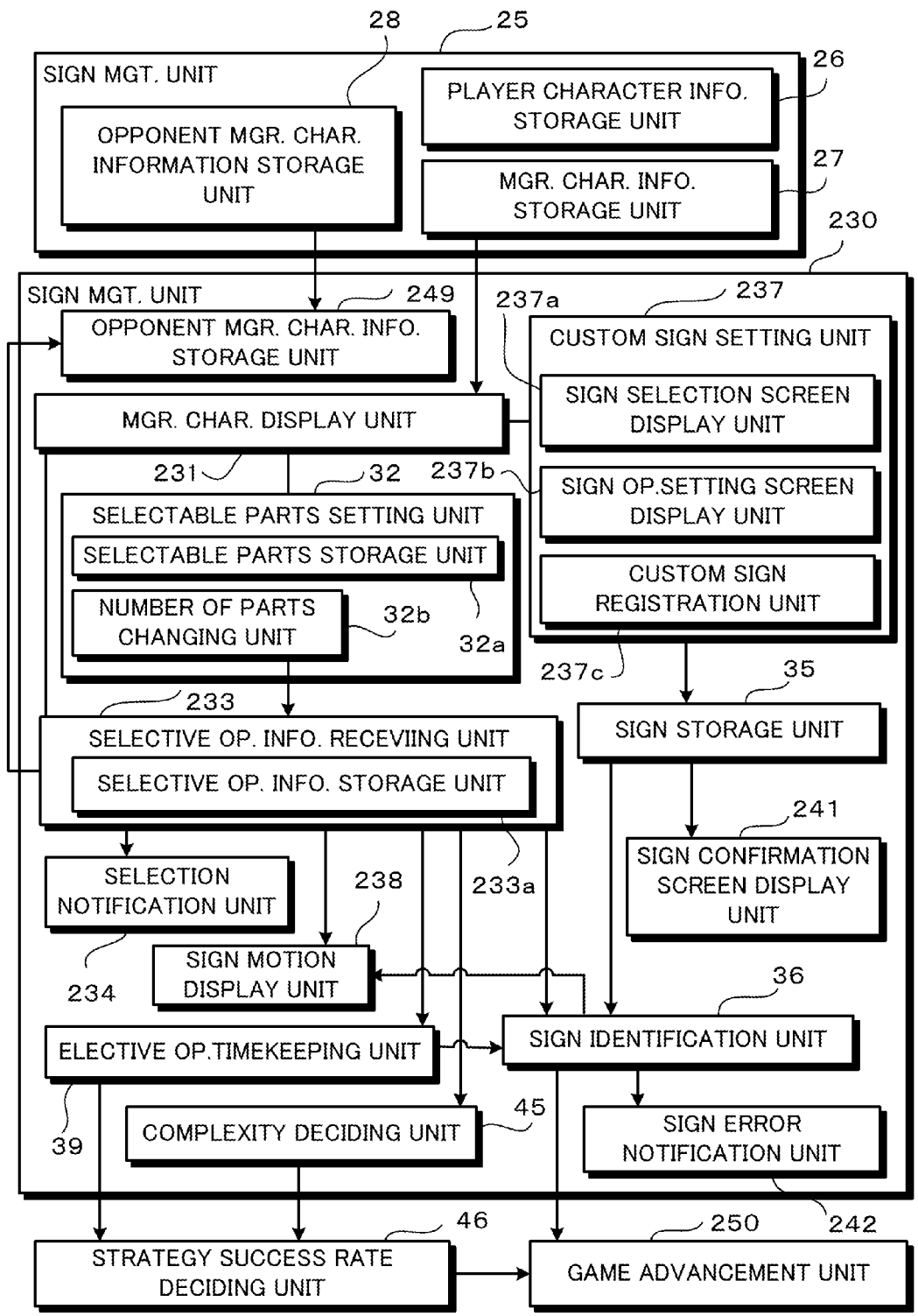
FIG. 23 is a function block diagram showing another of the functional configuration of the game management device.

As shown in FIG. 23, the game server 201 according to the present embodiment may additionally comprises the opponent manager character information storage unit 28 (opponent-side instructing character information storage unit), and an opponent manager character display unit 249 (opponent-side instructing character display unit) as in the case of the configuration shown in FIG. 16. The constituent elements 28, 47, 48 are realized by the control unit 10 of FIG. 2 executing the game program. With this configuration, it is possible for the server 201 to provide a game which permits the signs given by the respective opponents to be viewed on the screen of their own terminal devices in the case where two players perform competition when both of the terminal devices 203 of two players make access to the game server 201.

The opponent manager character display unit 249 according to the present embodiment different from the opponent manager character display unit 49 shown in FIG. 16 in the following points. That is, the opponent manager character display unit 249 according to the present embodiment controls the display with respect to the terminal device 203 by sending the information to be displayed on the terminal device 203 via the network 204 while the opponent manager character display unit 49 shown in FIG. 16 performs display processing on the screen of the game device 1 without via the network.

For example, the situation where the player A and the player B make a competition when the terminal device 203A of the player A and the terminal device 203B of the player B make access to the game server 201 is considered. When the sign operation is performed by the player A, the selective operation information is sent to the game server 201 from the terminal device 203A of the player A. Then, the selective operation information receiving unit 233 of the server 201 receives the selective operation information of the player A and sends the information as received to the opponent manager character display unit 249. Then, the opponent manager character display unit 249 sends the display control information to the terminal device 203 of the player B, and displays on the screen of the terminal device 203 of the player B, the opponent manager character in the display state according to the selective operation information of the opponent (player A in this case).

The game advancement unit 250 shown in FIG. 20, etc., has the function of advancing the game according to the operation of the terminal device 203 by the player, generating the game image data according to the result of execution and sending the game image data to the terminal device 203, and further displaying the game image according to the operation of the player in the terminal device 203. This game advancement unit 250 comprises a game execution unit 251, a game screen generation unit 252, and a game screen sending unit 253. The game advancement unit 250 comprises a game execution unit 251, a game screen generation unit 252 and a game screen sending unit 253.

When a game screen is displayed by the web-browser of the terminal device 203 of the player, in the case where a player carries out an operation of selecting a selectable object or a hyperlink on the game screen, a request on the game screen according to the operation is sent to the game server 201 by the web-browser of the terminal device 203. In the game server 201 which receives this request, the game execution unit 251 reads out the game data of the player according to the request and carries out the computation and the data processing to execute the game.

The game execution unit 251 comprises a game state storage unit 50a, a character capability setting unit 50b, and a character movement control unit 50c as in the case of the game advancement unit 50 shown in FIG. 3.

The game screen generation unit 252 generates game screen data made up of, for example, HTML data according to the result of execution by the game execution unit 251. In the HTML data, a script (program) may be set to be operated by plugging in the web browser of the terminal device 203.

The game screen sending unit 253 sends game screen data (HTML data, etc.) generated by the game screen generation unit 252 to the terminal device 203 of the player as a response to the request on the game screen. In the terminal device 203 of the player which receives this game screen data, a game screen is displayed by the web-browser.

The game information management unit 260 manages game data of respective players by storing them in the database server 202. The items of the game data managed by the game information management unit 260 differ depending on the contents of the game service to be provided to players by the game server 201. For example, in the case of a game in which the empirical value is accumulated as a player advances the game, and the player's game level is upgraded when the empirical value reaches a predetermined value, the game information management unit 260 stores the data on the empirical value or the game level upon associating such information with the player ID for identifying the respective players in a predetermined memory region of the database server 202 for respective players. In the case of a baseball game in which a player acquires player characters in a game, and performs a game (competition) with other player by using the player characters in the game, the game information management unit 260 stores the data on the player characters which the player acquired in the game upon associating such information with the player ID for identifying the respective players in a predetermined memory region of the database server 202 for respective players.

The game information management unit 260 stores information on respective players such as login IDs, passwords, players' names, and the like in association with the player IDs in a predetermined memory region of the database server 202.

As described, in the game server 201, the game data on a plurality of players are managed, and therefore various kinds of data are managed in association with the player IDs. The game information management unit 260 stores information on respective players such as login IDs, passwords, players' names, and the like in association with the player IDs in a predetermined memory region of the database server 202. In the above explained sign management unit 230, the data on the signs of plurality of players are managed. Therefore, the sign management unit 230 manages the data on the signs of respective players in association with the player IDs of respective players.

The authorization unit 270 performs a login authorization when a player who wishes to receive game services access (log onto) the game server 201 by operating the terminal device 203 by determining the game participation qualification of the respective players. As an example of this authorization, the authorization based on the login ID and the password associated with the player ID may be adopted.

The game server 201 may additionally have the colleague management function, the message transmission function and the like. The colleague management function is the function of storing in the database server 202 the data on respective colleague players who belong to the group having each player on the center, and performs the management of the colleagues for respective players. The message transmission function is the function of receiving a message to other player from the terminal device 203 of each player, and transmitting to the terminal device 203 of that other player.

[Operation of Game System]

In the foregoing configuration, an operational example of the game system according to an embodiment of the present invention is now explained with reference to the flowchart of FIG. 24. FIG. 24 shows a flow of the processing by the terminal device 203 and the game server 201 when the player receives game services by operating the terminal device 203 to make an access to the game server 201.

When a user receives game services, first the web browser is activated by operating an operation input unit of the terminal device 203 (S411). Then, the player performs an operation of making an access to the game site managed by the game server 201. As a result, an access request is transmitted from the terminal device 203 to the game server 201 (S412). Here, the game server 201 performs a login authorization with respect to the access from the terminal device 203 (S421), and confirms if it is an access from the player who made a user registration for using game services. Thereafter, the game server 201 transmits the main screen data described in HTML and the like to the terminal device 203 (S422). Then, in the terminal device 203 which received the main image data, the web browser interprets the data and makes the main screen (initial screen shown in FIG. 11A, for example) display on the display unit (S413).

Here, when the player performs an operation of selecting an object such as a selectable button or the like, or hyperlink displayed on the screen, the request on the screen according to the operation is transmitted from the terminal device 203 to the game server 201 (S414). The game server 201 which received this request performs the computing processing or data processing according to the operation by the user to execute the game (S423), and then transmits the game screen data reflecting the result of execution to the terminal device 203 (S424). Then, in the terminal device 203 which received the screen data, the web browser interprets the data and makes the game screen display on the display unit (S415).

Thereafter, in the terminal device 203 of the player, the above S414 and S415 are repeated, while the above S423 and S424 are repeated in the game server 201. As a result, each time the user performs an operation of selecting a selectable button or the like displayed on the screen of the terminal device 203, the game screen of the terminal device 203 is switched to one after another, to advance the game.

Thereafter, when the player closes the game screen by operating the terminal device 203 (S416), the game server 201 performs logout processing (S425). For example, when the player closes the web browser, the game server 201 performs the logout processing after the session time out.

Then, according to this game system, even when the player logs out of the game server 201, it is possible to advance the game on the side of the game server 201 by reading out the game data of the player. For example, it is possible for other player to try competition with respect to the player who is logged out of the game. The game advancement unit 250 of the game server 201 executes the competition by reading out the game data of respective players from the database server 202 irrespectively of whether or not the player is logged in, and the game data of respective players are updated by reflecting the result of execution. Note here that in the case of the competition game in which players confirm signs given by the respective opponents each other, the both of the players are required to be logged in the game server 201.

The flow of each processing (sign activation processing, and the like) in the game management device according to the present embodiment is basically the same as the flow of each processing of the game device 1 already explained with reference to the flowcharts of FIG. 8, FIG. 10, FIG. 12, FIG. 14, FIG. 17, etc. Namely, the flow of the processing of the game management device of the present embodiment is in common with the flow of the processing of the game device 1 although in the game management device, each processing is performed while carrying out the transmission and receiving of data with the terminal device 203 via the network 204, while in the game device 1, each processing is executed within the device 1. Therefore, the explanations on the flow of each processing in the game management device according to the present embodiment are omitted.

Thereafter, when the player closes the game screen by operating the terminal device 203 (S416), the game server 201 performs logout processing (S425). For example, when the player closes the web browser, the game server 201 performs the logout processing after the session time out.

As described, the characteristic configuration of the present invention is applicable to the game management device (game server 201, database serve 202) providing players of various kinds of games including social games, and the like. Therefore, the game management device of the present embodiment is capable of providing games which realize input operations that offer sensory amusement while reducing the processing load.

The foregoing explanations have been given through the case where the game management device made up of the game server 1, and the like comprises the sign management unit 230, and when a user performs a sign operation on the side of the terminal device 203, the sign is identified on the side of the game management device. However, it may be arranged such that the sign identification is performed on the side of the terminal device 203. In this case, the sign (instruction content) is identified on the side of the terminal device 203, and the data of the sign as identified is transmitted to the game serer 1 (game management device) via the network 204. Then, in the game server 1, the game is advanced by reflecting the sign data received from the terminal device 203 in the game. It is therefore possible to realize a game system wherein the game management device having the configuration shown in FIG. 20 from which the sign management unit 230 is omitted is connectable to the game device (terminal device 203) having the configuration shown in FIG. 3 from which the game advancement unit 50 is omitted via the network 204.

Summary of the Embodiments (1) As described above, the game device according to one aspect of the present invention is a game device in which a character in a virtual space is operated via an instructing character, comprising an instructing character display unit for displaying the instructing character on a screen; a selectable parts setting unit for setting, as selectable parts, a plurality of predetermined areas of the instructing character, an instruction storage unit for storing, in a storage device, associated information related to a selected order or a combination of the plurality of selectable parts, and an instruction; and an instruction identification unit for identifying an instruction corresponding to a selected order or a combination of the selectable parts based on the associated information when a plurality of selectable parts of the instructing character are selectively operated.

According to the foregoing configuration, a player of the game device can play the game by operating a character in a virtual space via an instructing character. For example, in a baseball game, the player can operate a character by giving an instruction (sign) to that character (player character such as a batter or a pitcher) in a virtual game space via a manager character as the instructing character. In order to enable the operation via the instructing character, the instructing character display unit displays the instructing character on the screen. Moreover, the selectable parts setting unit sets, as selectable parts, a plurality of predetermined areas of the instructing character displayed on the screen. For example, in the example of the foregoing baseball game, a plurality of predetermined areas such as the head, shoulder, hand, and chest of the manager character displayed on the screen are set as the selectable parts.

In addition, while the player gives an instruction to the character in a virtual space by selectively operating a plurality of selectable parts of the instructing character displayed on the screen, the instruction is decided based on the selected order or combination of the plurality of selectable parts. In other words, the instruction storage unit preliminarily stores, in a storage device, associated information related to the "selected order or combination of the plurality of selectable parts" and the "instruction". For example, in the example of the foregoing baseball game, the correspondence that the selected order (or combination) of "head→right shoulder→left shoulder" of the manager character is a sign for hit-and-run is stored in the storage device in advance.

In addition, when a plurality of selectable parts of the instructing character displayed on the screen are selectively operated by the player, the instruction identification unit identifies the instruction corresponding to the selected order or combination of the selectable parts based on the associated information stored in the instruction storage unit. For example, in the example of the foregoing baseball game, when "head→right shoulder→left shoulder" of the manager character displayed on the screen are selectively operated by the player, the instruction corresponding to the selected order (or combination) of "head→right shoulder→left shoulder" is identified as the sign for hit-and-run based on the preliminarily stored associated information.

The instruction that is identified as described above can be reflected in the game. For example, in the example of the foregoing baseball game, when it is identified that the instruction is a sign for hit-and-run, the foregoing instruction can be reflected in the game by causing the batter character in the virtual space to engage in batting and causing the runner character to engage in base-running.

As described above, with the present game device, the player can give various instructions to the character in the virtual space by selectively operating the plurality of selectable parts of the instructing character displayed on the screen and changing the selected order or combination thereof. To selectively operate a plurality of selectable parts of the instructing character on the screen as described above is similar to the feeling of, for instance, a manager of a baseball team or the like in the real world giving a blocking signal by touching his/her head, shoulder or the like with one's hand. Thus, it is possible to realize a sensory operation of a blocking signal by a manager in the game, and offer amusement that was not available in conventional games.

Moreover, in comparison to the conventional configuration of recognizing the trajectory geometry and activating a command, the present game device can realize the recognition of various instructions in a state of keeping the processing load low. In other words, conventionally, in addition to the necessity of performing image recognition of the trajectory geometry as described above, it was also necessary to give consideration to the blurring of the trajectory plotting caused by the hand movement of the player, and the load of the processing unit (CPU or the like) increased. However, with the present game device, the plurality of selectable parts of the instructing character are predetermined, and the instruction can be easily recognized only from the selected order or combination of the selectable parts. Moreover, with respect to the recognition (identification) of an instruction in the present game device, what is important is whether the predetermined selectable parts were selectively operated, and there is no need to give consideration to the blurring of the trajectory plotting caused by hand movement as with conventional technology. In particular, with smartphones, portable phones and the like, the player tends to jiggle one's hand since the player performs screen operations with one hand while holding the device with the other hand. With respect to this point, the present configuration yields a useful effect by being loaded in the foregoing platforms. Consequently, the present game device can inhibit the processing load to be lower than conventional technology, and additionally realize the recognition of various instructions according to the selected order to combination of the selectable parts.

Moreover, since the plurality of selectable parts of the instructing character (in the foregoing example, the head, shoulder, hand, chest and so on of the manager character) are predetermined, even if the instructing character is in a state of moving slightly, the player can still selectively operate the selectable parts. That is, the instructing character on the screen can be moved to an extent which will not hinder the player from selectively operating the selectable parts. Consequently, without limitation to a display presentation where the screen becomes fixed and impairs the game amusement, various images can be displayed.

As described above, according to the present configuration, input operations that offer sensory amusement such as blocking signals are enabled without losing the freedom of image presentation while still inhibiting the processing load, and a highly amusing game can be realized.

(2) In the configuration of (1) above, preferably, the instructing character display unit displays the instructing character on the screen based on an operation of pausing the advancement of the game, and clears the instructing character from the screen after the instruction is identified by the instruction identification unit.

According to the foregoing configuration, since the instructing character (for instance, a manager character in the case of a baseball game) is displayed on the screen when an operation for pausing the advancement of the game is performed, the selectable parts of the instructing character can be selectively operated in a state where the advancement of the game is paused. Consequently, it is possible to avoid a situation where the game advances and the scene is changed while the player is selectively operating the selectable parts and the player misses the change to give one's instruction, and ensure the time for the player to perform the selective operation. Moreover, there is no need to perform two operations in order to ensure the time for the player to perform the selective operation; namely, the operation for pausing the advancement of the game and the operation for displaying the instructing character on the screen, and, based on the operation of pausing the advancement of the game, it is possible to selectively operate the selectable parts of the instructing character in a state where the advancement of the game is paused.

Moreover, since the instructing character is cleared from the screen after the instruction is identified, it is possible to display the instructing character on the screen only during the period that the player is performing the selective operation. This, for example, is especially effective when the screen is small as with a portable game device. In other words, even in cases where the screen is small and the display space is limited, the small game screen can be effectively used by displaying the instructing character on the screen only while the player is performing the selective operation.

(3) In the configuration of (1) or (2) above, preferably, the game device further comprises a selection notification unit for notifying that the selectable part has been selected by changing a display state of the selectable part depending on whether the selectable part has been selectively operated.

According to the foregoing configuration, since the display state of the selectable part is changed depending on whether that selectable part has been selectively operated (for instance, changing the brightness, color, shape or the like of the selectable part), it is possible to clarify, on the screen, which selectable part of the instructing character has been selectively operated. Consequently, the player can accurately and smoothly perform the series of selective operations.

(4) In any one of the configurations of (1) to (3) above, preferably, the game device further comprises an instruction operation setting unit capable of setting associated information related to a selected order or a combination of the plurality of selectable parts stored in the instruction storage unit, and an instruction, wherein the an instruction operation setting unit comprises (a) an instruction selection screen display unit for displaying an instruction selection screen for selecting the instruction, (b) an instruction operation setting screen display unit for displaying an instruction operation setting screen comprising a plurality of settable areas corresponding to the plurality of selectable parts, and (c) a registration unit for storing, in the instruction storage unit, a correspondence of an instruction selected on the instruction selection screen and information on an operation order or combination of the plurality of settable areas which were selectively operated on the instruction operation setting screen as update information of the associated information.

According to the foregoing configuration, the player may, for example, in a baseball game, create and set one's own original signs as the blocking signals to be given by a manager. In other words, an instruction can be selected on the instruction selection screen displayed by the instruction selection screen display unit, and a plurality of settable areas can be selectively operated on the instruction operation setting screen displayed by the instruction operation setting screen display unit and the operation order or combination thereof can be input. Note that the input operation on the instruction selection screen or the input operation on the instruction operation setting screen may be performed first. In addition, the registration unit stores, in the instruction storage unit, the correspondence of the "instruction selected on the instruction selection screen" and the "information related to the operation order or combination of the settable areas which have been selectively operated on the instruction operation setting screen" as the update information of the associated information related to the selected order or combination of a plurality of selectable parts, and an instruction. Consequently, since the player can set or change the relationship of the selected order or combination of a plurality of selectable parts of the instructing character and the instruction according to one's own preference, it is possible to realize a highly amusing game in which the player will not grow tired of dormant operations.

(5) In any one of the configurations of (1) to (4) above, preferably, the selectable parts setting unit comprises a number of parts changing unit for changing the number of selectable parts to be set on the instructing character.

According to the foregoing configuration, since the number of selectable parts of the instructing character can be changed by the number of parts changing unit, the selective operation can be simplified or made complicated. For example, setting the seven locations of head, both shoulders, both hands, chest, and abdomen as the selectable parts rather than setting only the five locations of head, both shoulders, and both hands of the instructing character will increase the target parts and cause the selective operation to be more complicated. It is thereby possible to adjust the complexity of the selective operation according to the proficiency level of the player's operation.

(6) In any one of the configurations of (1) to (5) above, preferably, the game device further comprises a game advancement unit for advancing the game by reflecting the instruction identified by the instruction identification unit in the game; a selective operation timekeeping unit for timekeeping the time required for the series of selective operations of the selectable parts corresponding to the instruction identified by the instruction identification unit; and a strategy success rate deciding unit for deciding a strategy success rate so that a success rate of a game strategy corresponding to the instruction is set higher as the time that has been time-kept by the selective operation timekeeping unit becomes shorter, wherein the game advancement unit reflects the strategy success rate decided by the strategy success rate deciding unit in the game.

According to the foregoing configuration, the time of the series of selective operations is time-kept, the success rate of the strategy corresponding to the series of selective operations is decided based on the selective operation time, and the decided strategy success rate is reflected in the game. That is, the shorter the time of the series of selective operations (the faster the player performs the selective operations), the probability that the strategy (hit-and-run, for example) corresponding to the instruction will be successful will increase when the instruction corresponding to the series of selective operations (for example, a sign for high-and-run in a baseball game) is reflected in the game. Accordingly, it is possible to add an amusing game element of reflecting the time required for the player to perform the operation via an instructing character in the strategy success rate, which was previously unheard of, and thereby increase the game amusement.

(7) In any one of the configurations of (1) to (6) above, preferably, the game device further comprises a game advancement unit for advancing the game by reflecting the instruction identified by the instruction identification unit in the game; a complexity deciding unit for deciding complexity of the series of selective operations of the selectable parts corresponding to the instruction identified by the instruction identification unit, and a strategy success rate deciding unit for deciding a strategy success rate so that a success rate of a game strategy corresponding to the instruction is set higher as the complexity decided by the complexity deciding unit becomes higher, wherein the game advancement unit reflects the strategy success rate decided by the strategy success rate deciding unit in the game.

According to the foregoing configuration, the success rate of the strategy corresponding to the series of selective operations is decided based on the complexity of the series of selective operations, and the decided strategy success rate is reflected in the game. That is, the higher the complexity of the series of selective operations (the more complex the selective operations performed by the player), the probability that the strategy (hit-and-run, for example) corresponding to the instruction will be successful will increase when the instruction corresponding to the series of selective operations (for example, a sign for high-and-run in a baseball game) is reflected in the game. Accordingly, it is possible to add an amusing game element of reflecting the complexity of the operations performed by the player via an instructing character in the strategy success rate, which was previously unheard of, and thereby increase the game amusement.

(8) In any one of the configurations of (1) to (7) above, preferably, the game is a competition game to be played between a plurality of game devices, and the game device further comprises send unit for sending, to a game device of an opponent, selective operation information showing contents of the selective operation when a plurality of selectable parts of the instructing character are selectively operated, receiving unit for receiving the selective operation information related to the opponent which has been sent from the game device of the opponent; and an opponent-side instructing character display unit for displaying, on the screen, an instructing character of the opponent in a display state corresponding to the selective operation information related to the opponent which has been received by the receiving unit.

According to the foregoing configuration, in a competition game to be played between a plurality of game devices, when a selective operation is performed by a certain game device (this game device is referred to as "game device A") via an instructing character, the sending unit sends the selective operation information to the opponent's game device (this game device is referred to as "game device B"). In addition, in the game device B, the receiving unit receives the selective operation information which has been sent from the game device A, and the opponent-side instructing character display unit displays the instructing character of the opponent A on the screen in a display state corresponding to the selective operation information. Consequently, the player of the game device B can visually recognize the instructing character of the opponent A displayed on the screen in a display state corresponding to the selective operations performed by the player of the game device A. For example, assuming a case where the player of the game device A performs the selective operations of head→right shoulder→left shoulder of the instructing character, that selective operation information is sent to the game device B, and, on the screen of the game device B, the opponent-side instructing character of a display state corresponding to the selective operations of head→right shoulder→left shoulder is displayed (for example, on the screen of the game device B, an image in which the instructing character of the opponent A moves one's hand to one's head→right shoulder→left shoulder is displayed).

Accordingly, the competing players can mutually confirm on the screen the contents of the selective operations that have been performed by the opponent. Consequently, the respective players can map out strategies by predicting the instructions given by the opponent while confirming the contents of the opponent's selective operations on the screen, and it is possible to add an amusing game element which was previously unheard of, and thereby further increase the game amusement.

For example, in a baseball game of the real world, since the sign given by the manager or the coach during the game is also visible to the opponent manager and others, unmentionable instructions are conveyed to the players of one's own time in the form of blocking signals and the like. Meanwhile, the opponent's manage that saw the sign detects (anticipates) the sign and devises a strategy. The present game device can realize this kind of situation that is similar to a baseball game of the real world in a competition game of players located closely or remotely.

(9) In any one of the configurations of (1) to (8) above, preferably, the game device comprises a contact-input-type display unit which allows input operations by contacting the screen.

According to the foregoing configuration, while the instructing character is displayed on the screen by the instructing character display unit, the player can selectively operate the selectable parts of the instructing character by contacting the screen of the contact-input-type display unit using one's finger, a pen or the like. Consequently, since the player can intuitively perform input operations by directly contacting the instructing character displayed on the screen, it is possible to realize a sensory operation during the game as though the player is actually giving blocking signals, and thereby offer amusement that was not offered in conventional games.

(10) The game control method according to another aspect of the present invention is a game control method of a computer controlling a game in which a character in a virtual space is operated via an instructing character, comprising an instructing character display step of the computer displaying the instructing character on a screen; a selectable parts setting step of the computer setting, as selectable parts, a plurality of predetermined areas of the instructing character, an instruction storage step of the computer storing, in a storage device, associated information related to a selected order or a combination of the plurality of selectable parts, and an instruction, and, an instruction identification step of the computer identifying an instruction corresponding to a selected order or a combination of the selectable parts based on the associated information when a plurality of selectable parts of the instructing character are selectively operated.

(11) The program according to yet another aspect of the present invention is a program for causing a computer to operate as the foregoing game device, and causes the computer to function as the respective unit of the game device.

(12) The recording medium according to yet another aspect of the present invention is a non-transitory computer-readable recording medium having the program of (11) above recorded thereon.

(13) The game management device according to yet another aspect of the present invention is a game management device which receives an access from a terminal device of each player via a network and provides to each player, via the network, a game service of a game in which a character is operated via an instructing character, comprising an instructing character display unit for displaying an instructing character on a screen of the terminal device by sending information for displaying the instructing character on the terminal device; a selectable parts setting unit for setting, as selectable parts, a plurality of predetermined areas of the instructing character, an instruction storage unit for storing, in a storage device, associated information related to a selected order or a combination of the plurality of selectable parts, and an instruction; and an instruction identification unit for receiving information related to a selective operation from the terminal device when the terminal device selectively operates a plurality of selectable parts of the instructing character, and identifying an instruction corresponding to a selected order or a combination of the selectable parts based on the associated information.

According to the foregoing configuration, the present game management device receives an access from the terminal device of each player via a network and provides a game service to each player via the network, and is configured, for example, from an information processing device such as a server that can be connected to a network. As the game service that is provided to the respective players by the present game management device, for example, there is a service of a social game or the like where the players can play the game while cooperating or communicating with each other.

Moreover, the game that is provided to the respective players by the present game management device is a game in which a character is operated via an instructing character, and the instructing character is displayed on a screen of the terminal device by the instructing character display unit sending information for displaying the instructing character on the terminal device.

The game management device of the present embodiment comprises the selectable parts setting unit, the instruction storage unit, and the instruction identification unit explained in the above (1), and capable of giving various instructions to a character by a player's operation of selecting among a plurality of selective parts of the instruction character displayed on the screen of the terminal device. According to the foregoing constitution, it is possible to provide a highly amusing game to players, which permits sensory input operations while reducing the processing load as in the case of the above configuration (1).

(14) In the configurations of (13) above, preferably, the instructing character display unit displays the instructing character on the screen based on an operation of pausing the advancement of the game in the terminal device, and clears the instructing character from the screen after the instruction is identified by the instruction identification unit. According to the foregoing configuration, the same function and effect as those of the configuration (2) above can be exhibited.

(15) In the configuration of (13) or (14) above, preferably, the game device further comprises a selection notification unit for notifying that the selectable part has been selected by changing a display state of the selectable part depending on whether the selectable part has been selectively operated. According to the foregoing configuration, the same function and effect as those of the configuration (3) above can be exhibited.

(16) In any one of the configurations of (13) to (15) above, preferably, the game management device further comprises an instruction operation setting unit capable of setting associated information related to a selected order or a combination of the plurality of selectable parts to be stored in the instruction storage unit; and an instruction, wherein the instruction operation setting unit comprises (d) an instruction selection screen display unit for displaying an instruction selection screen for selecting the instruction by transmitting to the terminal device the information for displaying the instruction selection screen for selecting the instruction, (e) an instruction operation setting screen display unit for making the terminal device display an instruction operation setting screen comprising a plurality of settable areas corresponding to the plurality of selectable parts, and (f) a registration unit for receiving information on an operation from the terminal device when the operation is performed with the instruction selection screen or the instruction operation setting screen, and storing, in the instruction storage unit, a correspondence of an instruction selected on the instruction selection screen and information on an operation order or combination of the plurality of settable areas which have been selectively operated on the instruction operation setting screen as update information of the associated information. According to the foregoing configuration, the same function and effect as those of the configuration (4) above can be exhibited.

(17) In any one of the configurations of (13) to (16) above, preferably, the selectable parts setting unit comprises a number of parts changing unit for changing the number of selectable parts to be set on the instructing character. According to the foregoing configuration, the same function and effect as those of the configuration (5) above can be exhibited.

(18) In any one of the configurations of (13) to (17) above, preferably, the game management device further comprises a selective operation timekeeping unit for timekeeping the time required for the series of selective operations of the selectable parts corresponding to the instruction identified by the instruction identification unit, and a strategy success rate deciding unit for deciding a strategy success rate so that a success rate of a game strategy corresponding to the instruction is set higher as the time that has been time-kept by the selective operation timekeeping unit becomes shorter, wherein the game advancement unit reflects the strategy success rate decided by the strategy success rate deciding unit in the game. According to the foregoing configuration, the same function and effect as those of the configuration (6) above can be exhibited.

(19) In any one of the configurations of (13) to (18) above, preferably, the game management device further comprises a complexity deciding unit for deciding complexity of the series of selective operations of the selectable parts corresponding to the instruction identified by the instruction identification unit; and a strategy success rate deciding unit for deciding a strategy success rate so that a success rate of a game strategy corresponding to the instruction is set higher as the complexity decided by the complexity deciding unit becomes higher, wherein the game advancement unit reflects the strategy success rate decided by the strategy success rate deciding unit in the game. According to the foregoing configuration, the same function and effect as those of the configuration (7) above can be exhibited.

(20) In any one of the configurations of (13) to (19) above, preferably, the game is a competition game to be played between a plurality of game devices, and the game management device further comprises a receiving unit for receiving selective operation information showing contents of the selective operation when a plurality of selectable parts of the instructing character are selectively operated in the terminal device; and an opponent-side instructing character display unit for displaying on the screen of the terminal device, the instructing character of the opponent in a display state corresponding to the selective operation information related to the opponent which has been received by the receiving unit by sending the information for displaying the instruction character of the opponent. According to the foregoing configuration, the same function and effect as those of the configuration (8) above can be exhibited.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to a game device, a game control method, a program, a recording medium, and a game management device for a game in which in which a character in a virtual space is operated via an instructing character, and can realize a highly amusing game to players, which permits sensory input operations while reducing the processing load. The present invention is therefore industrially applicable.

The invention claimed is:
1. A game device in which a personified character in a virtual space is operated via an instructing character, comprising:

an instructing character display unit for displaying the instructing character on a screen, wherein the instructing character is a manager character instructing the personified character what to do;

a selectable parts setting unit for setting, as selectable parts, a plurality of body parts of the manager character displayed on the screen, an instruction storage unit for storing, in a storage device, associated information related to a selected order or a combination of the plurality of body parts, and an instruction instructing the personified character what to do; and an instruction identification unit for identifying an instruction instructing the personified character what to do corresponding to a selected order or a combination of the body parts based on the associated information when a plurality of body parts of the manager character displayed on the screen are selectively operated.

2. The game device according to claim 1, wherein said instructing character display unit displays the manager character on the screen based on an operation of pausing an advancement of the game, and clears the manager character from the screen after the instruction is identified by said instruction identification unit.

3. The game device according to claim 1, further comprising:
a selection notification unit for notifying that the selectable part has been selected by changing a display state of the selectable part depending on whether the selectable part has been selectively operated.

4. The game device according to claim 1, further comprising:
an instruction operation setting unit setting associated information related to a selected order or a combination of the plurality of selectable parts stored in the instruction storage unit, and an instruction,
wherein said instruction operation setting unit comprises an instruction selection screen display unit for displaying an instruction selection screen for selecting the instruction;
an instruction operation setting screen display unit for displaying an instruction operation setting screen comprising a plurality of settable areas corresponding to the plurality of selectable parts; and
a registration unit for updating the associated information stored in the instruction storage unit by using a correspondence of an instruction selected on the instruction selection screen and information on an operation order or combination of the plurality of settable areas which have been selectively operated on the instruction operation setting screen.

5. The game device according to claim 1, wherein said selectable parts setting unit comprises a number of parts changing unit for changing the number of selectable parts to be set on the manager character.

6. The game device according to claim 1, further comprising:
a game advancement unit for advancing the game by reflecting the instruction identified by the instruction identification unit in the game;
a selective operation timekeeping unit for timekeeping the time required for the series of selective operations of the selectable parts corresponding to the instruction identified by the instruction identification unit; and
a strategy success rate deciding unit for deciding a strategy success rate so that a success rate of a game strategy corresponding to the instruction is set higher as the time that has been time-kept by the selective operation timekeeping unit becomes shorter,
wherein the game advancement unit reflects the strategy success rate decided by the strategy success rate deciding unit in the game.

7. The game device according to claim 1, further comprising:
a game advancement unit for advancing the game by reflecting the instruction identified by the instruction identification unit in the game;
a complexity deciding unit for deciding complexity of the series of selective operations of the selectable parts corresponding to the instruction identified by the instruction identification unit; and
a strategy success rate deciding unit for deciding a strategy success rate so that a success rate of a game strategy corresponding to the instruction is set higher as the complexity decided by the complexity deciding unit becomes higher,
wherein said game advancement unit reflects the strategy success rate decided by said strategy success rate deciding unit in the game.

8. The game device according to claim 1, wherein the game is a competition game to be played between a plurality of game devices, said game device further comprising:
a sending unit for sending, to a game device of an opponent, selective operation information showing contents of the selective operation when a plurality of selectable parts of the manager character are selectively operated;
a receiving unit for receiving the selective operation information related to the opponent which has been sent from the game device of the opponent; and
an opponent-side instructing character display unit for displaying, on the screen, an opponent manager character of the opponent in a display state corresponding to the selective operation information related to the opponent which has been received by the receiving unit.

9. The game device according to claim 1, comprising:
a contact-input-type display unit which allows input operations by contacting the screen.

10. A game control method of a computer controlling a game in which a personified character in a virtual space is operated via an instructing character, comprising:
an instructing character display step of the computer displaying the instructing character on a screen, wherein the instructing character is a manager character instructing the personified character what to do;
a selectable parts setting step of the computer setting, as selectable parts, a plurality of body parts of the manager character displayed on the screen;
an instruction storage step of the computer storing, in a storage device, associated information related to a selected order or a combination of the plurality of body parts, and an instruction instructing the personified character what to do; and
an instruction identification step of the computer identifying an instruction instructing the personified character what to do corresponding to a selected order or a combination of the body parts based on the associated information when a plurality of body parts of the manager character displayed on the screen are selectively operated.

11. A non-transitory computer-readable recording medium having recorded thereon a program for causing a computer to operate as the game device according to claim 1.

12. A game management device which receives an access from a terminal device of each player via a network and provides to each player, via the network, a game service of a game in which a personified character is operated via an instructing character, the game management device comprising:

an instructing character display unit for displaying the instructing character on a screen of the terminal device by sending information for displaying the instructing character on the terminal device, wherein the instructing character is a manager character instructing the personified character what to do;

a selectable parts setting unit for setting, as selectable parts, a plurality of body parts of the manager character displayed on the screen;

an instruction storage unit for storing, in a storage device, associated information related to a selected order or a combination of the plurality of body parts, and an instruction instructing the personified character what to do; and an instruction identification unit for receiving information related to a selective operation from the terminal device when the terminal device selectively operates a plurality of body parts of the manager character displayed on the screen, and identifying an instruction instructing the personified character what to do corresponding to a selected order or a combination of the body parts based on the associated information.

* * * * *